US008769442B2

(12) United States Patent  (10) Patent No.: US 8,769,442 B2
Khosravy et al.  (45) Date of Patent: Jul. 1, 2014

(54) SYSTEM AND METHOD FOR ALLOCATING DIGITAL GRAFFITI OBJECTS AND CANVASSES

(75) Inventors: Moe Khosravy, Bellevue, WA (US); Lev Novik, Bellevue, WA (US); Katrika Marie Woodcock, Issaquah, WA (US)

(73) Assignee: Microsoft Corporation, Redmond, WA (US)

(*) Notice: Subject to any disclaimer, the term of this patent is extended or adjusted under 35 U.S.C. 154(b) by 614 days.

(21) Appl. No.: 12/499,025

(22) Filed: Jul. 7, 2009

(65) Prior Publication Data

US 2011/0010676 A1  Jan. 13, 2011

(51) Int. Cl.
G06F 3/033 (2013.01)
G06F 3/01 (2006.01)
G06F 3/00 (2006.01)
G06F 1/16 (2006.01)
G06F 17/30 (2006.01)

(52) U.S. Cl.
CPC .............. *G06F 3/013* (2013.01); *G06F 3/017* (2013.01); *G06F 3/011* (2013.01); *G06F 3/033* (2013.01); *G06F 1/163* (2013.01); *G06F 17/30817* (2013.01)
USPC ............ 715/863; 715/702; 715/751; 715/773

(58) Field of Classification Search
CPC ......... G06F 3/013; G06F 3/017; G06F 3/011; G06F 3/033; G06F 1/63; G06F 17/30817
USPC .......... 715/863, 748, 751, 753, 761, 702, 773
See application file for complete search history.

(56) References Cited

U.S. PATENT DOCUMENTS

| 6,252,544 | B1 | 6/2001 | Hoffberg |
| 6,353,398 | B1 | 3/2002 | Amin et al. |
| 6,381,603 | B1 | 4/2002 | Chan et al. |
| 6,672,506 | B2 | 1/2004 | Swartz et al. |
| 6,741,188 | B1 | 5/2004 | Miller et al. |
| 6,765,559 | B2* | 7/2004 | Hayakawa .............. 345/173 |
| D494,584 | S | 8/2004 | Schlieffers et al. |
| 6,795,768 | B2 | 9/2004 | Bragansa et al. |
| 6,796,505 | B2 | 9/2004 | Pellaumail et al. |
| 6,837,436 | B2 | 1/2005 | Swartz et al. |
| 7,010,501 | B1 | 3/2006 | Roslak et al. |
| 7,040,541 | B2 | 5/2006 | Swartz et al. |
| 7,058,891 | B2* | 6/2006 | O'Neal et al. ............ 715/730 |
| 7,063,263 | B2 | 6/2006 | Swartz et al. |
| 7,065,553 | B1* | 6/2006 | Chesley et al. .......... 709/205 |

(Continued)

OTHER PUBLICATIONS

Projection System Offers Gesture-Based Interactivity. Posted Nov. 25, 2008. http://news.thomasnet.com/fullstory/552303. Last accessed Mar. 17, 2009, 4 pages.

(Continued)

*Primary Examiner* — Nicholas Augustine
(74) *Attorney, Agent, or Firm* — Nicholas Chen; Leonard Smith; Micky Minhas

(57) ABSTRACT

The subject specification provides a system, method, and computer readable storage medium directed towards allocating digital canvasses for digital graffiti. The specification discloses receiving data corresponding to digital graffiti formed from a gesture undergone by a device. The specification also discloses identifying a digital canvas corresponding to the digital graffiti as a function of the received data.

20 Claims, 45 Drawing Sheets

(56) References Cited

U.S. PATENT DOCUMENTS

| | | |
|---|---|---|
| 7,073,129 B1 | 7/2006 | Robarts et al. |
| 7,171,378 B2 | 1/2007 | Petrovich et al. |
| 7,195,157 B2 | 3/2007 | Swartz et al. |
| 7,385,501 B2 | 6/2008 | Miller |
| 7,489,297 B2 * | 2/2009 | Hohmann et al. ............ 345/158 |
| 2001/0030664 A1 | 10/2001 | Shulman et al. |
| 2002/0180700 A1 * | 12/2002 | Clapper ......................... 345/158 |
| 2002/0191034 A1 | 12/2002 | Sowizral et al. |
| 2003/0218596 A1 * | 11/2003 | Eschler ......................... 345/156 |
| 2004/0070602 A1 | 4/2004 | Kobuya et al. |
| 2004/0201500 A1 | 10/2004 | Miller et al. |
| 2005/0266858 A1 | 12/2005 | Miller et al. |
| 2005/0272442 A1 | 12/2005 | Miller et al. |
| 2006/0019676 A1 | 1/2006 | Miller et al. |
| 2008/0079751 A1 * | 4/2008 | Arrasvuori .................... 345/629 |
| 2008/0087732 A1 * | 4/2008 | Silverbrook et al. ......... 235/454 |
| 2008/0090591 A1 | 4/2008 | Miller et al. |
| 2008/0122871 A1 * | 5/2008 | Guday .......................... 345/634 |
| 2008/0161018 A1 | 7/2008 | Miller |
| 2008/0254822 A1 | 10/2008 | Tilley |
| 2008/0262909 A1 | 10/2008 | Li et al. |
| 2010/0125622 A1 * | 5/2010 | White et al. .................. 709/201 |
| 2010/0214111 A1 * | 8/2010 | Schuler et al. ............. 340/686.1 |

OTHER PUBLICATIONS

Reactrix Forms Strategic Alliance with Samsung to Launch Revolutionary Interactive Advertising Platform at CES. Posted Jan. 2, 2008. http://www.businesswire.com/portal/site/google/index.jsp?ndmViewId=news_view&newsId=20080102005016&newsLang=en. Last accessed Mar. 17, 2009, 3 pages.

Lyons, et al. Multimodal Interactive Advertising http://conferences.cs.ucsb.edu/PUI/PUIWorkshop98/Papers/Lyons.pdf. Last accessed Mar. 17, 2009, 4 pages.

* cited by examiner

FIG. 21
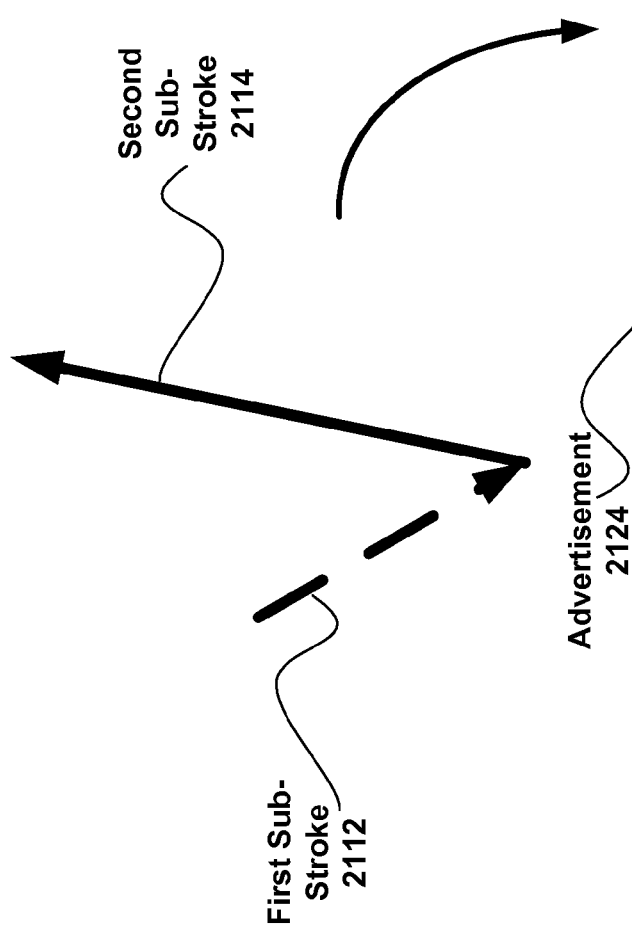
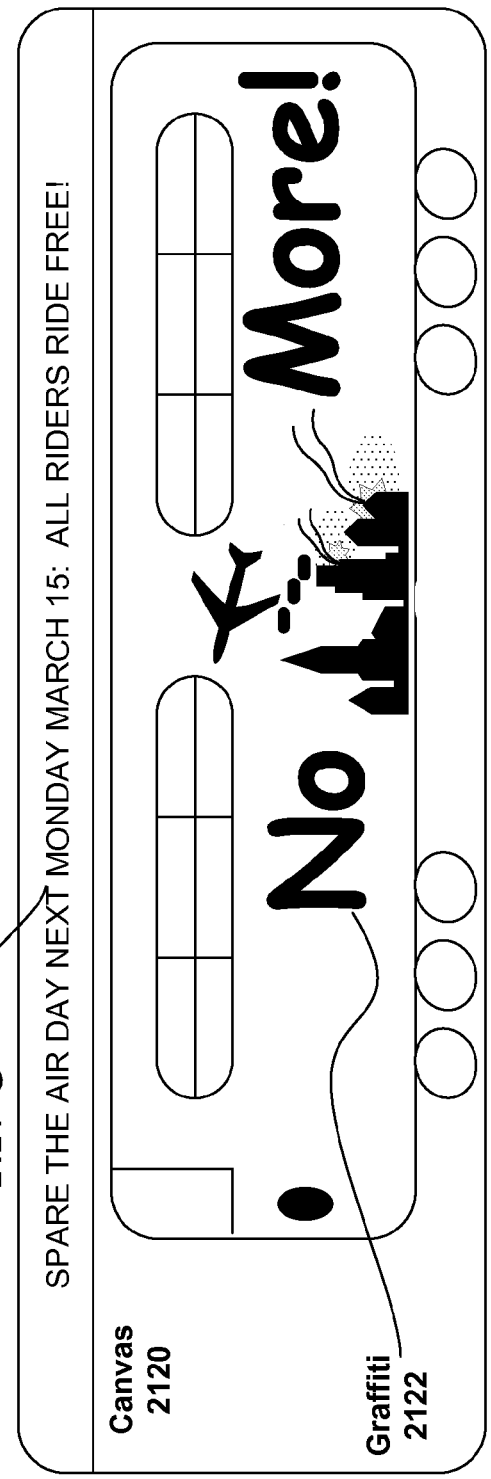

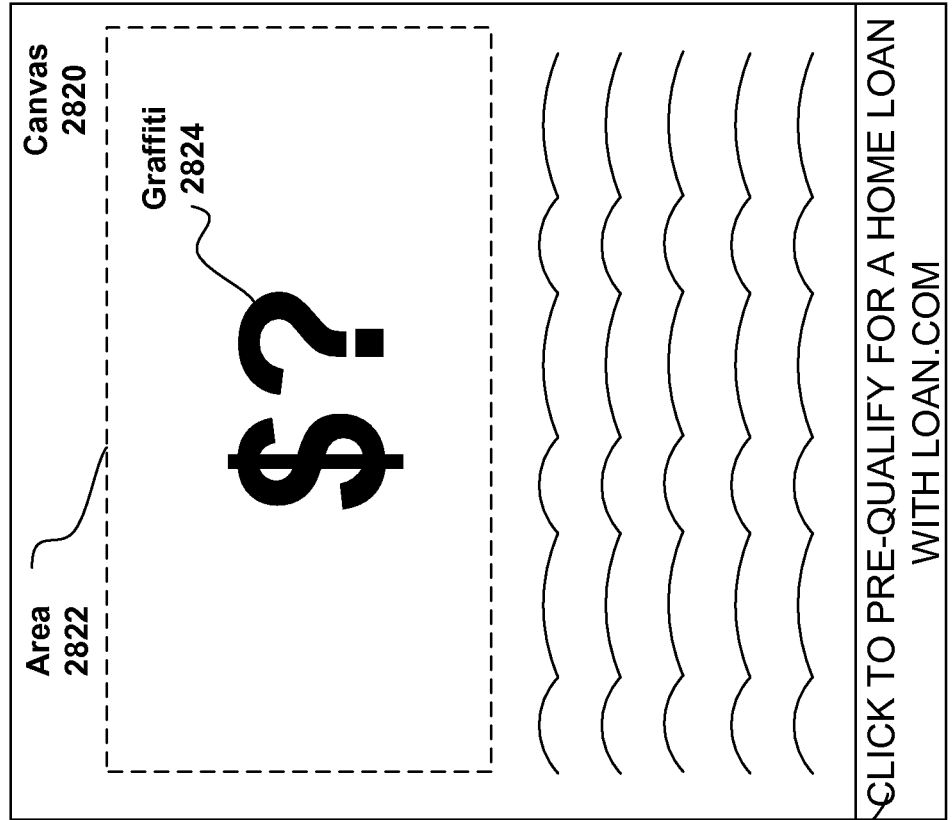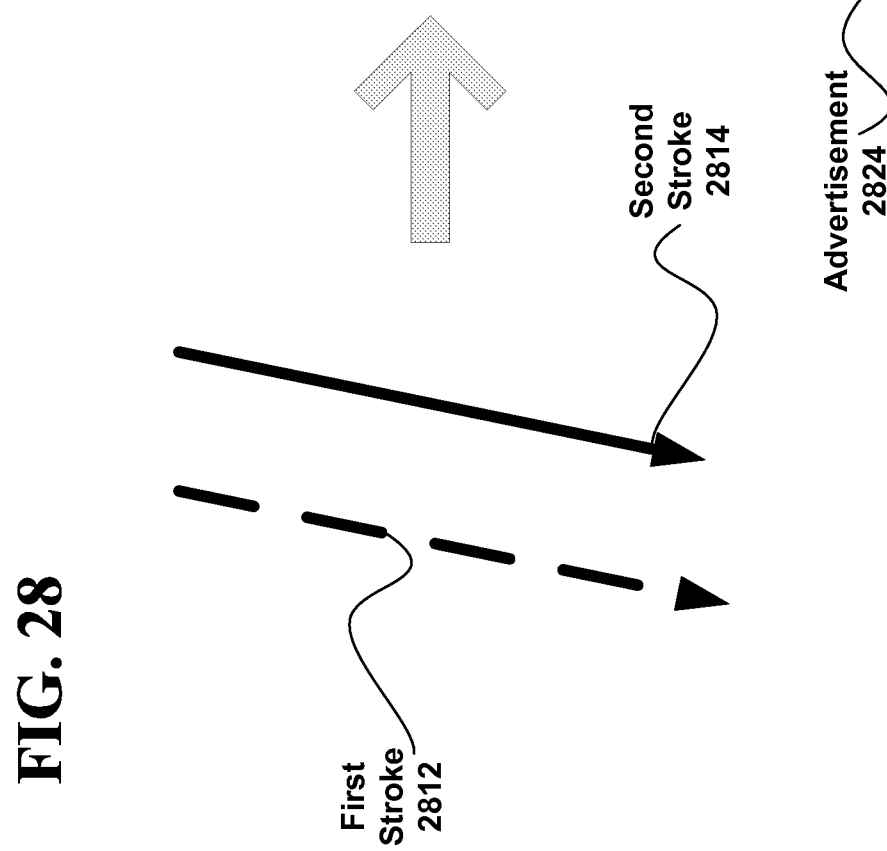
FIG. 28

Determine Object at which Mobile Device is Pointed based on Location (e.g., GPS) and Motion Vector (e.g., Compass, Accelerometer, etc.)

SYSTEM AND METHOD FOR ALLOCATING DIGITAL GRAFFITI OBJECTS AND CANVASSES

TECHNICAL FIELD

The subject disclosure generally relates to mobile computing devices and more particularly to providing mobile computing devices with an allocated set of gesture-based digital graffiti objects and an allocated set of location-based digital canvasses.

BACKGROUND

By way of background concerning some conventional systems, mobile devices, such as portable laptops, PDAs, mobile phones, navigation devices, and the like have been equipped with location-based services, such as global positioning system (GPS) systems, WiFi, cell tower triangulation, etc. that can determine and record a position of mobile devices. For instance, GPS systems use triangulation of signals received from various satellites placed in orbit around Earth to determine device position. A variety of map-based services have emerged from the inclusion of such location-based systems that help users of these devices to be found on a map and to facilitate point-to-point navigation in real-time and to search for locations near a point on a map.

However, such navigation and search scenarios are currently limited to displaying relatively static information about particular locations, wherein interacting with such locations require a user to provide an input via a touch screen and/or keypad. For many potential interactions though, considering the complexity of input on touch screens or tiny alphanumeric keypads typically provided for portable electronic devices, requiring an input via such an interface is inadequate for invoking benefits of location-based services. For instance, a user quickly driving by a location may find it cumbersome and unnecessarily time-consuming to both identify the location (e.g., by obtaining a digital profile for a restaurant, such as a Yelp profile) and provide an input pertaining to the location via a touch screen/keypad user interface (e.g., a drawing of an "unhappy face"). Accordingly, it would be desirable to develop a support system and methodology for a device having a user interface that provides users with location-based input capabilities unobtainable and/or impractical with a touch screen/keypad user interface.

The above-described deficiencies of today's location based systems and devices are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In various non-limiting embodiments, network support for generating digital graffiti is provided to a portable user device based on gestures undergone by the device. In a first embodiment, a computer-implemented system is described. Within such embodiment, the system includes a processor configured to execute computer-executable instructions. The system also includes a receiving component configured to receive data corresponding to digital graffiti formed from at least one gesture undergone by a device. The system further includes a search component configured to identify at least one digital canvas corresponding to the digital graffiti as a function of the data received.

In another embodiment, a method is described, which includes employing a processor to execute computer executable instructions stored on a computer readable storage medium. Within such embodiment, the processor facilitates executing various acts including receiving data corresponding to digital graffiti formed from at least one gesture undergone by a device. Another act executed by the processor includes identifying at least one digital canvas corresponding to the digital graffiti such that the at least one digital canvas identified as a function of the data.

In yet another embodiment, a computer readable storage medium is described, which includes a memory component configured to store computer-readable instructions for performing various acts. Within such embodiment, instructions are included for receiving data from a device corresponding to at least one gesture undergone by the device. Instructions are also included for deriving digital graffiti from the data and for identifying at least one digital canvas corresponding to the digital graffiti. The instructions further include instructions for identifying at least one advertisement corresponding to the digital graffiti. For this embodiment, instructions are also included for superimposing each of the digital graffiti and the at least one advertisement onto the at least one digital canvas.

These and other embodiments are described in more detail below.

BRIEF DESCRIPTION OF THE DRAWINGS

Various non-limiting embodiments are further described with reference to the following accompanying drawings.

FIG. 21 illustrates an exemplary utilization of an object tool for superimposing a custom digital graffiti object onto a photographic digital canvas corresponding to a mobile entity.

FIG. 28 illustrates an exemplary utilization of an object tool for superimposing a generic digital graffiti object onto a canvas residing on a real estate property's digital profile.

DETAILED DESCRIPTION

Overview

Figure 1:
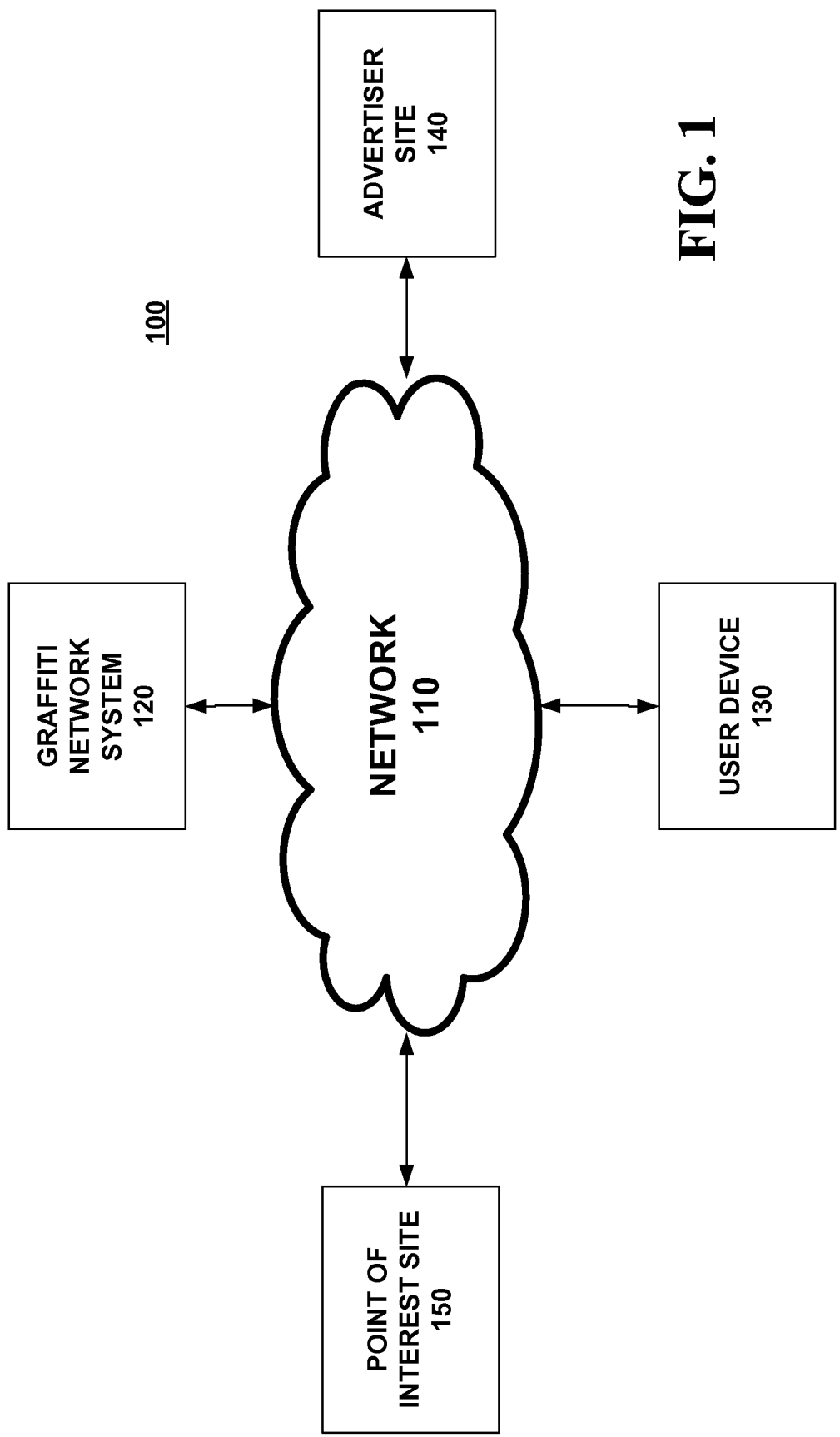
FIG. 1 is an illustration of an exemplary system for providing digital graffiti in accordance with an aspect of the subject specification.

As discussed in the background, among other things, current location services systems and services, e.g., GPS, cell triangulation, P2P location service, such as Bluetooth, WiFi, etc., tend to be based on the location of the device only, and tend to provide static experiences that are not tailored to a user because the data about endpoints of interest is relatively static. In addition, input to engage such static location-based services is frustrating at best for portable devices, such as cell phones, PDAs, music players, notebooks, netbooks, etc. For instance, input to such devices when the user is "on the go" has been conventionally limited to error prone input processes, e.g., due to limited space, which are error prone even when a user is not moving and the device is stationary.

At least partly in consideration of these deficiencies of conventional location-based services, various embodiments for networking a portable device are provided that enable users to point a device directionally and receive static and/or dynamic information in response from a networked service, such as provided by one or more servers, or as part of a cloud services experience. Moreover, by determining gestures made by the device based on any one or more of direction information, motion information or location information, input for various scenarios and device contexts are greatly facilitated, and can be tailored to context based on the location, or given point(s) of interest pointed at by a pointing device.

In the various alternative embodiments described herein, leveraging digital compasses and location services to provide direction and location information enables a next-generation of direction or pointer-based location search services, scan services, discoverability services, etc. In this regard, the digital compass and location information, such as GPS, can be used to point at objects of interest, thus defining the entry point for one or more data transactions or interactions between the device and one or more third party devices providing service(s) for the object(s) of interest at which the device is pointed. Using a digital compass (e.g., solid state, magnetic, sun/moon based, etc.) on a mobile endpoint facilitates point and upload scenarios, point and synchronize geographical information to a Web service, cloud service or another endpoint.

As reflected in various embodiments, a network system provides support for a device to hone in on, interact with, or otherwise transact with, a specific object or specific objects of interest by way of location and direction of the device, creating a new advertising model not previously known. As an example, when a user interacts with a particular product on a shelf at a retail store in connection with a direction-based service, this creates an opportunity for anyone having an interest in the particular product to engage the user (e.g., communicate some information to that user). Any context that can be discerned from the user's actions and interactions can also be taken into account when acting on the opportunity. In this regard, a variety of gestures can facilitate these actions and interactions without requiring the complexity of input alluded to in the background.

In this regard, with a gesture (pre-defined or user defined), users can interact with the endpoints in a host of context sensitive ways to provide or update information associated with endpoints of interest, or to receive beneficial information or instruments (e.g., coupons, offers, etc.) from entities associated with the endpoints of interest, or according to any of the many non-examples described in more detail below.

In one embodiment, the network system allocates information as a function of data processed by various components of the portable device. For instance, the device may include a positional component that outputs position information as a function of a location of the device, a motion component that outputs motion information as a function of movement(s) of the device and a directional component that outputs direction information as a function of an orientation of the device. The network system may receive this data and be configured to process the data in various ways. In one aspect, the system processes at least the position information to determine point(s) of interest relating to the position information. In another aspect, the system processes at least the motion information and the direction information to determine pre-defined gesture(s) undergone by the device with respect to the point(s) of interest.

The point(s) of interest can be determined from the position information and the direction information. The at least one pre-defined gesture can be determined from any one or more of the position information, the motion information and the direction information. The device can automatically make a request to they network system based on the gesture(s) and identifier(s) associated with the point(s) of interest. The gesture(s) can be determined based on a pre-defined gesture definition or a user-defined gesture definition. A positional component within the device can include a global positioning satellite (GPS) component for receiving and processing GPS signals or a component for receiving position information based on triangulation to wireless base stations, an image recognition system for recognizing at least one object in image data and determining a position of the device relative to the at least one object in the image data, or other means for measuring location.

The directional component can include a digital compass and can also include an image recognition system for recognizing an object in real space and determining the direction of the object and therefore the device by detecting the side of the object, or detecting the object relative to other objects fixed in real space. The motion component can include accelerometer(s) for measuring an acceleration of the device. The motion component can include at least two accelerometers for measuring a tilt or rotation of at least part of the device.

In one embodiment, a process determines a location of a portable device based on location information determined for the device, the location information representing a global position of the device. Direction information representing an orientation of the portable device and the location information are analyzed to determine point(s) of interest towards which the portable device is substantially oriented. In this regard, path information representing a path traversed by the portable device is analyzed based on at least the direction information to determine gesture(s) made by the portable device. A request is transmitted to the network system based on the gesture(s) and the point of interest.

The analyzing of path information can include processing acceleration information measuring acceleration of the device, processing velocity information measuring velocity of the device, analyzing the path information for a given time span or analyzing a set of vectors representing the path traversed by the device from a start time to a stop time. Moreover, the analyzing of path information can include analyzing three dimensional (3-D) path information representing three degrees of freedom of movement for the device, but can also include analyzing three dimensional (3-D) path information as 2-D path information by collapsing a degree of freedom.

In another embodiment, a method includes determining whether a viewing plane of a portable device is aligned with a substantially horizontal plane that is substantially parallel to a ground plane or aligned with a substantially vertical plane that is substantially orthogonal to the ground plane. If the portable device is aligned with the substantially horizontal plane, a topographical map view of a geographical area map determined based on location and direction information measured by the portable device is displayed and indication(s) of point(s) of interest on the geographical area map are displayed. If the portable device is aligned with the substantially vertical plane, an image based view of three-dimensional (3-D) space extending at least one pre-defined direction from the portable device is displayed and indication(s) of point(s) of interest pertaining to the 3-D space represented by the image based view can be displayed.

Details of various other exemplary, non-limiting embodiments are provided below.

Digital Graffiti Network System Architecture and Methodology

Referring first to FIG. 1, an exemplary system for facilitating digital graffiti in a networked environment is provided. As illustrated, system 100 includes a graffiti network system 120 configured to provide support via network 110 to a user device 130 generating gesture-based digital graffiti. In one aspect, such support may include generating the digital graffiti based on data received from device 130 (e.g., generating graffiti based on any combination of motion information, location information, and/or direction information received from device 130). In another aspect, such support may include allocating particular digital canvasses appropriate for graffiti generated by the device. For instance, a user pointing his/her device at a restaurant may wish to superimpose graffiti critical of the restaurant (e.g., "RUDE WAITER") onto a digital canvas provided and maintained by the restaurant. Within such embodiment, system 120 may utilize data received from device 130 to retrieve the digital canvas from a site 150 maintained by the restaurant (e.g., system 120 may retrieve the canvas based on an explicit request received from the device and/or based on an inference made as a function of the device's position and direction information). Within this embodiment, system 120 may also utilize data received from device 130 to superimpose a particular digital advertisement retrieved from an advertisement site 140 onto the digital canvas (e.g., system 120 may retrieve the advertisement based on a user profile, a particular digital canvass retrieved, and/or location information received from device 130).

Figure 2:
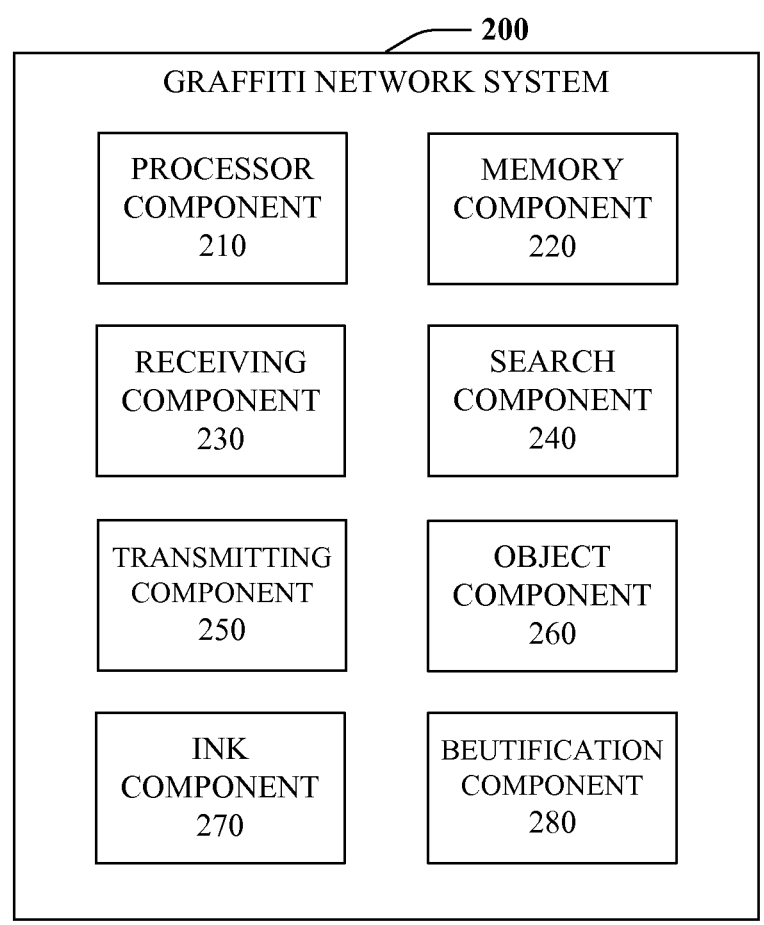
FIG. 2 illustrates a block diagram of an exemplary graffiti network system in accordance with an aspect of the subject specification.

Referring next to FIG. 2, a block diagram of an exemplary graffiti network system in accordance with various aspects is provided. As illustrated, system 200 may include processor component 210, memory component 220, receiving component 230, search component 240, transmitting component 250, object component 260, ink component 270, and beautification component 280.

In one aspect, processor component 210 is configured to execute computer-readable instructions related to performing any of a plurality of functions. Processor component 210 can be a single processor or a plurality of processors dedicated to analyzing information to be communicated from system 200 and/or generating information that can be utilized by memory component 220, receiving component 230, search component 240, transmitting component 250, object component 260, ink component 270, and/or beautification component 280. Additionally or alternatively, processor component 210 may be configured to control one or more components of system 200.

In another aspect, memory component 220 is coupled to processor component 210 and configured to store computer-readable instructions executed by processor component 210. Memory component 220 may also be configured to store any of a plurality of other types of data including data output by any of receiving component 230, search component 240, transmitting component 250, object component 260, ink component 270, and/or beautification component 280. Various sub-components of memory component 220 may also be contemplated including, for example, a canvas database (e.g., to store allocated digital canvasses), an advertisement database (e.g., to store allocated digital advertisements), and/or an object library component (e.g., to store allocated digital images corresponding to particular gestures undergone by a device). One of ordinary skill will appreciate that memory component 220 can be configured in a number of different configurations, including as random access memory, battery-backed memory, hard disk, magnetic tape, etc. Various features can also be implemented upon memory component 220, such as compression and automatic back up (e.g., use of a Redundant Array of Independent Drives configuration).

For some aspects, receiving component 230 is coupled to processor component 210 and configured to receive data from any of a plurality of external entities including a user device, a point-of-interest site, and/or an advertisement site. For instance, receiving component 230 may receive data from the user device pertaining to the derivation of digital graffiti (e.g., motion information, location information, and/or direction information). Receiving component 230 may also receive data useful for identifying an appropriate digital canvasses and/or digital advertisement. For example, in one aspect, receiving component receives a request from a user explicitly requesting a particular digital canvas. In another aspect, receiving component 230 simply receives motion information, location information, and/or direction information, wherein system 200 infers an appropriate digital canvas and/or digital advertisement from the information received. With respect to third party sites (e.g., point-of-interest sites, advertisement sites, etc.), one of ordinary skill will appreciate that receiving component 230 may receive any of a plurality of types of data from such entities including digital graffiti (e.g., generic and/or custom images stored on third party sites), digital canvasses, and/or digital advertisements.

As illustrated, system 200 may also include search component 240. In an aspect, search component 240 identifies digital canvasses and/or digital advertisements appropriate for graffiti generated by the user device. Within such embodiment, search component 240 performs this identification as a function of data received from the user device. For instance, as stated previously, an appropriate digital canvas and/or digital advertisement is inferable from any of the motion information, location information, and/or direction information received from the user device. A user device may also provide an explicit request for a particular digital canvas (e.g., a particular URL) and/or an explicit search string for particular types of digital canvasses (e.g., "Food" which may be combined with location information to identify restaurants within a particular radius of the device). In identifying digital canvasses and/or digital advertisements, it should also be noted that search component 240 may perform an internal search (e.g., a search of a canvas database and/or advertisement database residing within memory component 220) and/or an external search (e.g., a search of digital canvasses and/or digital advertisements stored on third party sites).

In an aspect, system 200 further includes transmitting component 250, wherein transmitting component 250 transmits data to any of a plurality of external entities including a user device, a point-of-interest site, and/or an advertisement site. For instance, transmitting component 250 may transmit any combination of digital graffiti, digital canvasses, and/or digital advertisements to a user device. Transmitting component 250 may also be configured to transmit a request to either of a point-of-interest site for a digital canvas and/or an advertisement site for a digital canvas. Here, it should be noted that such request may include a request to send the digital canvas and/or digital advertisement to system 200 and/or directly to the user device.

To facilitate deriving graffiti corresponding to gestures undergone by a device, system 200 may also include object component 260, ink component 270, and beautification component 280. Within such embodiment, the digital graffiti is derivable from any combination of the motion information, the direction information, and/or the location information received from the user device. In one aspect, ink component 270 outputs a two-dimensional mapping of a gesture undergone by the user device, wherein the digital graffiti is derived from at least a portion of the two-dimensional mapping. Beautification component 280 may then be configured to output a beautification of at least a portion of the two-dimensional mapping, wherein the digital graffiti is derived to include at least a portion of the beautification. Object component 260 may also be utilized to identify a particular digital image corresponding to a gesture, wherein the digital graffiti is derived to include at least a portion of the digital image.

Each of object component 260, ink component 270, and beautification component 280 are discussed in more detail below.

Figure 3:
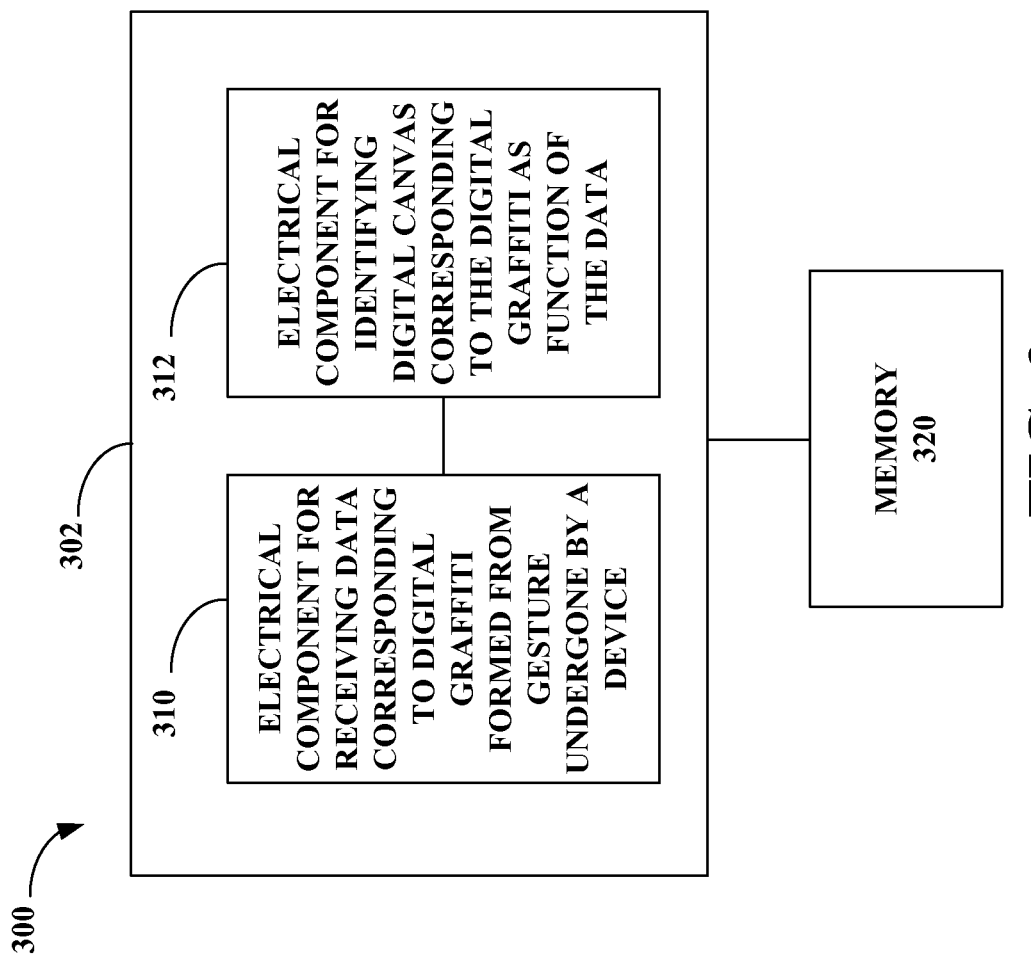
FIG. 3 is an illustration of an exemplary coupling of electrical components that effectuate providing network support to a device generating digital graffiti in accordance with an aspect of the subject specification.

Referring next to FIG. 3, illustrated is a system 300 that facilitates providing network support to a device generating digital graffiti. System 300 can reside within a server, for instance. System 300 includes functional blocks that can represent functions implemented by a processor, software, or combination thereof (e.g., firmware), wherein system 300 includes a logical grouping 302 of electrical components that can act in conjunction. As illustrated, logical grouping 302 can include an electrical component for receiving data corresponding to digital graffiti formed from a gesture undergone by a device 310. Logical grouping 302 can also include an electrical component for identifying a digital canvas corresponding to the digital graffiti as function of the data 312. Additionally, system 300 can include a memory 320 that retains instructions for executing functions associated with electrical components 310 and 312, wherein any of electrical components 310 and 312 can exist either within or outside memory 320.

Figure 4:
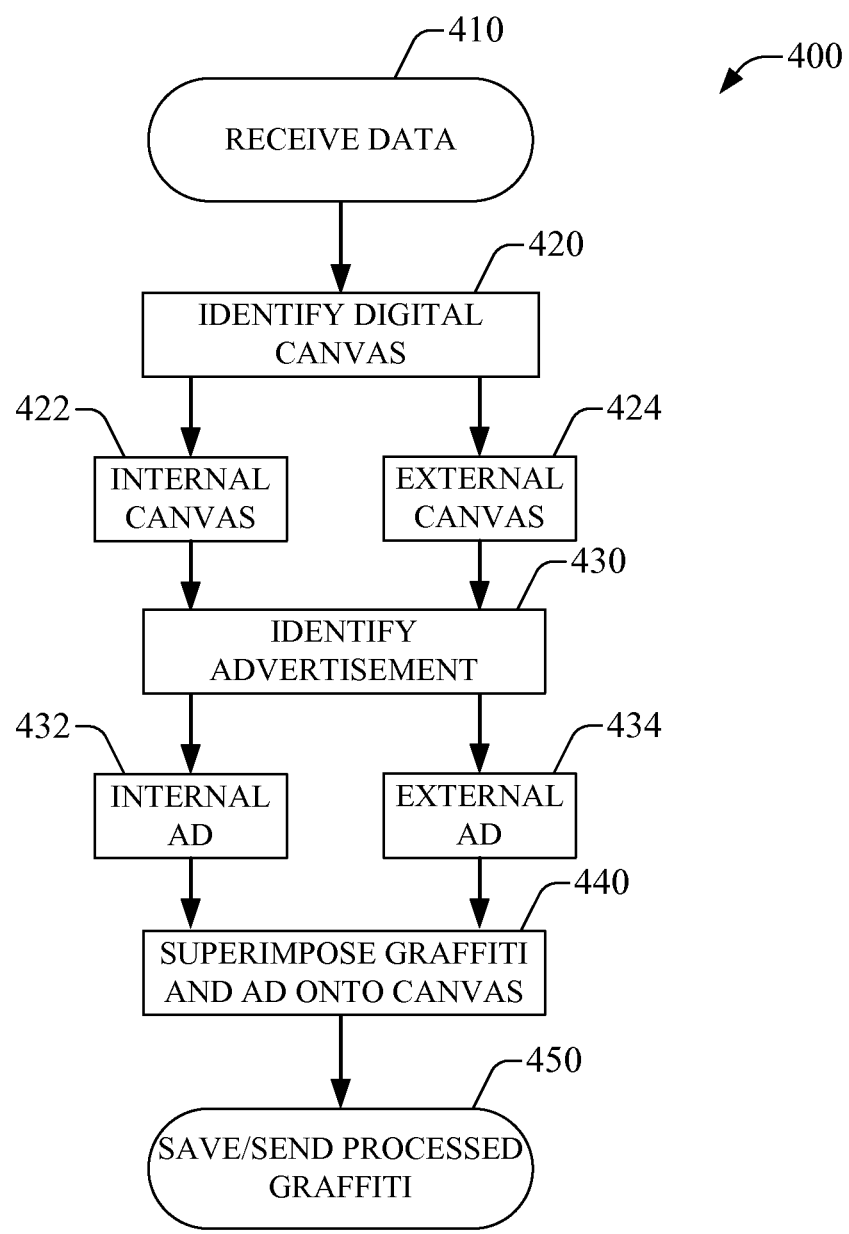
FIG. 4 is a flow diagram illustrating an exemplary methodology for providing network support to a device generating digital graffiti in accordance with an aspect of the subject specification.

Referring next to FIG. 4, illustrated is a flow diagram of an exemplary methodology for providing network support to a device generating digital graffiti. As illustrated, process 400 begins at step 410 where the graffiti network system receives data from a user device. As stated previously, such data may include any of a plurality of types of data including motion information, location information, and/or direction information. This data may also include other types of sensory information ascertained by the user device, as well as graffiti objects generated on the user device.

Next, at step 420, process 400 continues with an identification of at least one digital canvas. Here, the at least one digital canvas is identified as function of the data received from the user device. As stated previously, such data may include explicit requests for particular digital canvasses and/or explicit search strings for a particular type of digital canvas. The at least one digital canvas may also, however, be implicitly identified based on other data received from the user device (e.g., utilizing location information and direction information to infer what the user device is pointing at). The digital canvas may then be retrieved from either an internal storage location at step 422 (e.g., a canvas database within the graffiti network system) or an external storage location at step 424 (e.g., a third party site).

At least one appropriate advertisement is then identified at step 430. For this embodiment, such advertisement is identifiable as a function of various types of data in any of various combinations. For instance, in one aspect, contractual obligations may dictate that particular advertisements be inserted into particular digital canvasses. In another aspect, the digital advertisement is a function of data corresponding to the user, wherein such data may include data received from the user device (e.g., location information) and/or data saved in a profile corresponding to the user. The digital advertisement may then be retrieved from either an internal storage location at step 432 (e.g., an advertisement database within the graffiti network system) or an external storage location at step 434 (e.g., a third party site).

Process 400 continues at step 440 where the digital graffiti and digital advertisement are superimposed onto the digital canvas. As stated previously, the digital graffiti may be generated by the graffiti network system from data received from the user device, or the graffiti may be generated at the user device itself. At step 450, the processed graffiti is then either saved onto the graffiti network system, or transmitted to the user device and/or a third party.

Gesture Based Input to Computing Device with Direction Information

With the addition of directional information in a location-based environment, a variety of mobile scanning experiences are enabled on top of user identification of or interaction with specific object(s) of interest by pointing, or gesturing, at an object of interest. For instance, when a user gestures, e.g., points, at a particular item at a particular location or place, this creates an opportunity for anyone having an interest in that particular item to interact with the user regarding that item or related items at a point at a time when the user's focus is on the particular item. User context for the interaction can also be taken into account to supplement the provision of one or more interactive direction based services.

A gesture subsystem can optionally be included in a device, which can be predicated on any one or more of the motion information, location information or direction information. In this regard, not only can direction information and location information be used to define a set of unique gestures, but also motion information (such as speed and acceleration) can be used to define a more sophisticated set of gestures. In this regard, one can appreciate that a variety of algorithms could be adopted for a gesture subsystem. For instance, a simple click-event when in the "pointing mode" for the device can result in determining a set of points of interest for the user.

The pointing information, however produced according to an underlying set of measurement components and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest, e.g., those that span a certain angle defined by a panning gesture by the user.

In this respect, a gesturing component can also be included in the device to determine a current gesture of a user of the portable electronic device from a set of pre-defined gestures. For example, gestures can include zoom in, zoom out, panning to define an arc, all to help filter over potential subsets of points of interest for the user.

In addition, a device includes an algorithm for discerning items substantially along a direction at which the device is pointing, and those not substantially along a direction at which the device is pointing. In this respect, while motion vector might implicate POI, without a specific panning gesture that encompassed more directions/vectors, POIs would likely not be within the scope of points of interest defined by motion vector. The distance or reach of a vector can also be tuned by a user, e.g., via a slider control or other control, to quickly expand or contract the scope of endpoints encompassed by a given "pointing" interaction with the device.

Other gestures that can be of interest in for a gesturing subsystem include recognizing a user's gesture for zoom in or zoom out. Zoom in/zoom out can be done in terms of distance. A device pointed in direction may include a zoomed in view which includes points of interest within distance and arc, or a medium zoomed view representing points of interest between distance, or a zoomed out view representing points of interest beyond distance. These zoom zones correspond to POIs. More or less zones can be considered depending upon a variety of factors, the service, user preference, etc.

For another non-limiting example, with location information and direction information, a user can input a first direction via a click, and then a second direction after moving the device via a second click, which in effect defines an arc for objects of interest. For instance, via first pointing act by the user at time in direction and a second pointing act at time by the user in direction, an arc is implicitly defined. The area of interest implicitly includes a search of points of object within a distance, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions can also be implemented.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment.

Furthermore, with relatively accurate upward and downward tilt of the device, in addition to directional information such as calibrated and compensated heading/directional information, other services can be enabled. Typically, if a device is ground level, the user is outside, and the device is "pointed" up towards the top of buildings, the granularity of information about points of interest sought by the user (building level) is different than if the user was pointing at the first floor shops of the building (shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

A device can also include a Hardware Abstraction Layer (HAL) having components responsible for abstracting the way the client communicates with the measuring instruments, e.g., the GPS driver for positioning and LOS accuracy (e.g., open eGPS), magnetic compass for heading and rotational information (e.g., gyroscopic), one or more accelerometers for gestured input and tilt (achieves 3D positional algorithms, assuming gyroscopic compass).

Figure 5:
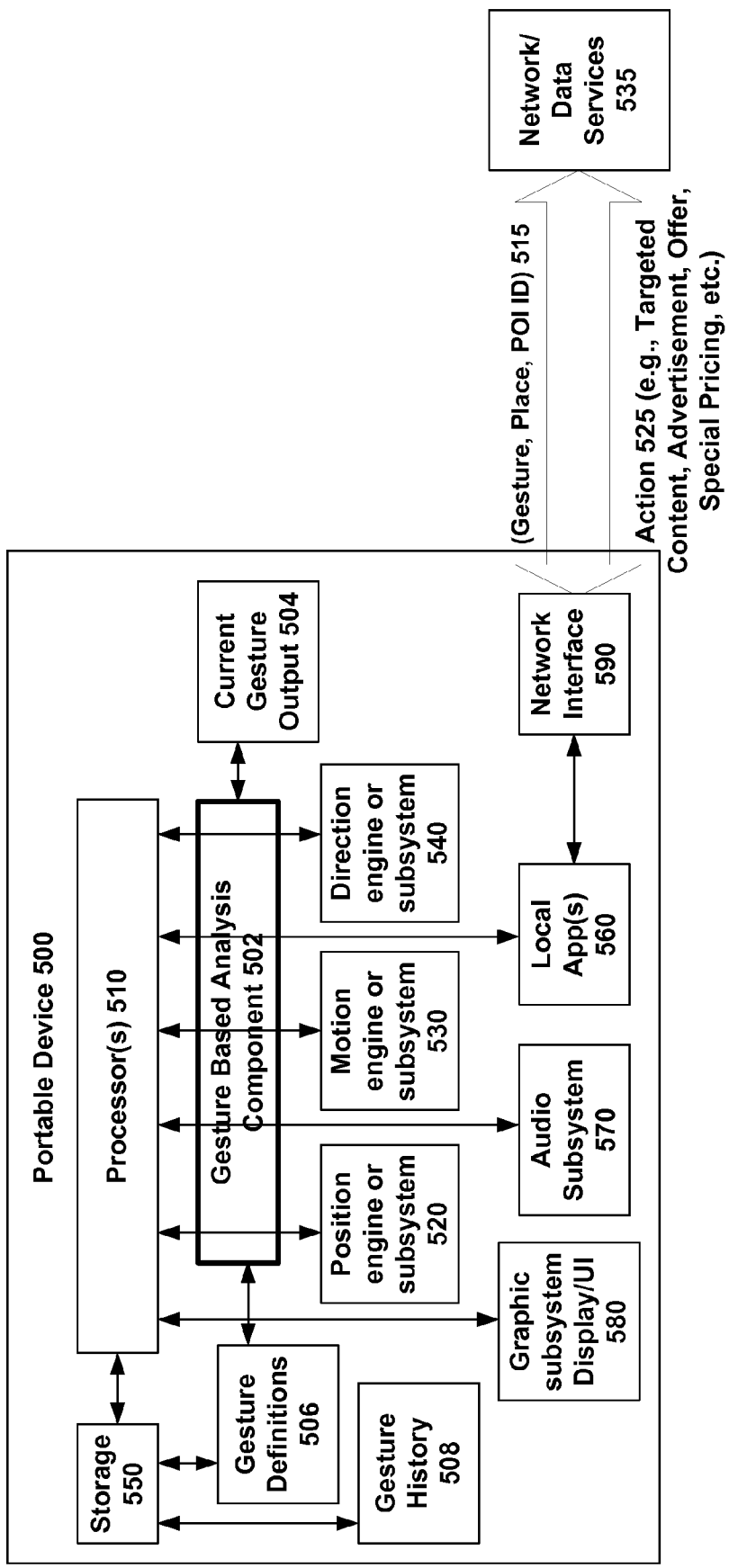
FIG. 5 illustrates a portable electronic device according to an embodiment including a positional component, a motion component and a directional component for performing gesture based analysis as described in one or more embodiments and scenarios.

FIG. 5 illustrates a portable electronic device 500 according to an embodiment including processor(s) 510, a positional component 520 that outputs position information as a function of location of the portable electronic device, a motion component 530 that outputs motion information as a function of movement of the portable device and a directional component 540 that outputs direction information as a function of orientation of the portable electronic device.

In cooperation with gesture based analysis component 502, and optionally local applications or services 560 (or remote services 535), processor(s) 510 process the position information and/or the direction information to determine a set of points of interest relating to the position/direction information. Processor(s) 510 also process the motion information, direction information and/or position information to determine pre-defined gesture(s) undergone by the portable electronic device with respect to one or more points of interest of the set. In response to the pre-defined gesture(s), the portable electronic device automatically makes a request based on the pre-defined gesture(s) and identifier(s) associated with the one or more points of interest of the set.

The gesture based analysis component 502 can determine a set of current gesture(s) 504 based on one or more of the position information, such as but not limited to GPS information, output from position engine or subsystem 520, the motion information, such as but limited to accelerometer information, of motion engine or subsystem 530, or the direction information, such as digital compass information, output from direction engine or subsystem 540. Gesture based analysis component 502 determines gesture(s) 504 relative to gesture definitions 506, which can be statically defined on the device, defined by the user of the device, retrieved from a gesture definition network provider (not shown), etc. Gesture history 508 coupled with other place and point of interest information can be a rich source for intelligent applications 560 or network services 535 to understand context for a given device gesture based on historical interaction.

Device 500 can include storage 550 for storing any of position information, motion information, direction information, gesture definitions 506, gesture history 508, application information, etc. The device 500 can also include a graphics subsystem display and associated user interface 580 for display of information and/or for receiving touch screen input. An audio subsystem 570 can also be included for voice or other sound input, or sound output in connection with the provision of gesture and pointing based services.

For instance, via network interface 590, based on a current gesture 504, an automatic request 515 can be made to network/data services 535 based on the gesture and place or point of interest identification. As a result, a variety of actions 525 can take place, e.g., targeted content, advertising, offers, deals, price comparisons, etc. Local applications 560 and storage 550 are optional as any of the functionality of providing gesture-based services can be pushed to the network data services 535, or conversely, functionality of data services 535 can be implemented by a local application 560.

Figure 6:
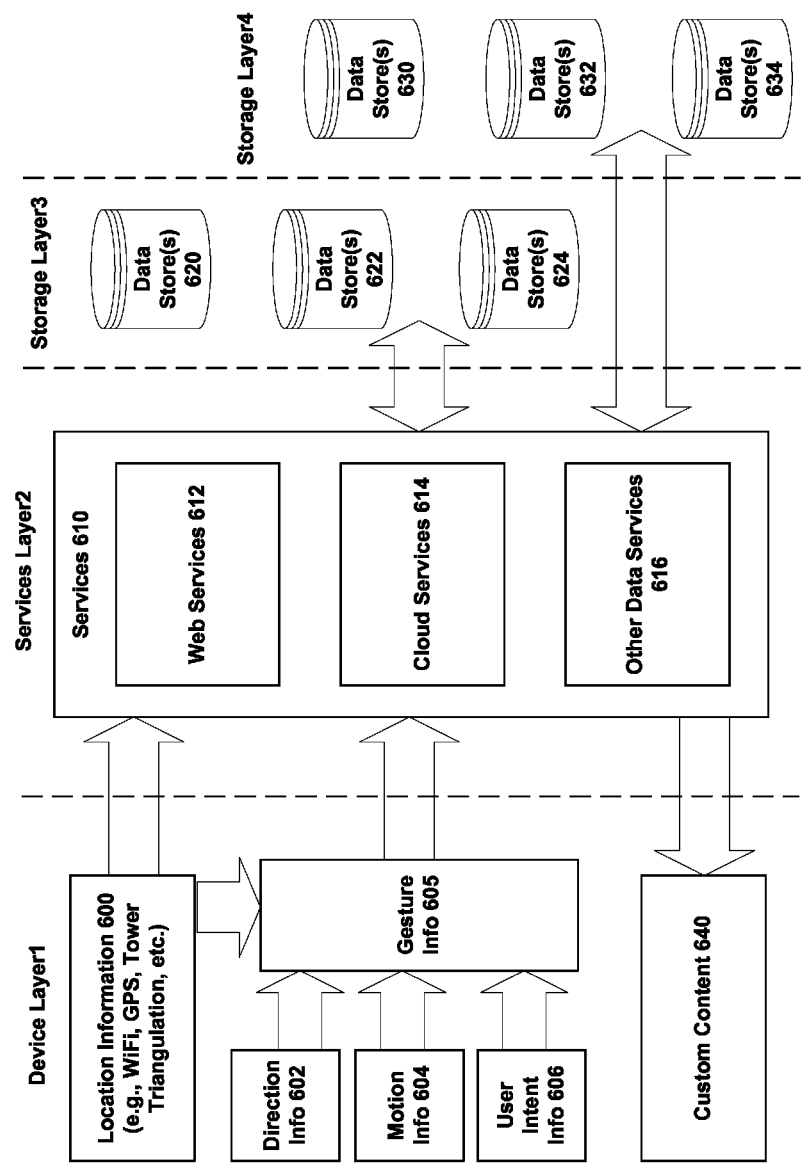
FIG. 6 is an exemplary non-limiting architecture for achieving one or more embodiments described herein.

FIG. 6 is an exemplary non-limiting diagram of an architecture for achieving one or more embodiments described herein. At the device layer Layer1, location information 600, direction information 602, motion information 604 and user intent information 606 can be input to a Layer2 with various service 610, including web services 612, cloud services 614, other data services 616, etc. Gesture information 605 can be derived from any of location information 600, direction information 602, motion information 604 or user intent information 606. Any of services 610 can have input to a set of brick and mortar store databases in Layer3, such as data store(s) 620, 622, 624, etc. or set of online or electronic retailer databases in Layer4, such as data store(s) 630, 632, 634, etc. In this regard, user intent 604 coupled with a place of the device can be utilized by one or more services 610 to retrieve and deliver custom content 640 to the device from a variety of retail and online vendors based on gesture information 605 of the device.

Figure 7:
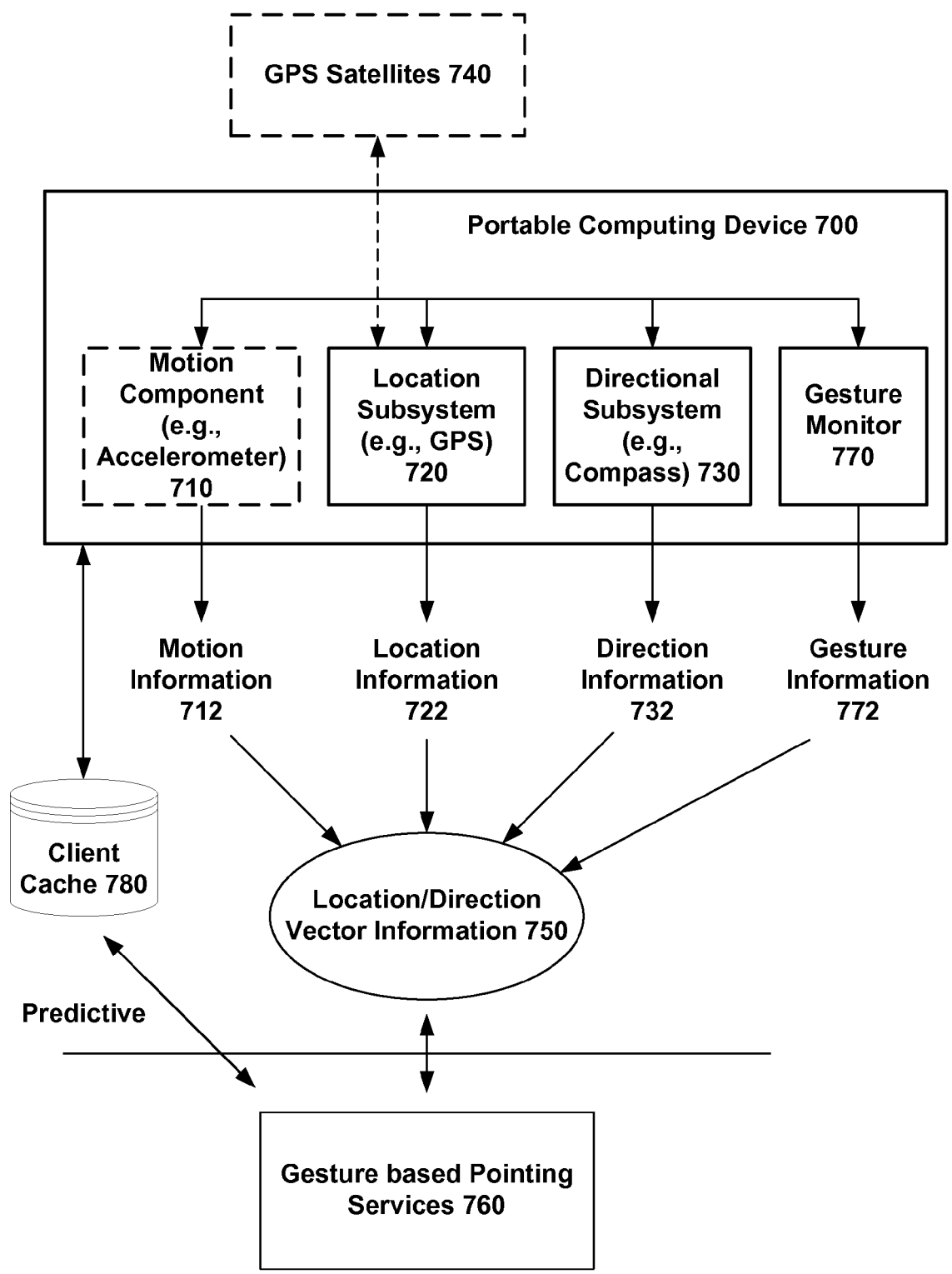
FIG. 7 illustrates a mobile computing device according to an embodiment upon which a set of gesture and direction based services can be built according to one or more embodiments.

Referring next to FIG. 7, a block diagram illustrates an exemplary portable computing device 700. In this regard, a set of services 760 are built based on motion information 712, location information 722, and/or direction information 732 collected by a mobile device, such as a phone. For instance, in an embodiment, location information 722 can be recorded by a location subsystem 720 such as a GPS subsystem communicating with GPS satellites 740. Direction or pointing information 732 can be collected by a direction subsystem 730, such as a compass, e.g., gyroscopic, magnetic, digital compass, etc. In addition, movement information 712 can be gathered by the device 700, e.g., via tower triangulation algorithms, and/or acceleration of the device 700 can be measured as well, e.g., with an accelerometer. From any one or more of the motion information 712, location information 722 and/or direction information 732, gesture information 772 can be determined by a gesture monitor component 770.

The collective information 750 can be used to gain a sense of, not only where the device 700 is located in relation to other potential points of interest tracked or known by the overall set of services 760, but to also understand in what direction the user is pointing the device 700. By ascertaining such information, the services 760 can appreciate at whom or what the user is pointing the device 700 so as to gain a sense of how the user wishes to interact with the place or point of interest via the gesture information 772.

In an aspect, gesture subsystem 770 utilizes any one or more of the motion information 712, location information 722, and/or direction information 732. In this regard, for example, not only can direction information 732 and location information 722 be used to define a set of unique gestures, but also motion information 712 (such as speed and acceleration) can be used to define a more sophisticated set of gestures.

FIG. 7 thus illustrates a gesture subsystem 770 that can be included in a device 700 to enable a host of scenarios where the user may not be able to make detailed input to the device 700 by conventional methods. In this regard, one can appreciate that a variety of algorithms could be adopted for a gesture subsystem 770. For a non-limiting example of a simple gesture, a click and aim event when in the "pointing mode" for the device 700 can result in determining a set of points of interest for the user. A client cache 780 can be included in the system. By saving information about potential points of interest in client cache 780, a user of device 700 need not always derive the benefit of the gesture based interaction from a network service 760, but rather can be satisfied locally by predictively pre-fetching information of probable interest to the device 700.

Figure 8:
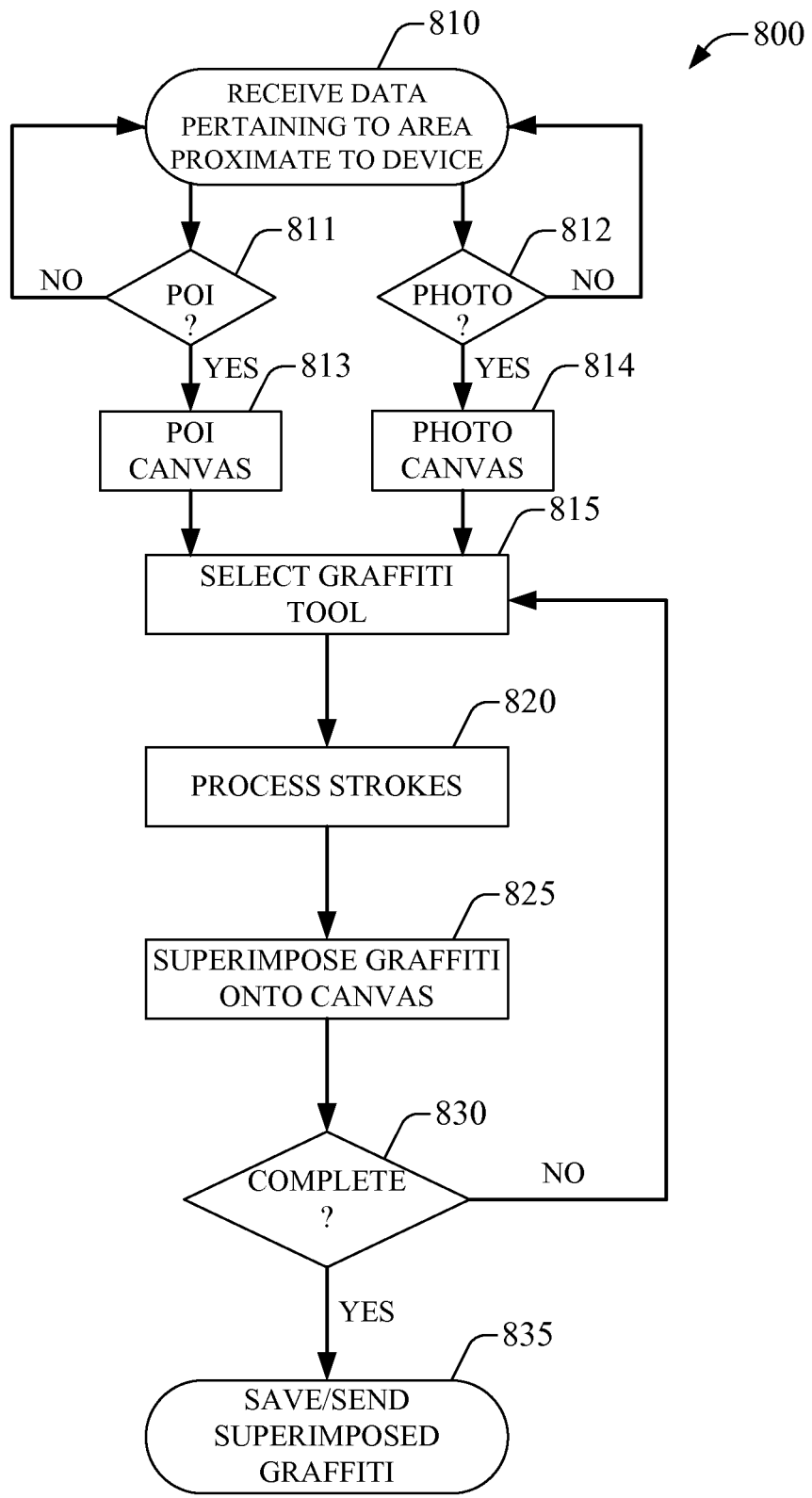
FIG. 8 is a flow diagram illustrating an exemplary methodology for superimposing digital graffiti onto a digital canvas according to an embodiment.

In an aspect, a network system superimposes digital graffiti onto a digital canvas as a function of data received from a portable device. In FIG. 8, a flow diagram illustrates an exemplary methodology for such superimposition of digital graffiti onto a digital canvas. As shown, process 800 begins at step 810 where the network system receives data pertaining to an area proximate to device 700 and ascertains a desired digital canvas. In an embodiment, such a digital canvas may correspond to particular points of interest detected by device 700. Here, one of ordinary skill will appreciate that points of interest are detectable in any of a plurality of ways. For instance, in an aspect, device 700 includes a scanning component that outputs sensory information pertaining to a signal received from entities proximate to device 700 (e.g., restaurants, theaters, trains, mobile devices, etc.). Moreover, at step 810, the network system receives sensory information from device 700 pertaining to signals emanating from entities proximate to device 700. Next, at step 811, process 800 determines whether the sensory information corresponds to an identifiable point of interest having at least one digital canvas. If so, process 800 continues by retrieving at least one digital canvas at step 813. Otherwise, process 800 loops back to step 810 where the network system continues to receive sensory information from device 700.

In another embodiment, points of interest proximate to device 700 are identifiable without detecting signals emanating from the points of interest. For instance, the network system may identify such points of interest by utilizing any combination of information from motion component 710 (e.g., an accelerometer unit), location subsystem 720 (e.g., a GPS unit), and/or directional subsystem 730 (e.g., a compass). In an aspect, device 700 transmits any combination of motion information 712, location information 722, and/or directional information 732 to the network system via a network for further processing. Here, to facilitate interfacing with the network system via the network, a network component may be included in device 700. Within such embodiment, the network system is a centralized system that manages access to data corresponding to any of a plurality of identifiable points of interest. Moreover, the network system utilizes information received from device 700 to identify points of interest, and subsequently transmits data corresponding to the identified points of interest to device 700.

In another embodiment, device 700 ascertains a digital canvas independent of the network system and/or signals emanating from points of interest. For instance, in an aspect, device 700 includes a camera. Within such embodiment, process 800 thus includes having a user manually scan an area proximate to device 700 at step 810. At step 812, process 800 then includes determining whether an image of the area obtained/obtainable by the camera is adequate. If indeed adequate, process 800 proceeds by configuring a digital canvas to include the image at step 814. Otherwise, if the image is inadequate, process 800 loops back to step 810 where the user continues to scan the area for desirable images.

After ascertaining a digital canvas, process 800 continues by selecting a desired graffiti tool at step 815. As will be discussed later with respect to FIG. 9 and FIG. 10, the network system can provide support for any of a plurality of graffiti tools including an ink graffiti tool and/or an object graffiti tool. After selecting the desired graffiti tool, a processing of strokes undergone by device 700 occurs at step 820. Next, at step 825, digital graffiti corresponding to such strokes are then superimposed onto the at least one digital canvas previously identified. For instance, if utilizing an ink graffiti tool, the digital graffiti may include a two-dimensional trace of the strokes undergone by device 700. On the other hand, if utilizing an object graffiti tool, the digital graffiti may include a saved digital image corresponding to a particular stroke sequence.

After superimposing the digital graffiti onto the digital canvas, process 800 continues by determining, at step 830, whether the graffiti session is complete. If incomplete, process 800 loops back to step 815 where a user is again able to select a graffiti tool. However, if the graffiti session is indeed complete, process 800 continues to step 835 where the superimposed digital graffiti is saved/transmitted.

Figure 9:
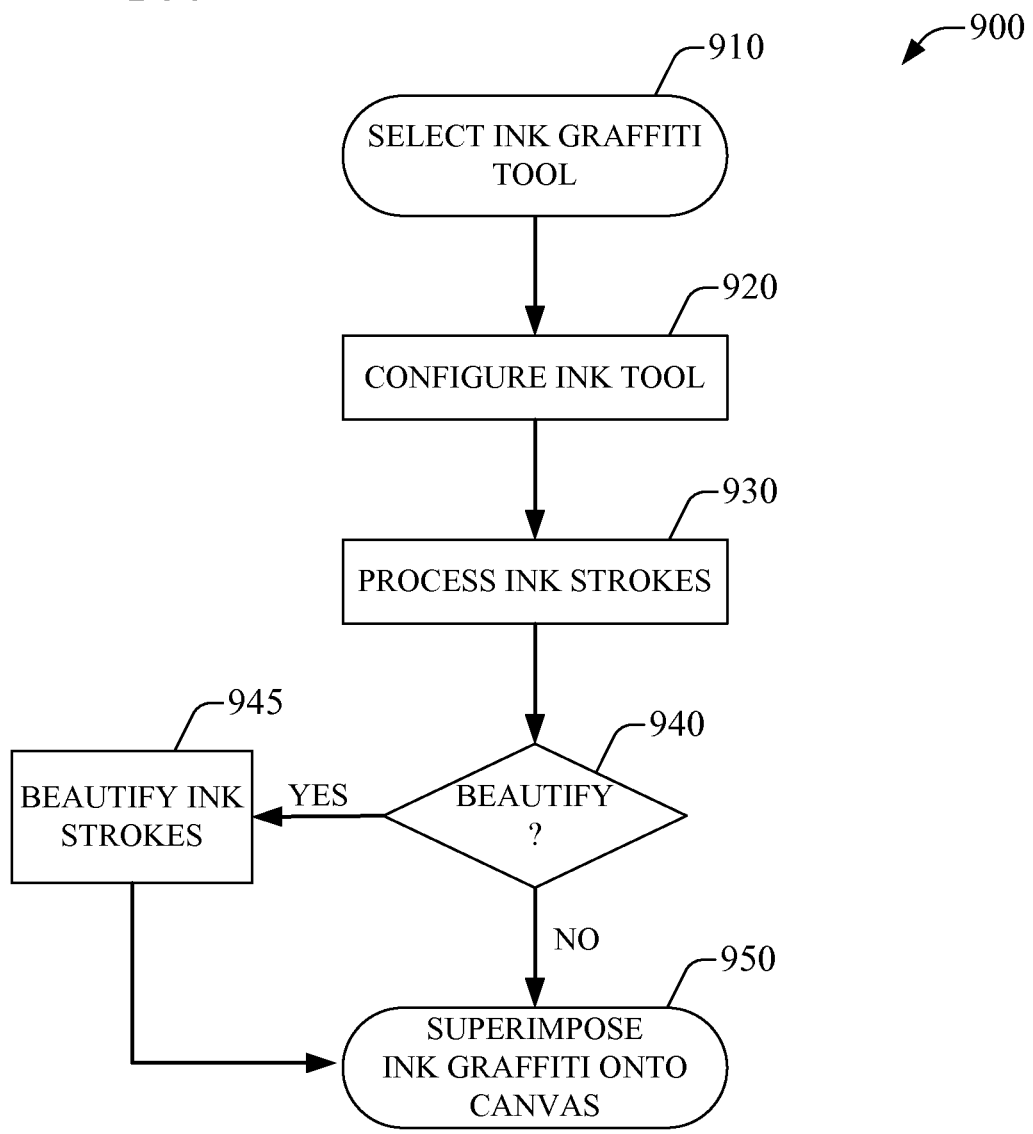
FIG. 9 is a flow diagram illustrating an exemplary methodology for utilizing an ink graffiti tool according to an embodiment.

Referring next to FIG. 9, a flow diagram illustrates an exemplary methodology for utilizing an ink graffiti tool according to an embodiment. As stated previously, digital graffiti generated via an ink graffiti tool may include a two-dimensional tracing of strokes undergone by device 700. Moreover, a user may utilize the ink graffiti tool to create two-dimensional freehand images corresponding to an in-air path undertaken by device 700 (e.g., motioning device 700 in a path that traces letters corresponding to the word "hello", a path that traces an outline of a "happy face", etc.). Here, although a two-dimensional tracing is described, it should be appreciated that another embodiment may include a three-dimensional tracing of strokes undergone by device 700, wherein the three-dimensional tracing is saved as a three-dimensional digital graffiti object.

As illustrated, process 900 begins at step 910 by selecting the ink graffiti tool. In an embodiment, the ink graffiti tool is configurable to output graffiti in any of a plurality of styles. For instance, at step 920, a user may configure the ink tool settings to trace a "graffiti path" with any of a plurality of colors (e.g., black, blue, red, etc.), patterns (e.g., solid, dashed, dotted, etc.), and/or line thicknesses. Here, although a user may manually select the desired ink tool settings, the network system may also include a set of pre-programmed default settings (set by the user and/or the manufacturer).

At step 930, process 900 continues with the processing of strokes undergone by device 700. In an embodiment, device 700 may include a "continuity button," which a user may utilize to discontinue particular ink strokes within a given graffiti session. With respect to drawing alphanumeric characters, such a button is particularly desirable since multiple distinct strokes are often preferred. For instance, if a user desires to draw the letter "T", a first stroke (e.g., a stroke that is substantially vertical) may be separated from a second stroke (e.g., a stroke that is substantially horizontal) by releasing the continuity button between the two strokes.

In an embodiment, device 700 may also include a beautification component for performing a beautification of graffiti generated by the ink tool. Namely, because an exact free hand version of a user's graffiti may be aesthetically undesirable, a beautification component may warp/replace such undesirable portions of the user's graffiti. For instance, the beautification component may analyze data corresponding to the graffiti generated at step 930 (e.g., an image of the graffiti, temporal/sequential information about the strokes, etc.) to identify/infer portions to modify (e.g., identifying/inferring that the user drew a "happy face" and replacing the free hand version with a computerized version). Accordingly, process 900 may include a determination, at step 940, of whether to beautify portions of the user's graffiti. If beautification is indeed desired and possible, process 900 proceeds with a beautification of the user's graffiti at step 945 followed by a superimposition of the beautified graffiti onto an appropriate digital canvas at step 950. However, if at step 940 it is determined that a beautification will not occur, process 900 proceeds directly to step 950 where the user's un-beautified graffiti is superimposed onto an appropriate digital canvas.

Figure 10:
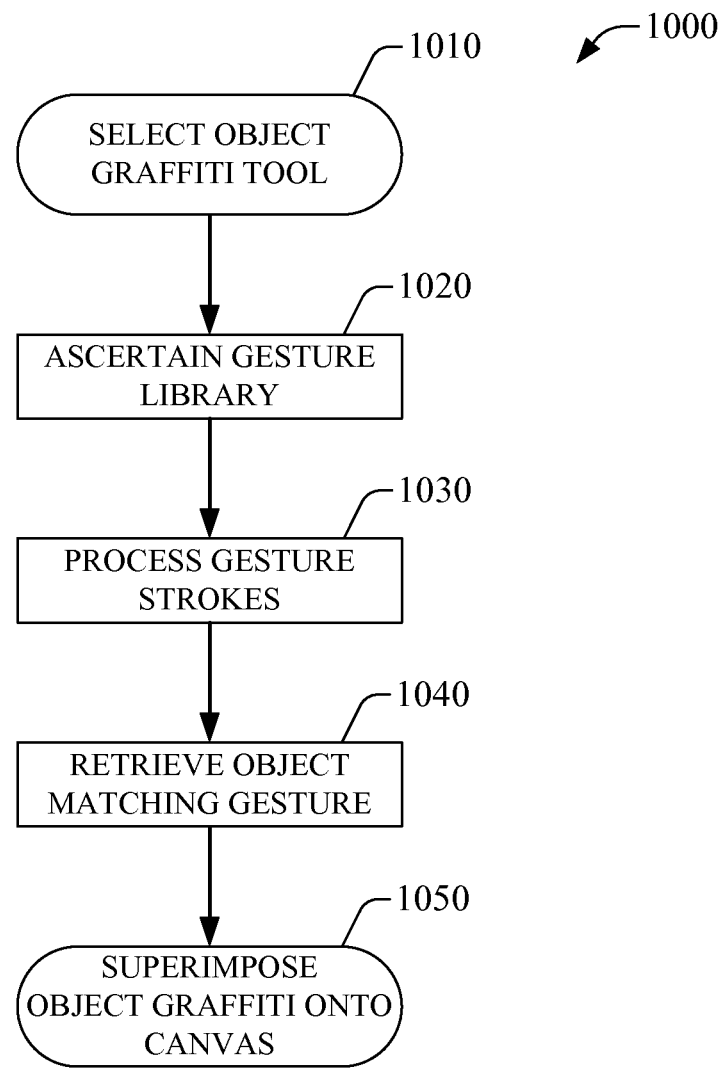
FIG. 10 is a flow diagram illustrating an exemplary methodology for utilizing an object graffiti tool according to an embodiment.

Referring next to FIG. 10, a flow diagram illustrates an exemplary methodology for utilizing an object graffiti tool according to an embodiment. As stated previously, digital graffiti generated via an object graffiti tool may include a saved digital image corresponding to a particular stroke sequence undergone by device 700. Moreover, a user may utilize the object graffiti tool as a short cut to access any of a plurality of images stored either locally or externally (e.g., a generic "happy face" image stored locally on device 700, a photo stored on the network system, etc.).

As illustrated, process 1000 begins at step 1010 by selecting the object graffiti tool. In an embodiment, the object graffiti tool may have access to any of a plurality of gesture libraries, wherein the same gesture may output a different image in a different library. For instance, in a first library, a circular gesture may correspond to a "happy face" image, whereas the same circular gesture may correspond to a particular photo in a second library. Accordingly, process 1000 includes ascertaining an appropriate gesture library at step 1020.

Process 1000 then continues at step 1030 with a processing of the gesture strokes undergone by device 700. Here, as discussed with respect to process 900, device 700 may include a continuity button, which a user may utilize to discontinue particular strokes of a gesture. Indeed, since more gestures are definable with multiple distinct strokes than with single continuous strokes, including a continuity button to device 700 desirably increases the number of images accessible to the object tool.

At step 1040, process 1000 proceeds by retrieving the image corresponding to the gesture performed by device 700. Here, as stated previously, such an image may reside in a gesture library either within device 700, within the network system, and/or within a third party entity. Upon retrieving the desired image, process 1000 proceeds by superimposing the image onto an appropriate digital canvas at step 1050.

Figure 11:
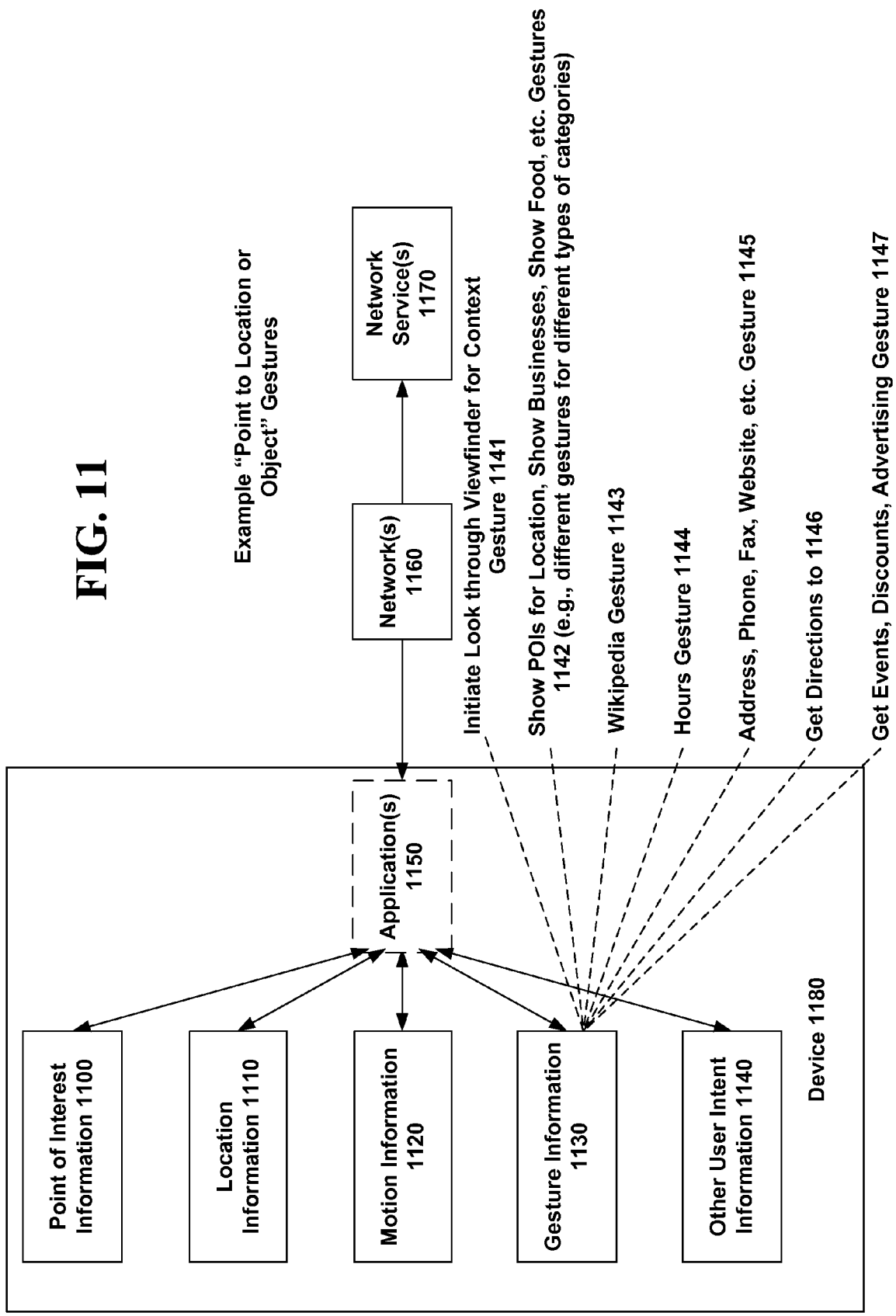
FIG. 11 illustrates that a variety of pre-defined gestures can be designed to represent gestures in a general environment having items or points of interest, or locations, that can be pointed at or to by a device.

Referring next to FIG. 11, a block diagram of a device 1180 illustrates an exemplary embodiment of a variety of gesture-based actions that device 1180 may undertake. Within such embodiment, these actions are based on any of point of interest information 1100, location information 1110, motion information 1120, gesture information 1130 or other user intent information 1140 brokered by the device 1180 to network services 1170 via networks 1160, and optionally via applications 1150.

More specifically, FIG. 11 illustrates that a variety of pre-defined gestures can be designed to represent gestures in a general environment having items or points of interest, or locations, that can be pointed at or to by a device 1180. As illustrated, such gestures may include a gesture requesting to analyze the image content of a viewfinder for context 1141, as well as gestures to show particular POIs 1142 (i.e., different gestures for different types of categories). In an aspect, device 1180 may also undertake a Wikipedia gesture 1143 (e.g., to bring up Wikipedia knowledge regarding the given POI based on an associated keyword), as well as an hours gesture 1144 (e.g., to bring up current status and/or when the POI maintains business hours). Other exemplary gestures that device 1180 may undertake include a gesture to request information about a POI 1145 (e.g., to request an address, phone, fax, website, etc.), a gesture to request directions to a POI 1146, and a gesture to retrieve events, discounts, and/or advertising associated with a POI 1147.

Figure 12:
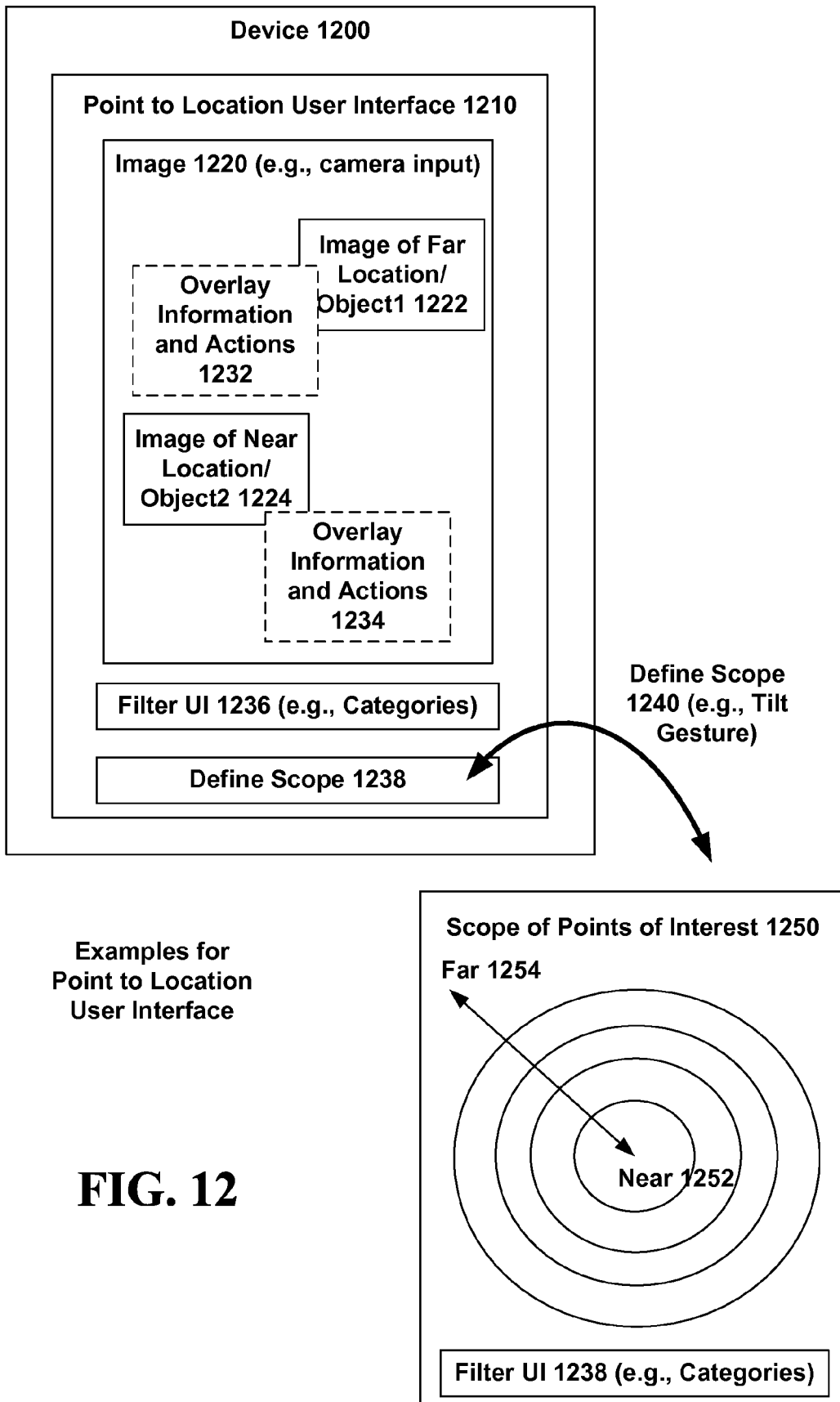
FIG. 12 is a block diagram providing a non-limiting implementation for a point to location user interface for a device.

In FIG. 12, a block diagram provides a non-limiting implementation for a point to location user interface 1210 for a device 1200. In an embodiment, the point to location user interface 1210 includes an image section 1220 (e.g., input from a camera included with the device 1200), wherein various POIs 1222, 1224, etc. in the scene are identifiable. For instance, overlay information and actions 1232, 1234 can be displayed over or near the POIs 1222, 1224, respectively (exemplary non-limiting locations for overlay shown). Filter UI 1236 allows a user of the device 1200 to filter the kinds or types of POIs within the image section 1220. A gesture or other explicit input can also define the scope of POIs shown in the image section 1220 (e.g., the scope of POIs in terms of distance from the device 1200).

In an aspect, UI 1250 displays a scope of points of interest according to a user-defined scope definition 1240 in which the user selects a degree of scope ranging between near 1252 and far 1254. Similarly, device 1200 may include an elevation scope implementation to capture towering POIs (e.g., buildings, mountains, lighthouses, etc.). For this particular example, POI 1222 is far whereas POI 1224 is near, and so depending on how the gesture or input is made, one or the other POI may be selected based on the scope of POIs. In one embodiment, a tilt gesture achieves the desired effect. For instance, tilting the viewfinder of a camera up may extend the scope outwards, whereas tilting toward the ground may retract the scope inwards. A user may also pre-define unique gestures via a gesture definition application that helps users customize gestures.

Figure 13:
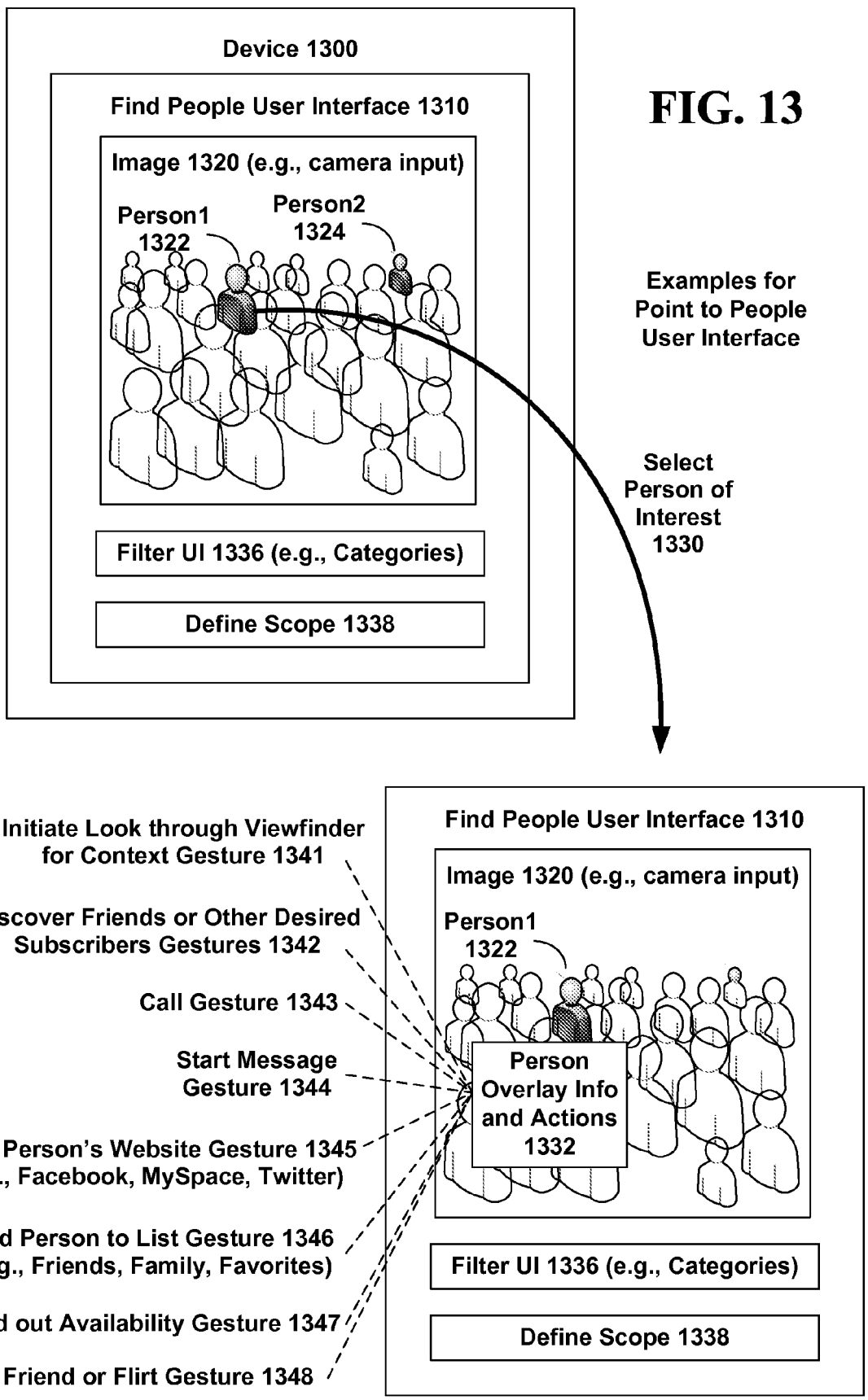
FIG. 13 is a block diagram providing a non-limiting implementation for a point to people user interface for a device.

Referring next to FIG. 13, a block diagram provides a non-limiting implementation for a point to people user interface 1310 for a device 1300. In this regard, user interface 1310 includes an image section 1320 (e.g., camera input), whereby a first person of interest 1322 and second person of interest 1324 are illustrated for simplicity of example in a crowd of people. Here again, a filter UI 1336 is used to sort categories and a scope definition UI 1338 is used to help define the scope of physical space encompassed by the POI discovery. In the present example, a gesture towards a given person could initiate an action or interaction in relation to that user. In so doing, a selection of a person of interest, such as person of interest 1322, results in a display of overlay information and actions 1332 over or nearby the selected person of interest.

Upon selecting a person, a user can initiate various actions by performing any of a plurality of pre-defined or user-defined gestures. For instance, a user may initiate a "look through viewfinder for context" application by performing gesture 1341; a "discover friends or other desired subscribers" application by performing gesture 1342; a "call person" application by performing gesture 1343, a "start message" application by performing gesture 1344; a "view person's website" application by performing gesture 1345 (e.g., Facebook, MySpace, Twitter); an "add person to contact list" application by performing gesture 1346 (e.g., Friends, Family, Favorites); a "find out schedule availability" application by performing gesture 1347; and/or a "friend or flirt" application by performing gesture 1348 (e.g., make a heart shape in 2-D with the device with respect to a person).

Exemplary Digital Graffiti Implementations

One of ordinary skill will appreciate that a user may create digital graffiti of various styles and forms. One of ordinary skill will also appreciate that the subsequent superimposition of such digital graffiti onto a digital canvas can include any of various types of digital canvasses. To facilitate a better understanding of the numerous potential digital graffiti implementations, the following discussion describes various non-limiting embodiments illustrating exemplary combinations of different forms of digital graffiti and different types of digital canvasses.

Figure 14:
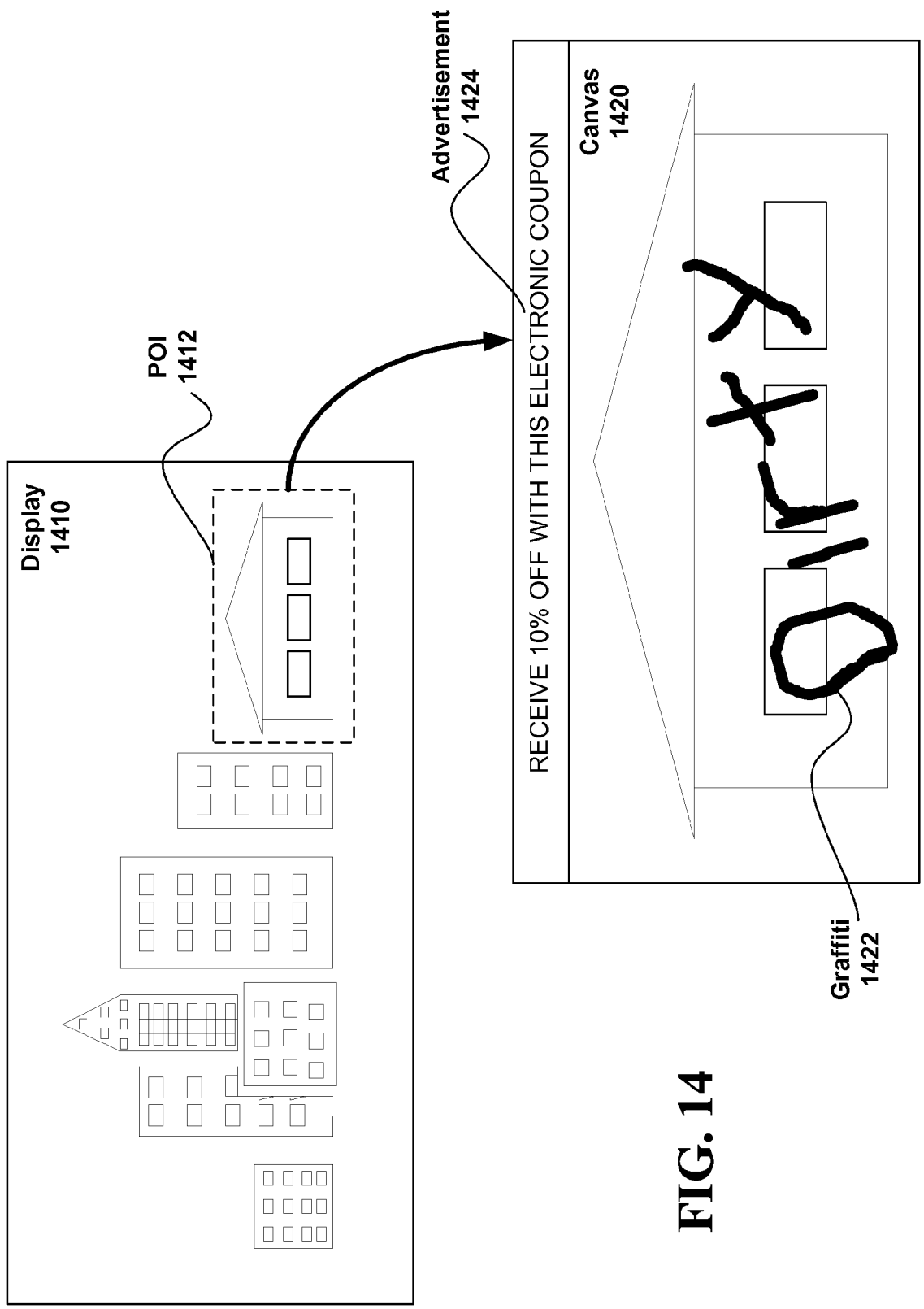
FIG. 14 illustrates an exemplary utilization of an ink tool for superimposing free-hand digital graffiti onto a photographic digital canvas corresponding to a stationary entity.

Referring first to FIGS. 14-17, exemplary implementations include digital graffiti created within the context of a restaurant scenario. For instance, FIG. 14 illustrates an exemplary superimposition of free-hand digital graffiti 1422 onto a photographic digital canvas 1420 of a restaurant. Within such embodiment, a user may point the device towards an area that includes a particular restaurant, wherein the device displays the restaurant as a point of interest 1412 within the device's display 1410. As stated previously, point of interest 1412 is ascertainable in any of a plurality of ways. For example, ascertaining point of interest 1412 may result from the device sensing a signal emanating from the restaurant and/or processing device-specific information (e.g., any combination of the device's direction information, motion information, and position information).

In various embodiments, a derivation of photographic digital canvas 1420 utilizes a photo originating from any of a plurality of locations. For instance, in a first embodiment, digital canvas 1420 may originate from a photo provided by the restaurant, wherein the device receives the digital canvas 1420 directly from a signal emanating from the restaurant. In another embodiment, digital canvas 1420 originates from an external entity accessible via a network (e.g., the network system and/or a site maintained by the restaurant). In yet another embodiment, a user may simply take a photo of the restaurant, wherein the photo itself serves as digital canvas 1420.

In an aspect, the graffiti network system may insert any of various types of digital advertisements 1424 onto digital canvas 1420. For this particular embodiment, an advertisement specific to the restaurant is shown (i.e., "RECEIVE 10% OFF WITH THIS ELECTRONIC COUPON"), wherein such advertisement may have been retrieved as a function of the device's location and/or orientation (e.g., if the network system utilized the device's location and direction information to determine that the device was pointing at the restaurant).

Figure 15:
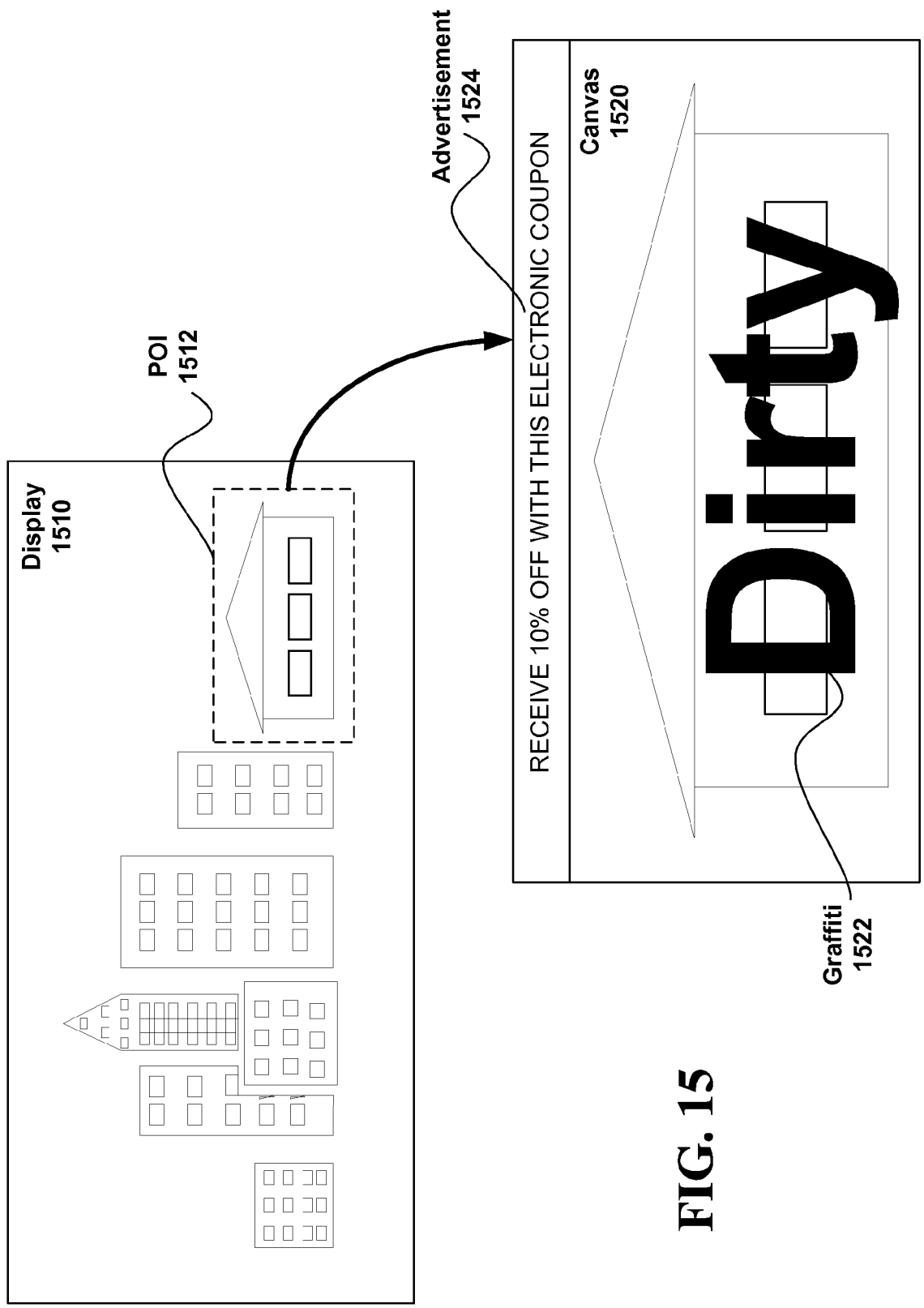
FIG. 15 illustrates an exemplary beautification of the free-hand digital graffiti of FIG. 14.

As stated previously, a user may utilize any of various tools to create digital graffiti. For instance, an unsatisfied customer of the restaurant may utilize an ink graffiti tool to superimpose the word "DIRTY" as free-hand graffiti 1422 onto digital canvas 1420, as shown in FIG. 14. FIG. 15 illustrates an exemplary beautification 1522 of free-hand graffiti 1422, wherein the graffiti network system superimposes beautification 1522 onto digital canvas 1520.

Figure 16:
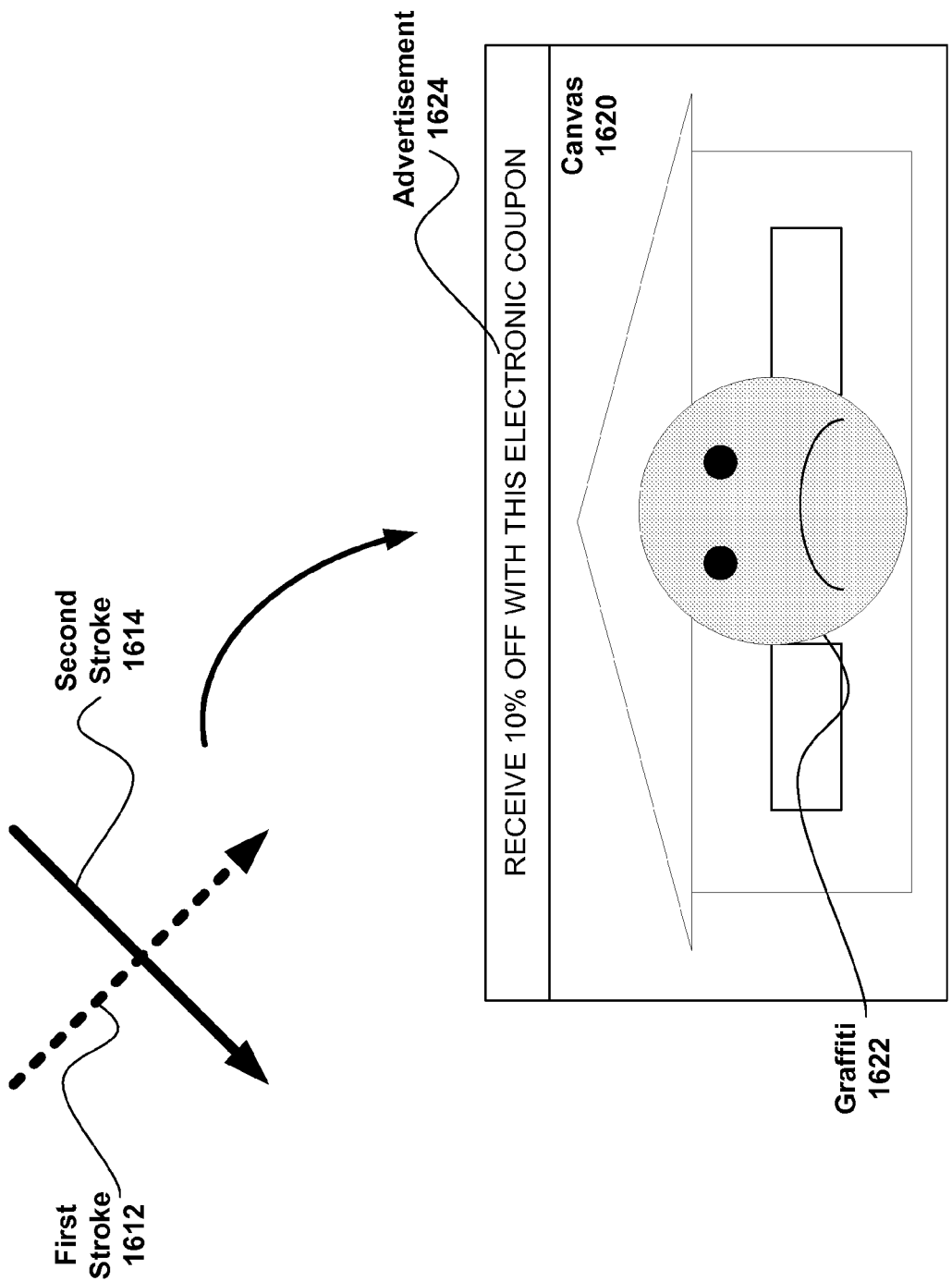
FIG. 16 illustrates an exemplary utilization of an object tool for superimposing a generic digital graffiti object onto a photographic digital canvas corresponding to a stationary entity.

In another embodiment, a user may utilize an object graffiti tool to retrieve any of a plurality of generic images stored either locally or externally. Moreover, a user may access generic images stored within an internal/external library by performing particular gestures. For instance, as illustrated in FIG. 16, the customer may superimpose a generic image 1622 of a "sad face" onto digital canvas 1620. To retrieve generic image 1622, the user may have to perform a particular library-specific gesture corresponding to generic image 1622. For example, as shown in FIG. 16, such a gesture may include a first stroke 1612 in a substantially southeast direction followed by a second stroke 1614 in a substantially southwest direction. Here, as stated previously, a user may utilize a continuity button to provide a "path break" between stroke 1612 and stroke 1614.

Figure 17:
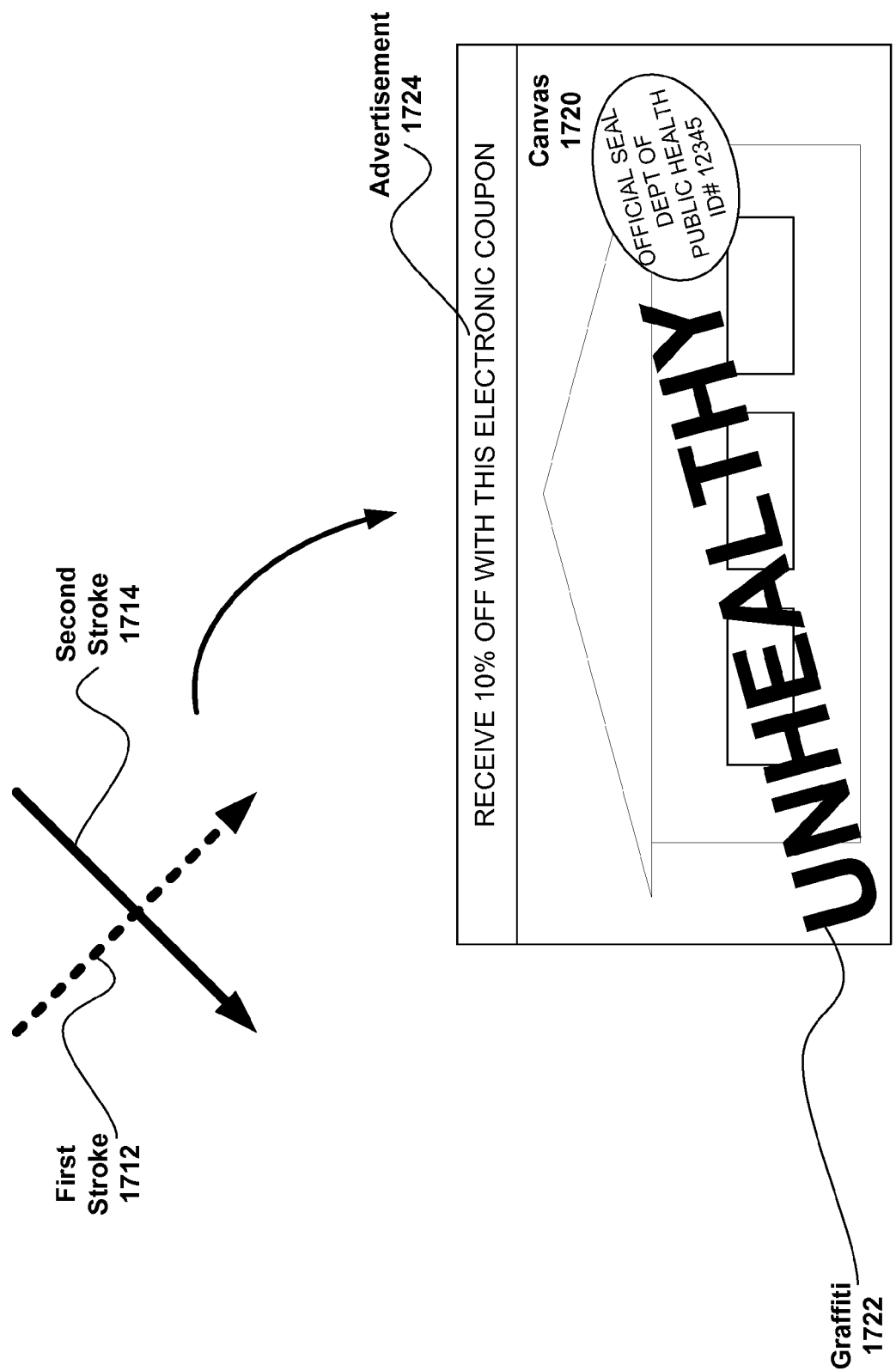
FIG. 17 illustrates an exemplary utilization of an object tool for superimposing a custom digital graffiti object onto a photographic digital canvas corresponding to a stationary entity.

In yet another embodiment, a user may utilize the object graffiti tool to retrieve any of a plurality of customized images, which are also stored either locally or externally. FIG. 17, for example, exemplifies a scenario whereby a health inspector visits an unsanitary restaurant. In this scenario, it may be desirable for the health inspector to generate graffiti that is unique and readily distinguishable from graffiti generated by other users. To facilitate generating such graffiti, the health inspector may be given secure access to a library of authenticated images (e.g., images with an official seal), wherein each image is retrievable via a unique gesture. For instance, retrieving graffiti 1722 corresponding to an authenticated "UNHEALTHY" assessment by the health inspector may require performing a unique gesture that superimposes graffiti 1722 onto digital canvas 1720. As illustrated, such unique gesture may include a first stroke 1712 in a substantially southeast direction followed by a second stroke 1714 in a substantially southwest direction. Here, although strokes 1712 and 1714 are essentially the same as strokes 1612 and 1614, the respective outputs from these gestures are differentiable if different libraries are used. For example, whereas strokes 1612 and 1614 may correspond to a "sad face" stored locally, strokes 1712 and 1714 may correspond to an "official sealed assessment" stored externally on a secure site (e.g., the graffiti network system and/or a site maintained by the Health Department).

In an aspect, a user may save and/or transmit graffiti 1422, 1522, 1622, and/or 1722. Here, one of ordinary skill will appreciate that such graffiti can be saved and/or transmitted with or without a particular digital canvas. Indeed, because it may sometimes be desirable to superimpose graffiti onto different digital canvasses, a user may wish to save such graffiti without a particular canvas. One of ordinary skill will further appreciate that saved graffiti may also include metadata for the graffiti (e.g., authorship information, date of creation, hyperlink to user's website, audio, etc.).

Figure 18:
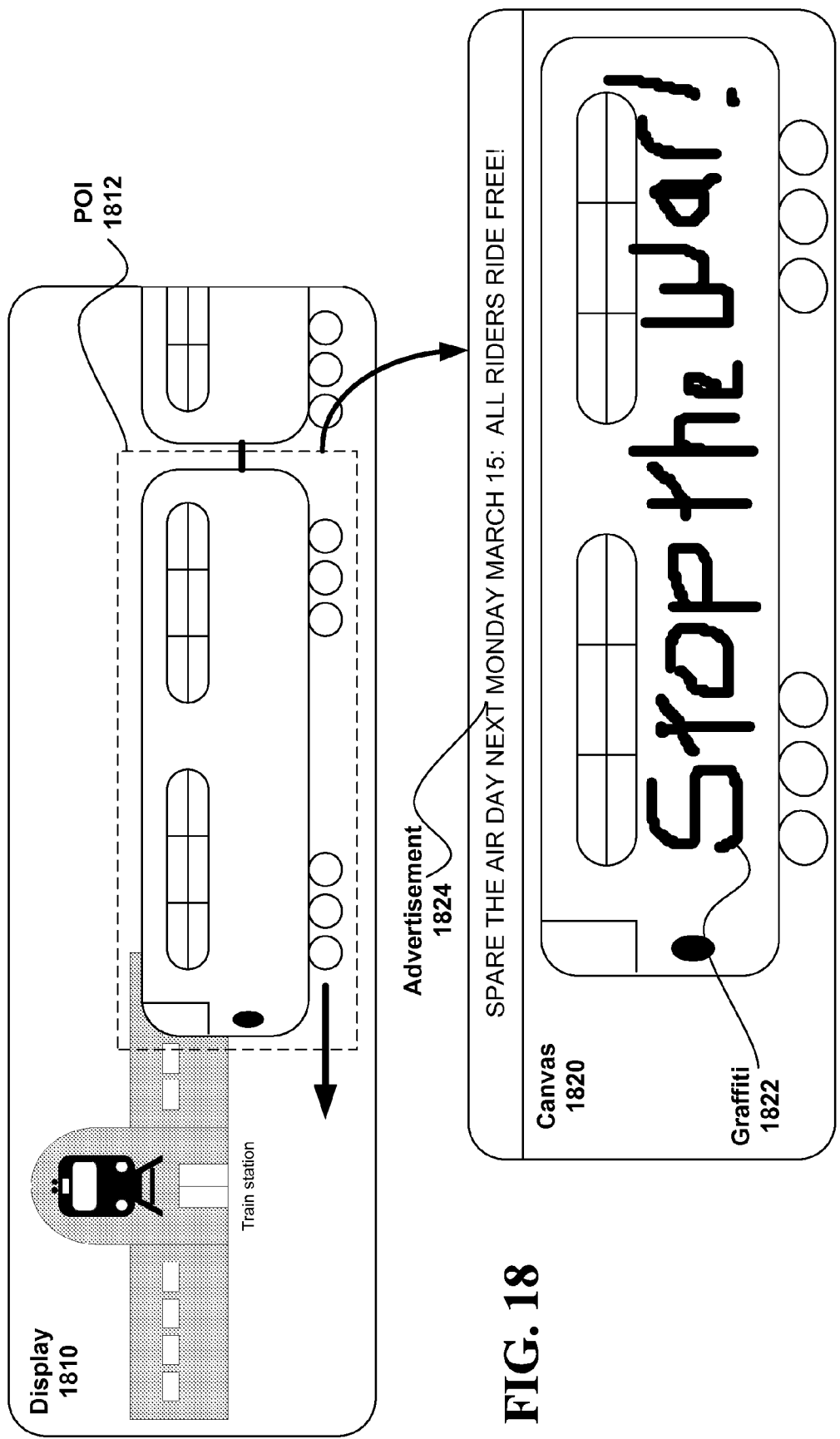
FIG. 18 illustrates an exemplary utilization of an ink tool for superimposing free-hand digital graffiti onto a photographic digital canvas corresponding to a mobile entity.

Referring next to FIGS. 18-21, exemplary implementations include superimposing digital graffiti onto a digital canvas corresponding to a mobile object. For instance, FIG. 18 illustrates an exemplary superimposition of free-hand digital graffiti 1822 onto a photographic digital canvas 1820 of a train. Within such embodiment, a user may point the device towards an area that includes the train, wherein the device displays the train as a point of interest 1812 within the device's display 1810. For this particular example, similar to the aforementioned restaurant example, ascertaining point of interest 1812 may result from the device sensing a signal emanating from the train and/or processing device-specific information (e.g., any combination of the device's direction information, motion information, and position information).

In an aspect, photographic digital canvas 1820 is a "shared" canvas upon which any of a plurality of users may view and/or superimpose graffiti. For instance, a user's device may receive digital canvas 1820 (either directly from a signal emanating from the train and/or from a network entity that processes any combination of the device's location information, motion information, and/or direction information), wherein digital canvas 1820 already includes graffiti generated by a previous user. Accordingly, graffiti superimposed onto digital canvas 1820 may comprise an evolving collage of individual graffiti entries from different users. This collage of graffiti entries may thus "follow" the train wherever it goes, wherein the parameters of each graffiti entry may be managed by the canvas owner/administrator. For example, to ensure that graffiti space is always available, a city may configure digital canvas 1820 such that individual graffiti entries vanish after a pre-determined span of time and such that no entry exceeds a pre-determined dimensional threshold.

In an aspect, the graffiti network system may again insert any of various types of digital advertisements 1824 onto digital canvas 1820. For this particular embodiment, an advertisement specific to the train is shown (i.e., "SPARE THE AIR DAY NEXT MONDAY MARCH 15: ALL RIDERS RIDE FREE!"), wherein such advertisement may have been retrieved from a city website after inferring that the device was proximate to a train station. The graffiti network system may have inferred such proximity as a function of the device's location, for example.

Figure 19:
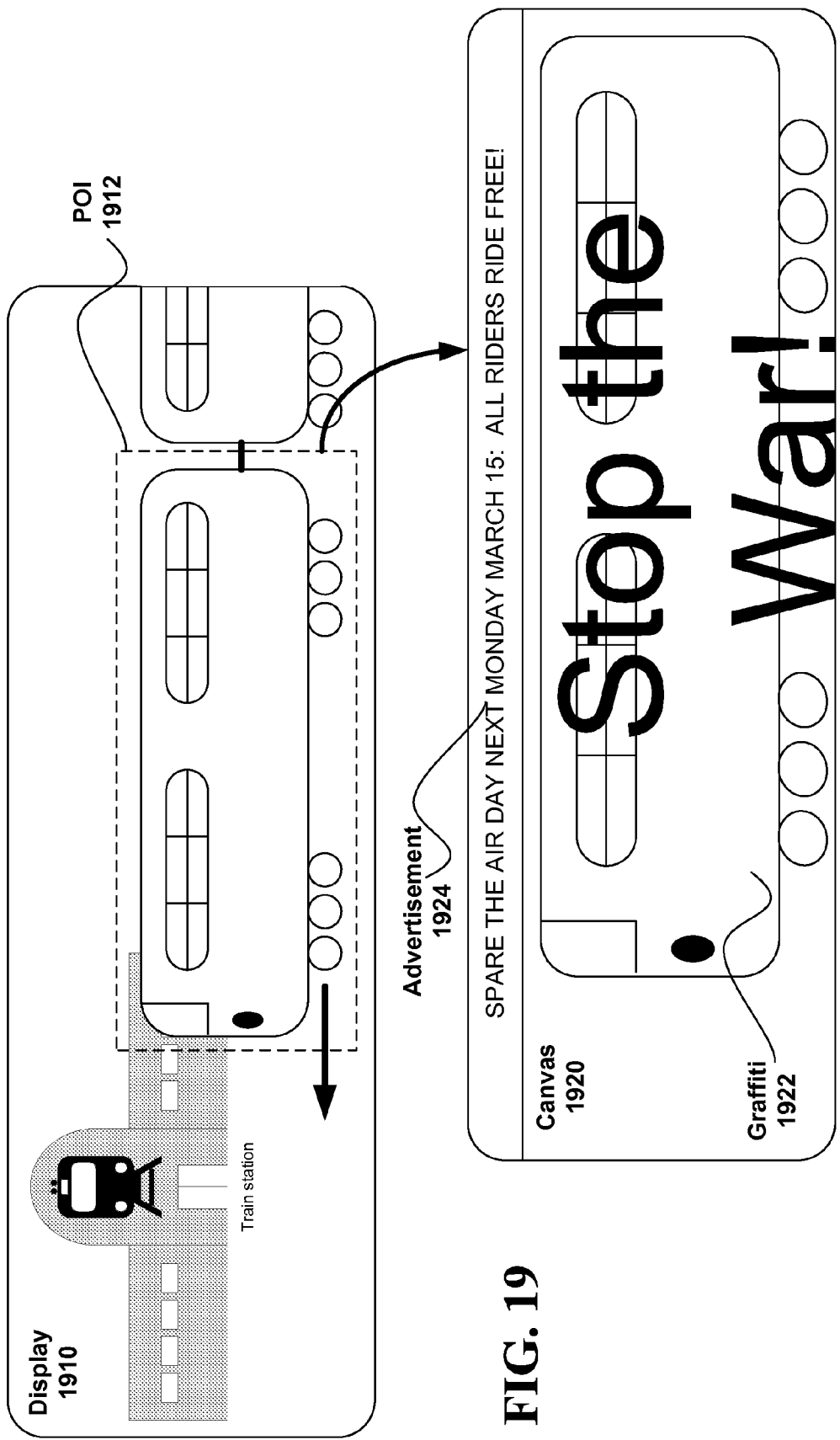
FIG. 19 illustrates an exemplary beautification of the free-hand digital graffiti of FIG. 18.

As stated previously, a user may again utilize any of various tools to create digital graffiti. For instance, an anti-war activist may utilize an ink graffiti tool to superimpose the phrase "STOP THE WAR!" as free-hand graffiti 1822 onto digital canvas 1820, as shown in FIG. 18. FIG. 19 illustrates an exemplary beautification 1922 of free-hand graffiti 1822, wherein the graffiti network system superimposes beautification 1922 onto digital canvas 1920. In an aspect, a user may toggle between any of a plurality of different fonts when utilizing the beautification feature (i.e., the font shown for beautification 1922 is interchangeable with other fonts).

Figure 20:
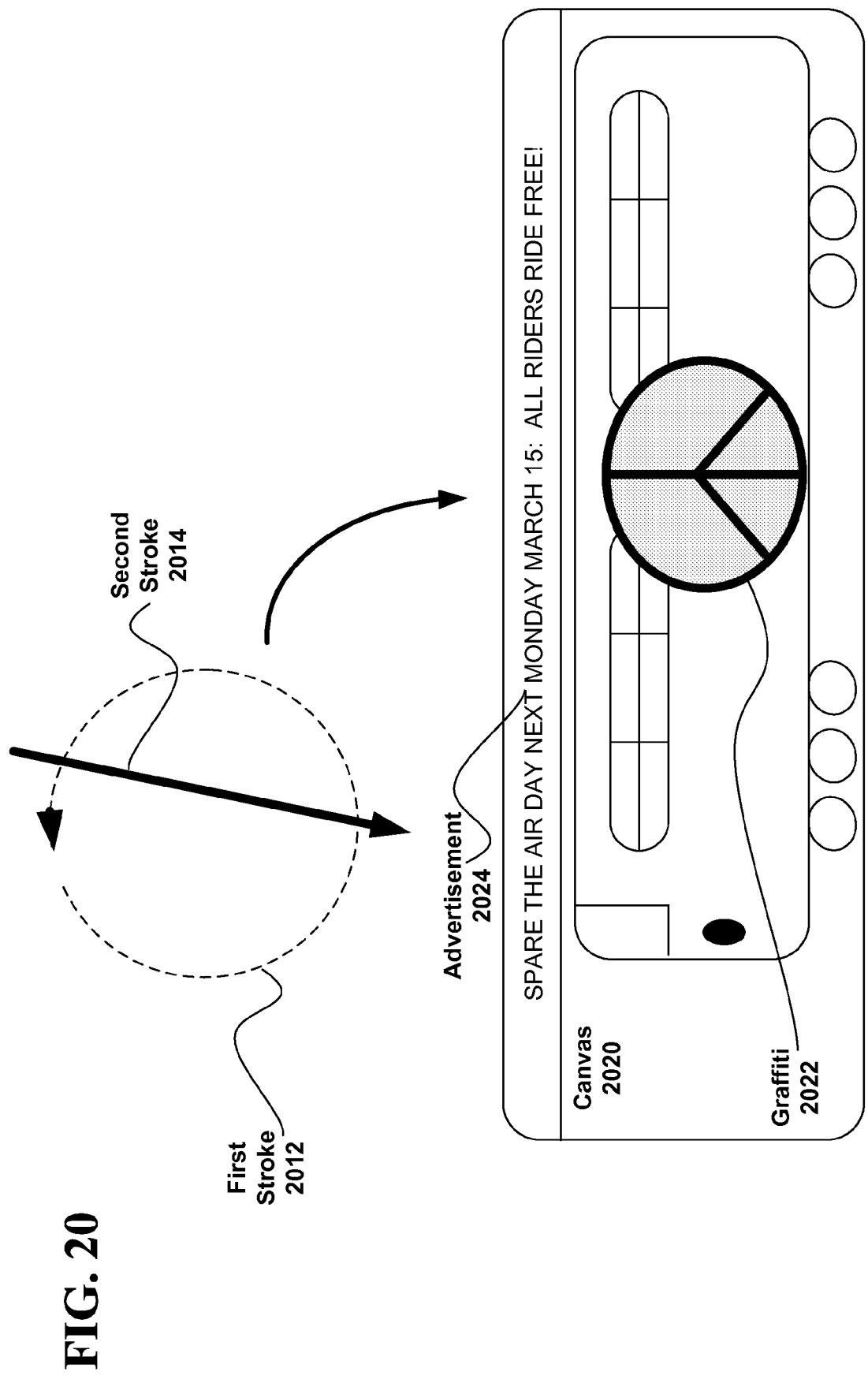
FIG. 20 illustrates an exemplary utilization of an object tool for superimposing a generic digital graffiti object onto a photographic digital canvas corresponding to a mobile entity.

As illustrated in FIG. 20, a user may also utilize an object graffiti tool to retrieve any of a plurality of generic images. For this particular example, the anti-war activist may superimpose a generic image 2022 of a "peace" sign onto digital canvas 2020. Within such embodiment, a user may retrieve generic image 2022 by performing a particular library-specific gesture corresponding to generic image 2022. For example, as shown in FIG. 20, such a gesture may include a first stroke 2012 in a substantially counterclockwise direction followed by a second stroke 2014 directed substantially downwards.

Referring next to FIG. 21, an exemplary illustration demonstrates how a user may utilize the object graffiti tool to retrieve a customized image. Here, prior to seeing a train, the anti-war activist may have already saved graffiti 2122 onto the network or his/her device. For instance, the anti-war activist may have spent a substantial amount of time developing graffiti 2122 at home with tools that are perhaps unavailable on the device. It should thus be appreciated that digital graffiti, as described herein, is not restricted to sensor-based graffiti generation. Here, for example, graffiti 2122 may take the form of a personalized banner created on a PC (i.e., independent of the sensor-based electronics of the mobile device) in which people leave comments/notes on that can either be discovered broadly or just shared amongst friends.

Once developed, the user might transfer graffiti 2122 onto a personal library on the device and/or network system, wherein a unique gesture superimposes graffiti 2122 onto digital canvas 2120. For this particular embodiment, the unique gesture corresponds to a single continuous stroke comprising two sub-strokes, 2112 and 2114 (i.e., no break between sub-strokes facilitated by a continuity button). Moreover, as illustrated, the unique gesture includes a first sub-stroke 2112 in a substantially southeast direction followed by a second sub-stroke 2114 in a substantially northeast direction.

Figure 22:
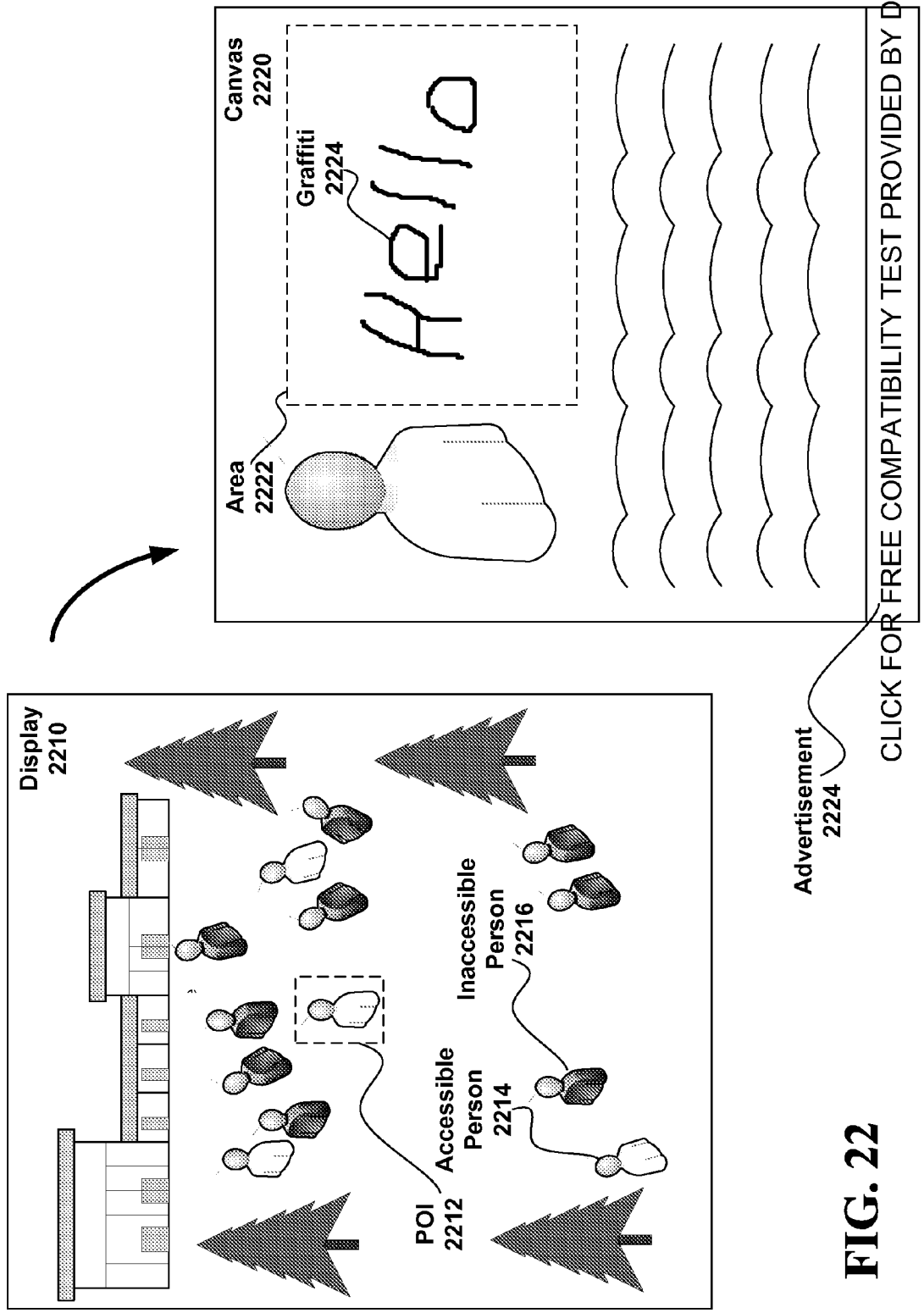
FIG. 22 illustrates an exemplary utilization of an ink tool for superimposing free-hand digital graffiti onto a canvas residing on an individual's digital profile.

Referring next to FIGS. 22-25, exemplary implementations include digital graffiti for interacting with people in a social setting. For instance, FIG. 22 illustrates an exemplary superimposition of free-hand graffiti 2224 onto a canvas 2220 corresponding to a target person's digital profile. To facilitate launching canvas 2220, a user may point the device towards an area that includes a plurality of accessible people 2214 (i.e., people with identifiable devices) and inaccessible people 2216 (i.e., people without identifiable devices). Here, as illustrated, the device may display any of accessible people 2214 as the target person 2212 within the device's display 2210. Similar to the aforementioned examples, ascertaining point of interest 2212 may result from the device sensing a signal emanating from the target person's device and/or processing information specific to the user's device (e.g., any combination of direction information, motion information, and position information from the user device).

For this particular embodiment, a graffiti area 2222 is included within canvas 2220. To this end, one of ordinary skill will appreciate that the derivation of digital canvas 2220 may occur in any of a plurality of locations. For instance, in a first embodiment, a user's device generates canvas 2220 upon receiving a target person's profile directly from the target person's device. In another embodiment, a target person's device generates digital canvas 2220 and emanates a signal that includes canvas 2220 to an area proximate to the target person's device. In yet another embodiment, an external entity accessible via a network stores a plurality of digital profiles and subsequently generates an appropriate canvas 2220 for a selected target person upon request (e.g., a digital profile stored on the graffiti network system and/or a social networking website).

As illustrated, this particular embodiment includes an advertisement 2224 specific to dating (i.e., "CLICK FOR FREE COMPATIBILITY TEST PROVIDED BY DATE-.COM"), wherein the graffiti network system superimposes advertisement 2224 onto digital canvas 2220, as shown. Here, such advertisement 2224 may have been retrieved from a third party website after learning that the user's device engaged with a target person's device. The graffiti network system may have received a signal from the user device indicating a communication with a target person's device, for example.

Figure 23:
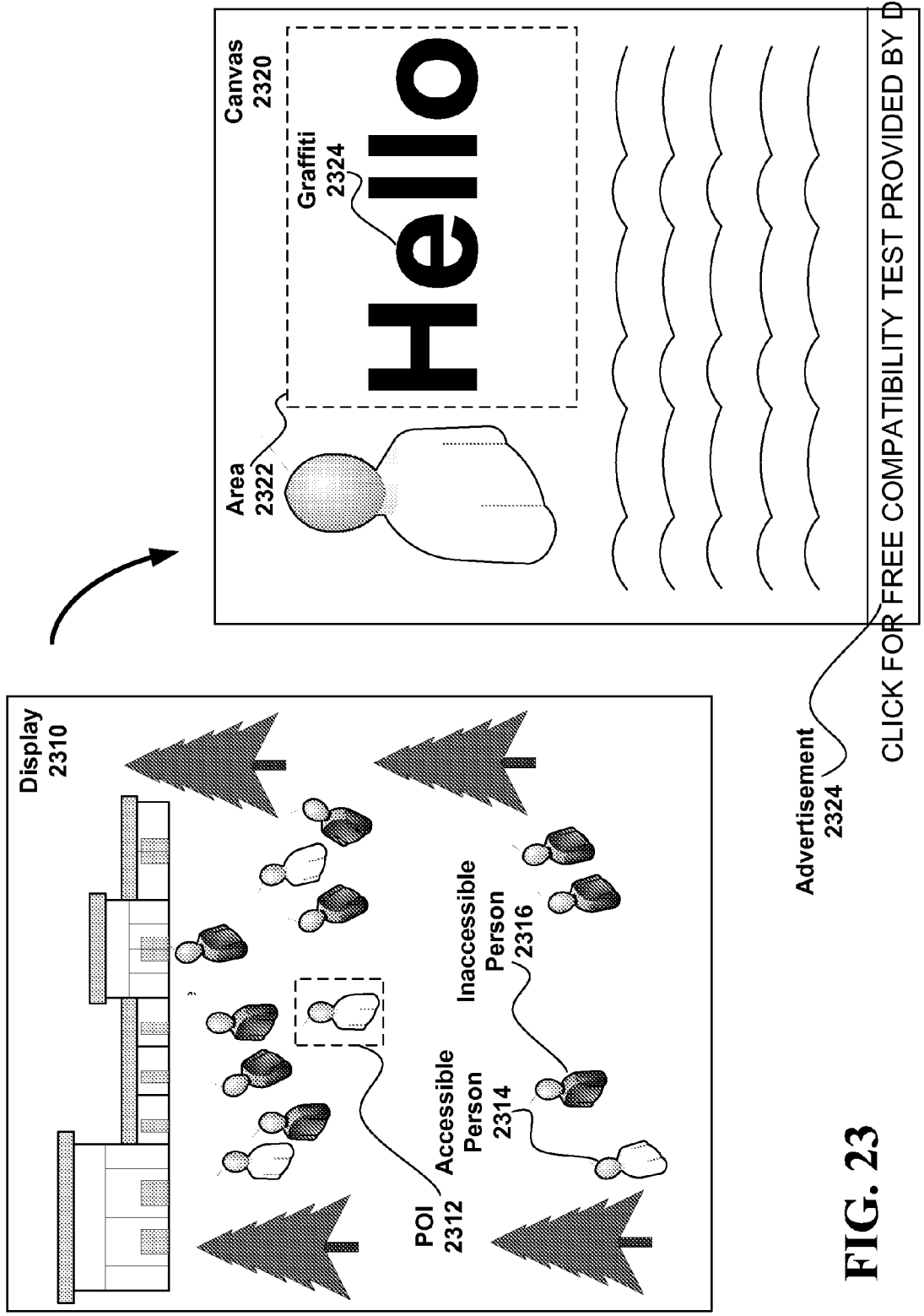
FIG. 23 illustrates an exemplary beautification of the free-hand digital graffiti of FIG. 22.

In an exemplary scenario, a user may wish to initiate a conversation with a target person. To facilitate such conversation, the user may create digital graffiti 2224 with an ink graffiti tool. For instance, a user may utilize the ink graffiti tool to superimpose the word "HELLO" as free-hand graffiti 2224 onto graffiti area 2222, as shown in FIG. 22. FIG. 23 illustrates an exemplary beautification 2024 of graffiti 2224, wherein canvas 2320 includes beautification 2324 superimposed on graffiti area 2322.

Figure 24:
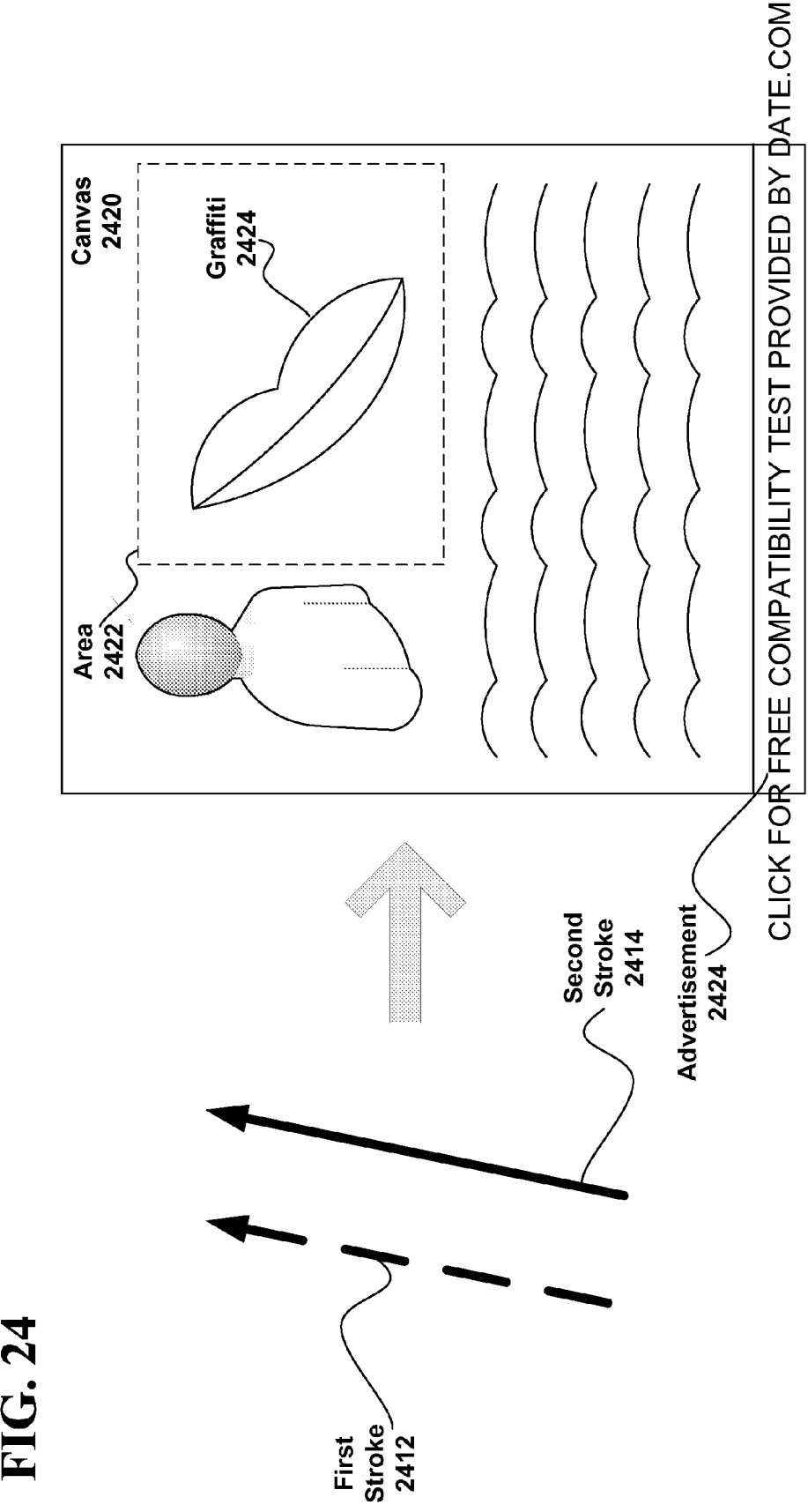
FIG. 24 illustrates an exemplary utilization of an object tool for superimposing a generic digital graffiti object onto a canvas residing on an individual's digital profile.

In a related scenario, a user may wish to flirt with a target person. To facilitate such flirtation, the user may create digital graffiti 2424 with an object graffiti tool, as illustrated in FIG. 24. For this particular example, the user may superimpose a generic image 2424 of a "kiss" onto graffiti area 2422 of digital canvas 2420. Within such embodiment, the user may retrieve generic image 2424 by performing a particular library-specific gesture corresponding to generic image 2424. For example, as shown in FIG. 24, such a gesture may include a first stroke 2412 in a substantially upward direction followed by a second stroke 2414 also directed substantially upwards.

Figure 25:
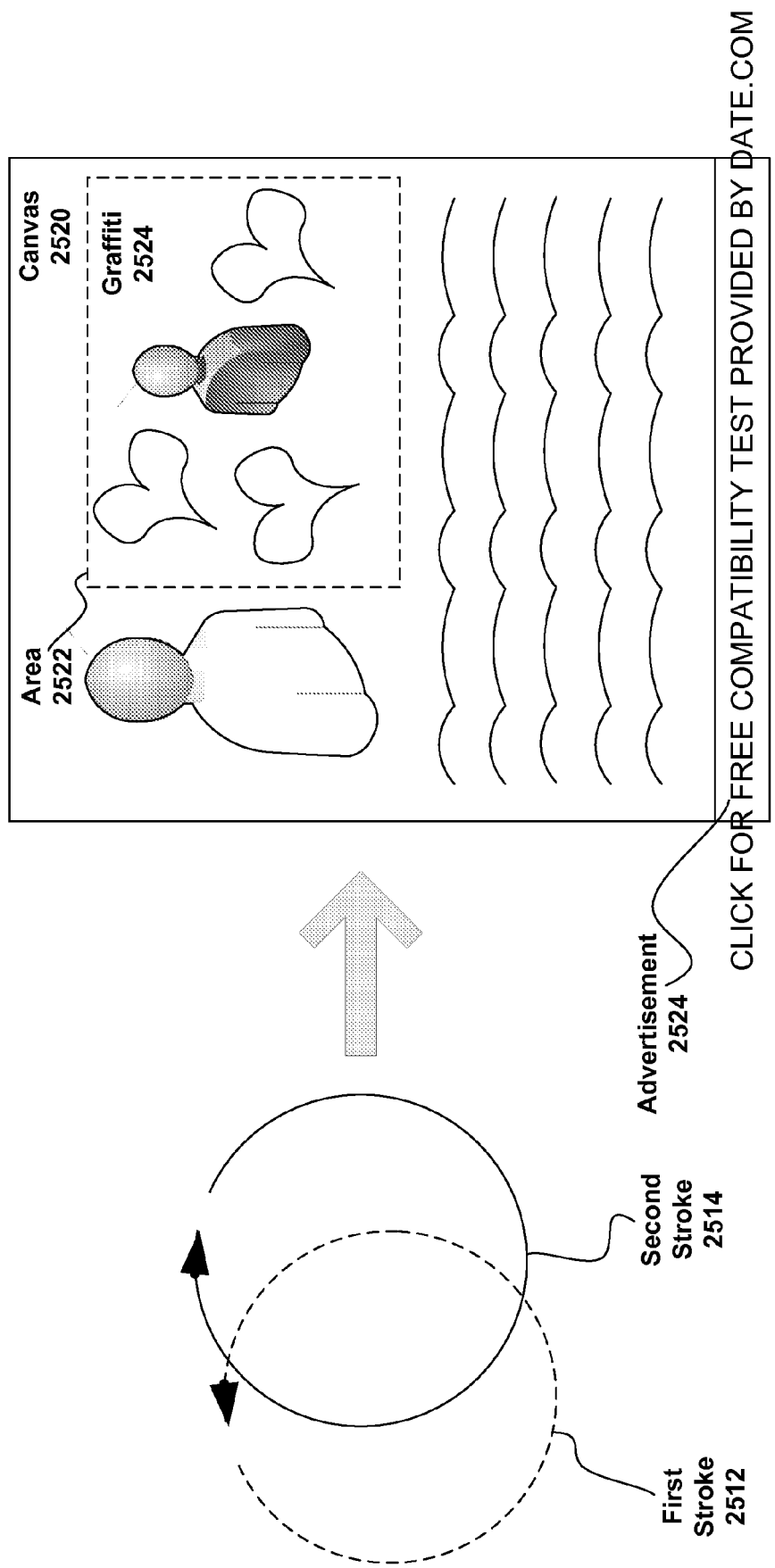
FIG. 25 illustrates an exemplary utilization of an object tool for superimposing a custom digital graffiti object onto a canvas residing on an individual's digital profile.

Referring next to FIG. 25, an exemplary illustration demonstrates how a user may utilize the object graffiti tool to retrieve a customized image. For this particular example, customized image 2524 includes a photo of the user surrounded with hearts, as shown. Here, the user might retrieve image 2524 from either a personal library on the user's device or an external library accessible via a network (e.g., a library residing on the graffiti network system and/or a third party site), wherein a unique gesture superimposes image 2524 onto area 2522 of canvas 2520. For this particular embodiment, the unique gesture includes a first stroke 2512 in a substantially counterclockwise direction followed by a second stroke 2514 directed in a substantially clockwise direction.

Figure 26:
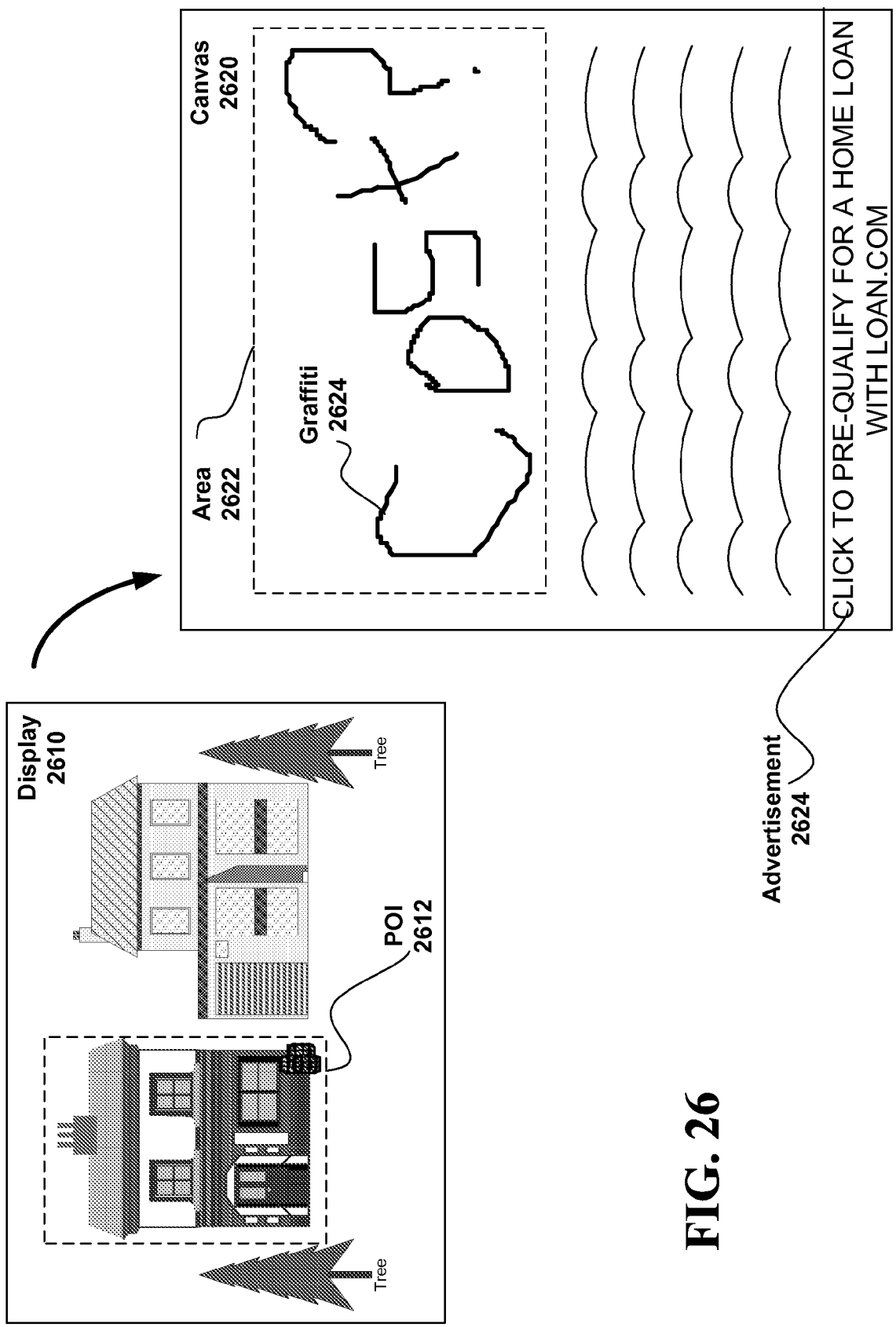
FIG. 26 illustrates an exemplary utilization of an ink tool for superimposing free-hand digital graffiti onto a canvas residing on a real estate property's digital profile.

Referring next to FIGS. 26-29, exemplary implementations include digital graffiti created within the context of purchasing real estate. For instance, FIG. 26 illustrates an exemplary superimposition of free-hand graffiti 2624 onto a canvas 2620 corresponding to a particular real estate property. To facilitate launching canvas 2620, a user may point the device towards a group of houses that includes a particular house of interest 2612 displayed within the device's display 2610.

One of ordinary skill will appreciate that the prospective buyer's device may identify house of interest 2612 in any of a plurality of ways. For instance, in an embodiment, a real estate agent may embed a transmitter that emanates identifiable information within house of interest 2612. For such embodiment, the prospective buyer's device may sense the emanated signal to identify house of interest 2612. In another embodiment, rather than embedding house of interest 2612 with a transmitter, the prospective buyer's device identifies house of interest 2612 as function of the device's direction information, motion information, and/or position information.

In an aspect, canvas 2620 is again ascertainable in any of plurality of ways, wherein graffiti area 2622 may be included, as shown. In a first embodiment, a prospective buyer's device generates canvas 2620 upon receiving purchase information via the embedded transmitter. In another embodiment, the embedded transmitter emanates a signal that includes canvas 2620 to an area proximate to house of interest 2612. In yet another embodiment, a centralized website may store a plurality of profiles for available properties, wherein the prospective buyer's device receives an appropriate canvas 2620 from the website upon request (e.g., a digital profile from a multiple listings service website).

As illustrated, this particular embodiment includes an advertisement 2624 specific to purchasing real estate (i.e., "CLICK TO PRE-QUALIFY FOR A HOME LOAN WITH LOAN.COM"), wherein the graffiti network system superimposes advertisement 2624 onto digital canvas 2620, as shown. Here, such advertisement 2624 may have been retrieved as a function of the particular digital canvas selected by the user device. For example, the graffiti network system may automatically insert particular advertisements upon retrieving particular digital canvasses.

Figure 27:
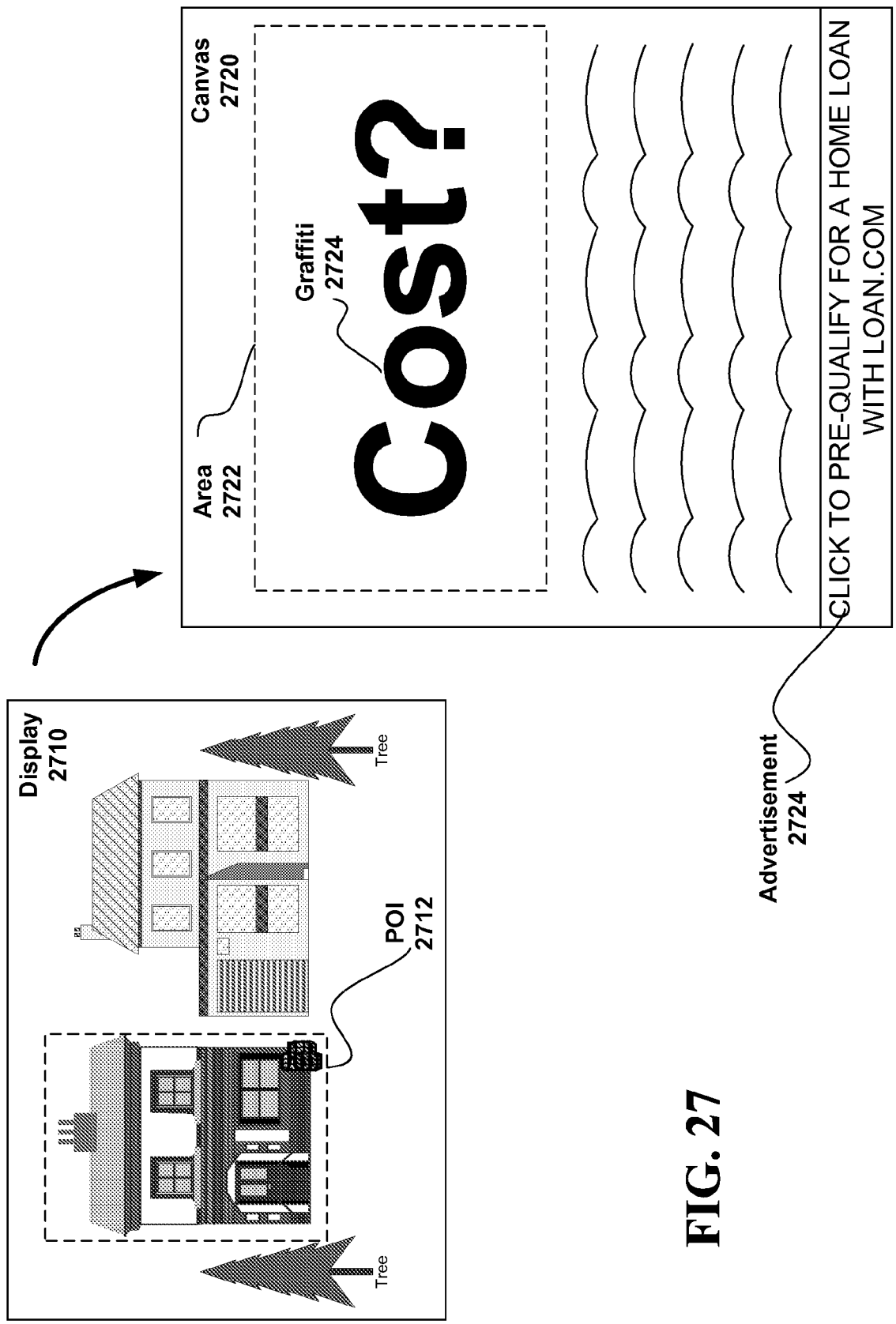
FIG. 27 illustrates an exemplary beautification of the free-hand digital graffiti of FIG. 26.

In an exemplary scenario, a user may wish to know the asking price for house of interest 2612. To facilitate such a query, the user may create digital graffiti 2624 with an ink graffiti tool. For instance, a user may utilize the ink graffiti tool to superimpose the phrase "COST?" as free-hand graffiti 2624 onto graffiti area 2622, as shown in FIG. 26. FIG. 27 illustrates an exemplary beautification 2724 of graffiti 2624, wherein canvas 2720 includes beautification 2724 superimposed on graffiti area 2722.

However, the prospective buyer may also create digital graffiti 2824 with an object graffiti tool, as illustrated in FIG. 28. For this particular example, the prospective buyer may superimpose a generic image 2824 which displays "$?" onto graffiti area 2822 of canvas 2820. Indeed, within such embodiment, a shortcut gesture corresponding to generic image 2824 may desirably provide the prospective buyer with a convenient alternative to performing a more tedious gesture with the ink graffiti tool. For example, as shown in FIG. 28, such a gesture may include a first stroke 2812 in a substantially downward direction followed by a second stroke 2814 also directed substantially downwards.

Figure 29:
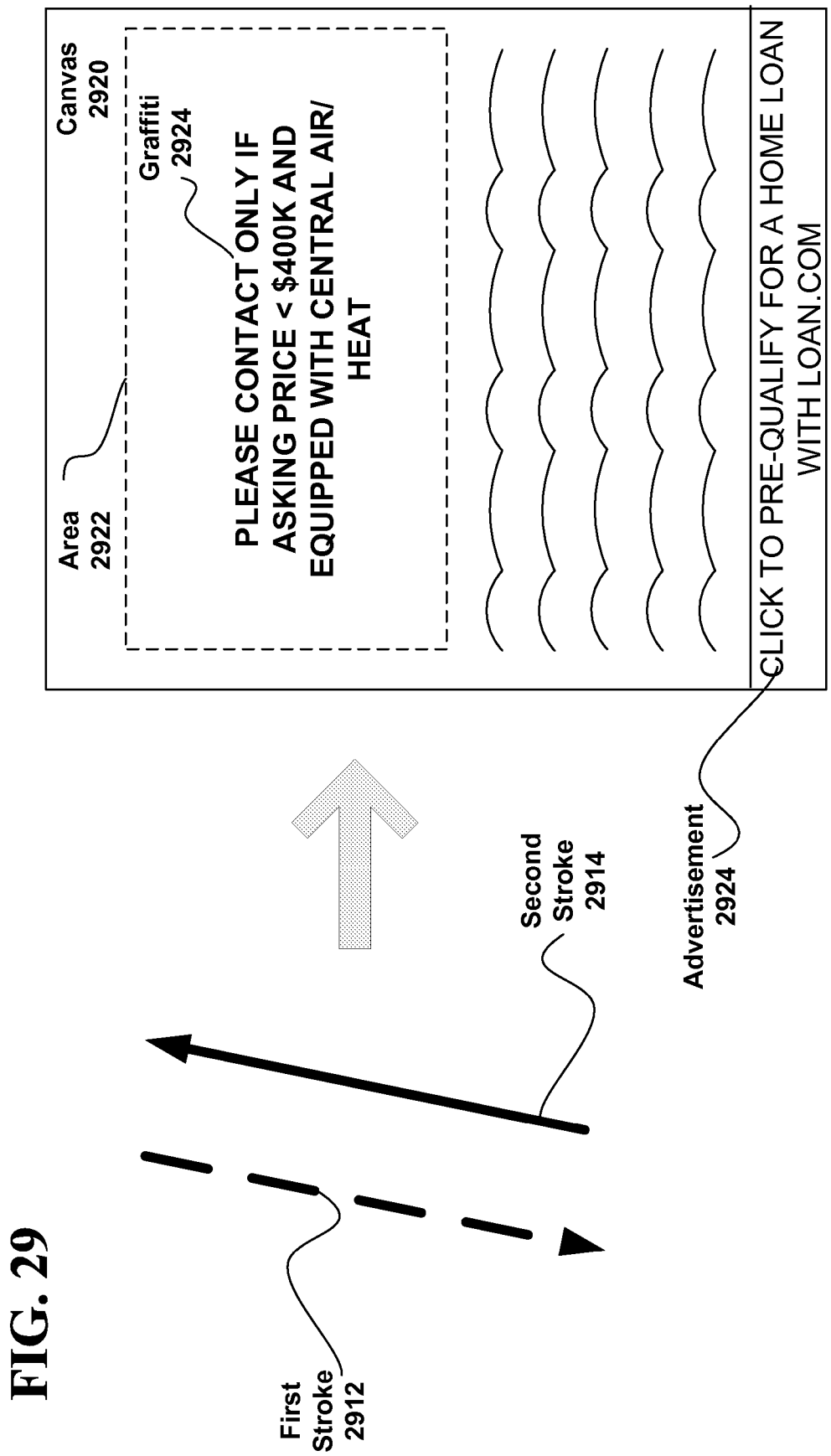
FIG. 29 illustrates an exemplary utilization of an object tool for superimposing a custom digital graffiti object onto a canvas residing on a real estate property's digital profile.

Referring next to FIG. 29, an exemplary illustration demonstrates how the prospective buyer may utilize the object graffiti tool to retrieve a customized image. For this particular example, customized image 2924 includes text specifying particular buyer-defined conditions (i.e., a request to only contact if the asking price is below $400,000 and only if the home is equipped with central air/heat). Similar to the aforementioned examples, the prospective buyer might retrieve image 2924 from either a personal library on the prospective buyer's device or an external library on a network (e.g., a library residing on the graffiti network system and/or a third party site), wherein a unique gesture superimposes image 2924 onto area 2922 of canvas 2920. For this particular embodiment, the unique gesture includes a first stroke 2912 in a substantially downward direction followed by a second stroke 2914 directed in a substantially upward direction.

Figure 30:
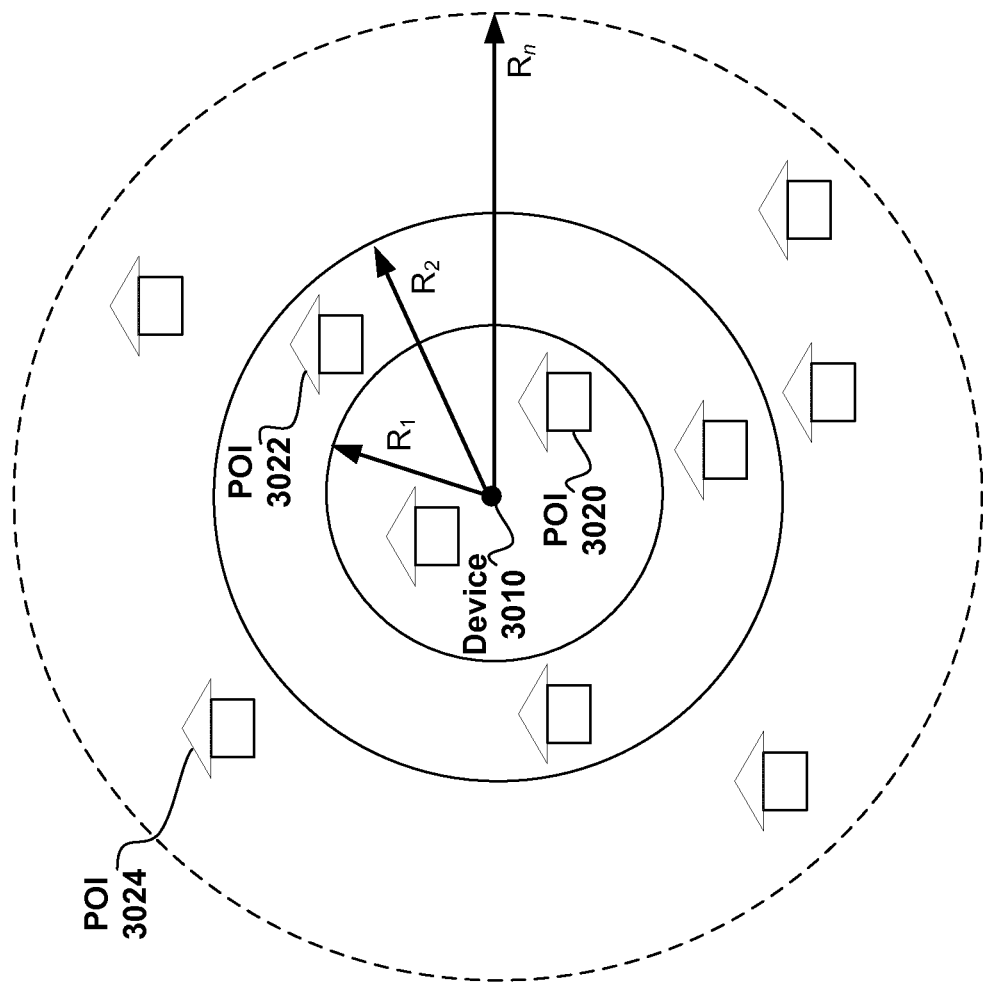
FIG. 30 is an exemplary diagram illustrating a plurality of potential points of interest proximate to a device.

It may sometimes be desirable to superimpose graffiti onto multiple canvasses. For instance, with respect to the real estate example above, it may be desirable make inquiries into multiple properties simultaneously. In FIG. 30, an exemplary diagram for facilitating such an inquiry illustrates a plurality of points of interest proximate to a device. Specifically, FIG. 30 illustrates a device 3010 surrounded by houses of interest 3020 within a first radius $R_1$, houses of interest 3022 within a second radius $R_2$, and houses of interest 3024 within a third radius $R_3$. To this end, an exemplary scenario is contemplated, wherein the prospective buyer fortuitously visits a desirable neighborhood and wishes to ascertain real estate information for all available properties within a particular radius.

Figure 31:
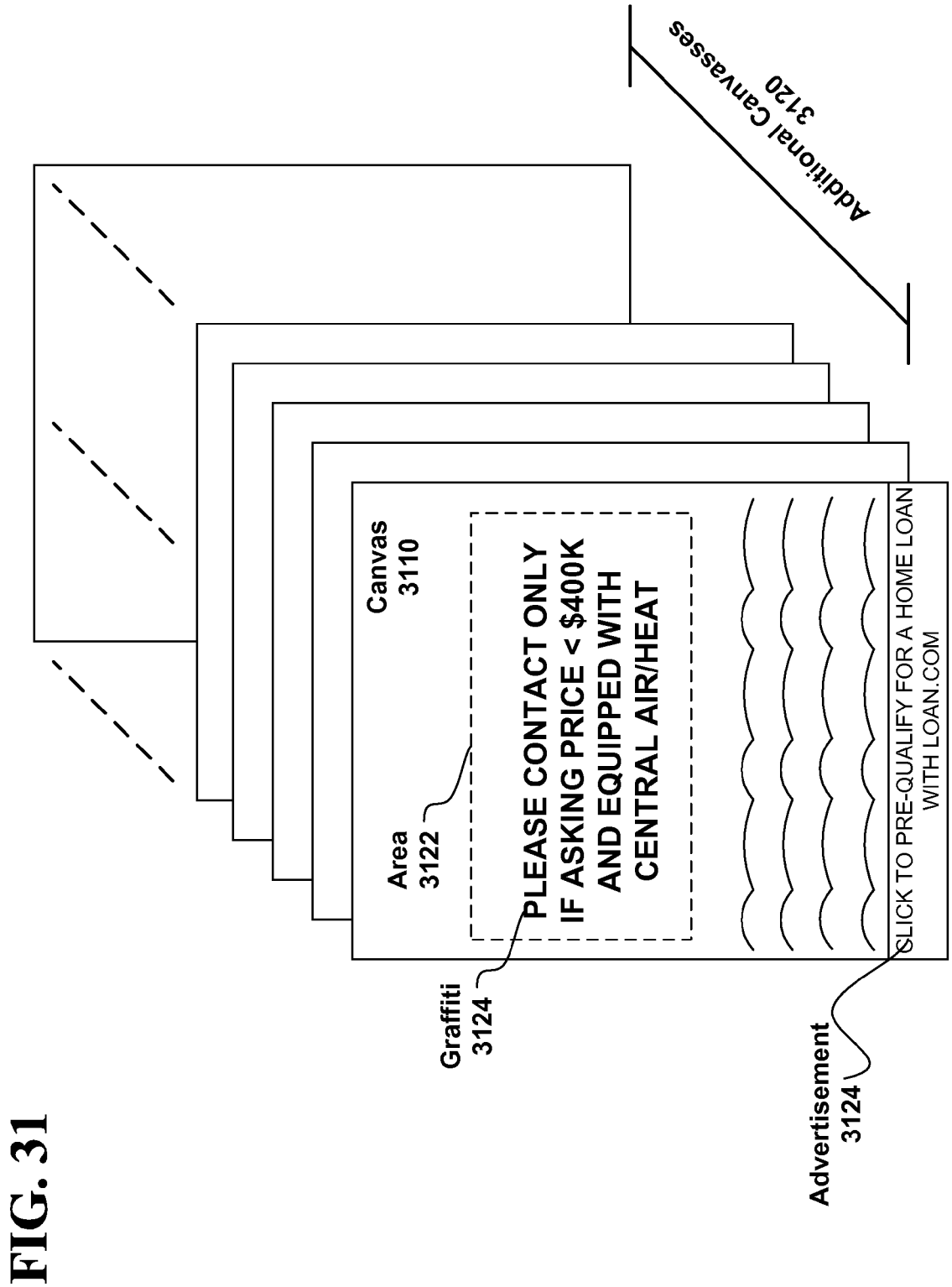
FIG. 31 is an exemplary diagram illustrating a plurality of digital profiles corresponding to a plurality of points of interest selected by a device.

As illustrated in FIG. 31, an inquiry into multiple properties may include simultaneously superimposing graffiti onto multiple corresponding canvases. For this particular example, the prospective buyer's device may superimpose graffiti 3124 onto a graffiti area 3122, wherein a first canvas 3110 corresponds to a first property, and wherein additional canvasses 3120 correspond to additional properties within the selected radius of the prospective buyer's device. Here, as illustrated, the prospective buyer may again utilize an object graffiti tool to create the custom graffiti discussed in FIG. 29.

Exemplary Implementations for Holding the Pointing Device in Different Planes

In an aspect, a device provides the user with different functions/views for facilitating graffiti generation according to the device's orientation. For instance, in FIG. 32, a flow diagram illustrates an exemplary non-limiting process that anticipates that a user will hold a device substantially in a horizontal plane, such as in the palm of the user's hand while viewing the device. At step 3200, a map on display is oriented according to a direction relative to the device based on pointing information. Next, at step 3210, the device displays place(s) or item(s) of interest on the map according to an indication of type of place or item. At step 3220, the place(s) or item(s) are then filtered (e.g., to show only nearby tourist sites). At 3230, as the device turns, the map continuously updates and re-orients based on any new direction the device points at, in order to maintain proper direction relative to real space. The process proceeds with a selection of a place or item on the map at step 3240, followed by the superimposition of digital graffiti on a digital canvas corresponding to the selected place or item at step 3250. In this regard, because it is intuitive to give a ground view when the viewing plane is parallel to the ground plane, in the present embodiment, the device implements a 2-D map view when held substantially in the horizontal plane.

Figure 33:
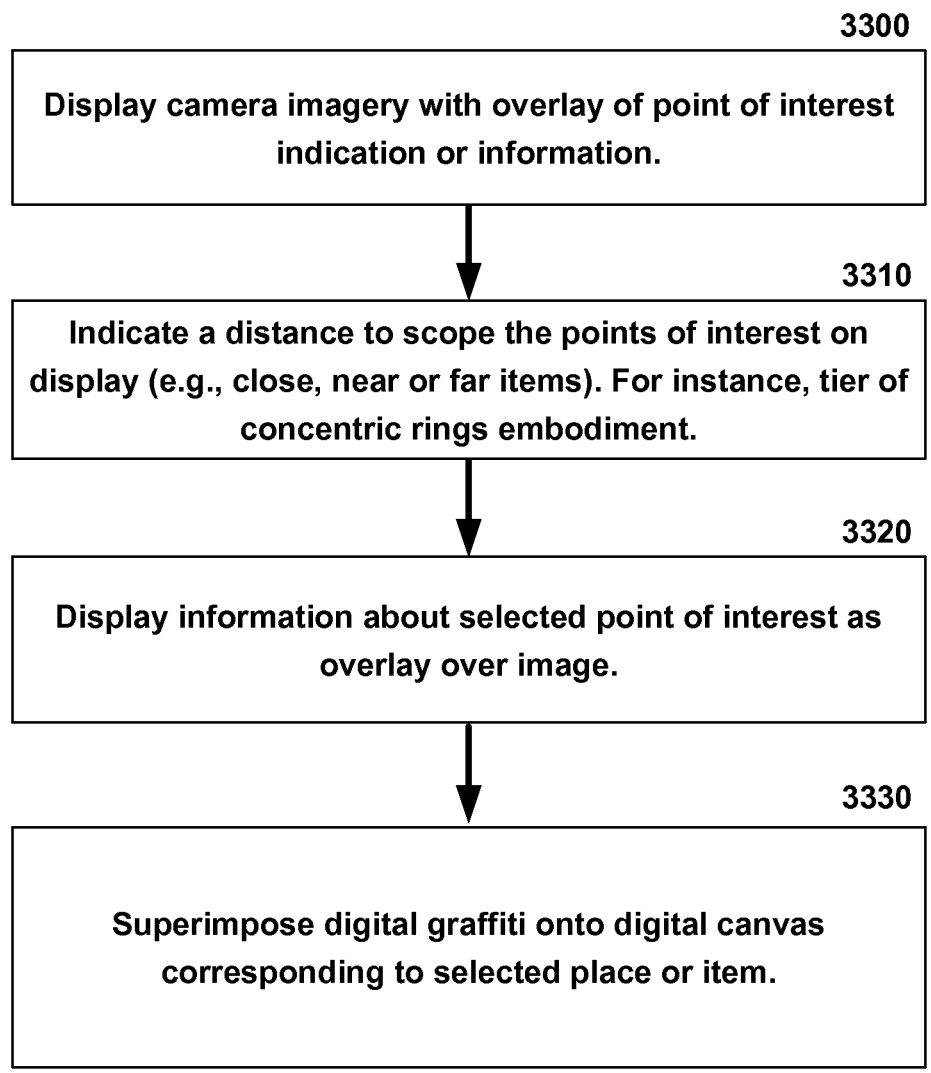
FIG. 33 is a flow diagram of a non-limiting process whereby it is anticipated that a user will hold a device substantially in a vertical plane.

Referring next to FIG. 33, a flow diagram illustrates an exemplary non-limiting process that anticipates that a user will hold a device substantially in a vertical plane (e.g., as if scanning an area in a camera viewfinder with overlay information and actions introduced to give the viewfinder context for POI action). In an aspect, the device utilizes motion information to ascertain when the device is substantially in a vertical plane, at step 3300, wherein the device subsequently displays camera imagery with an overlay of a point of interest indication or information. At step 3310, the device provides distance indications to scope the points of interest on display (e.g., close, near or far items).

Next, at step 3320, the process proceeds with the device displaying information about a selected point of interest as an overlay over the image, followed by the superimposition of digital graffiti on a digital canvas corresponding to the selected place or item at step 3330. In this regard, because it is intuitive to give a 3-D perspective view when the viewing plane is orthogonal to the ground plane, the present embodiment displays a 3-D perspective view with POI information overlay when the device is substantially in the vertical plane. In effect, the camera shows the real space behind the device, and indications of points of interest in that space as if the user was performing a scan of his or her surroundings with the device. Direction information of the device enables data and network services to know what the scope of objects for interaction with the device is.

Figure 32:
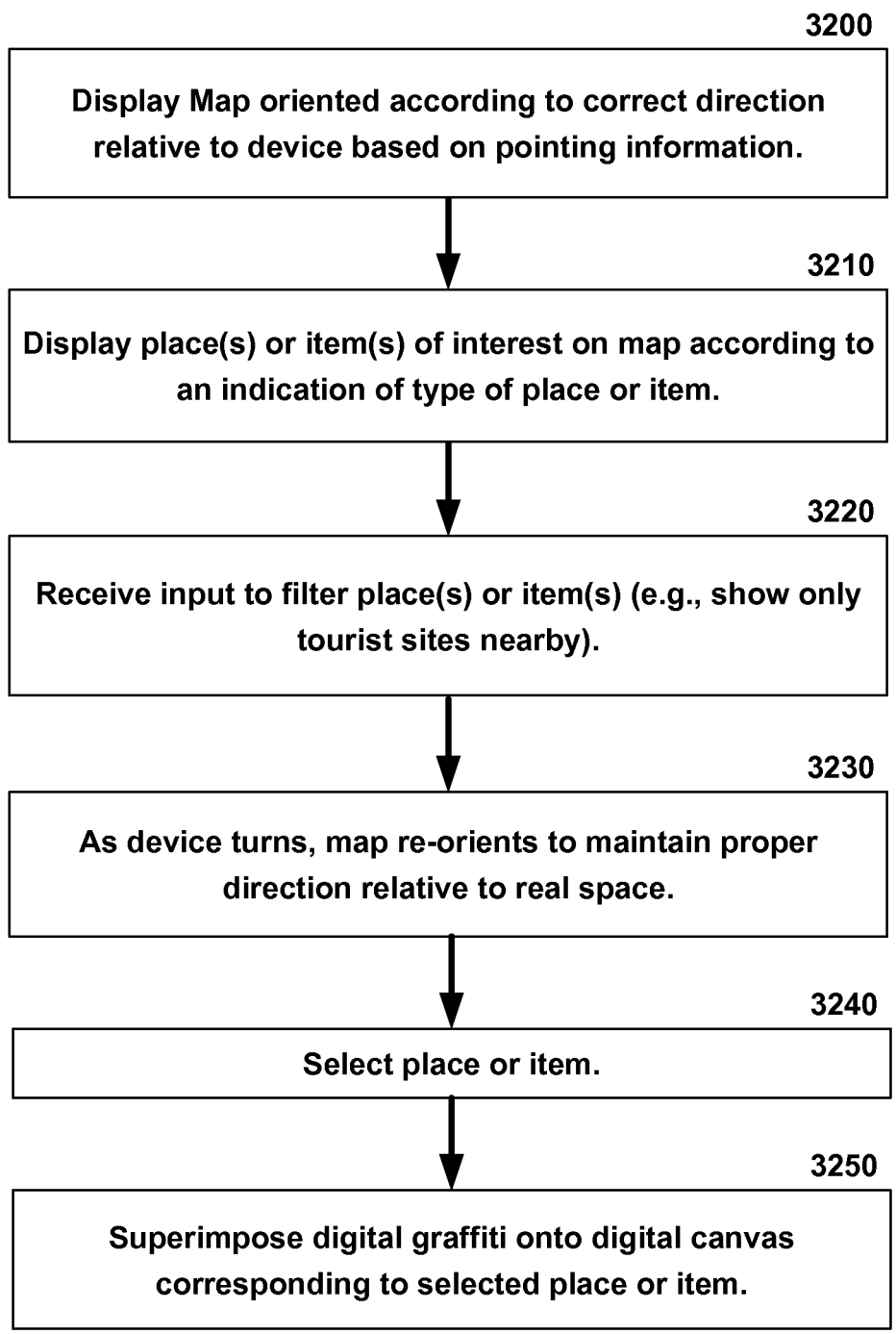
FIG. 32 is a flow diagram of a non-limiting process whereby it is anticipated that a user will hold a device substantially in a horizontal plane.
Figure 34:
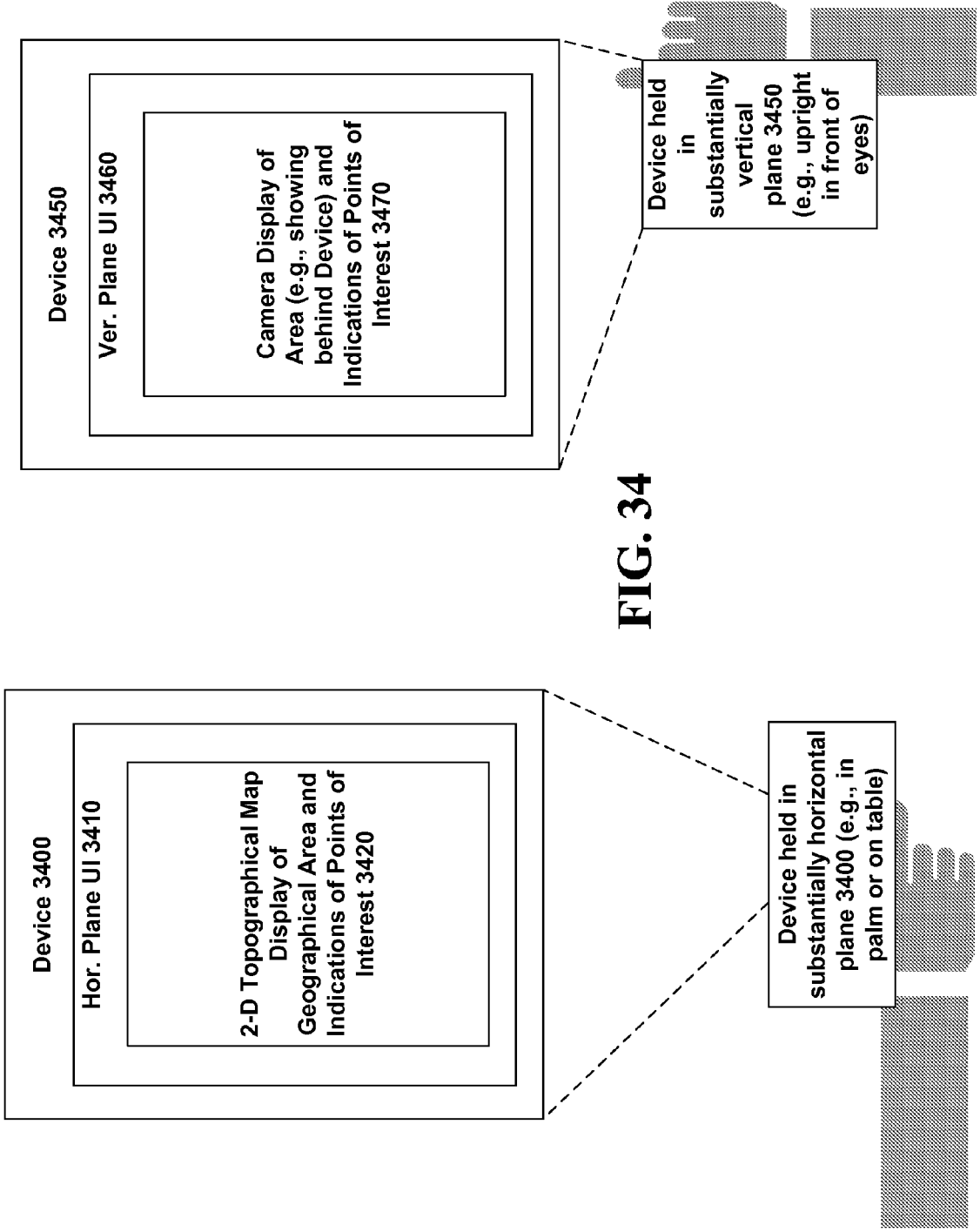
FIG. 34 illustrates a switching between the embodiments of FIGS. 29 and 30 according to planar orientation.

FIG. 34 illustrates a general difference between the embodiments of FIGS. 32 and 33. With device 3400 in the horizontal plane, the device displays a 2-D topographical map display of geographical area and indications of points of interest 3420. In this regard, when device 3400 detects an orientation that is substantially in the horizontal plane, the device displays a 2-D topographical map 3420 within UI 3410. However, when device 3450 detects an orientation that is substantially in the vertical plane, the device displays a 3-D perspective view 3470 within UI 3460 (as reflected by the 2-D imagery of the camera input).

Figure 35:
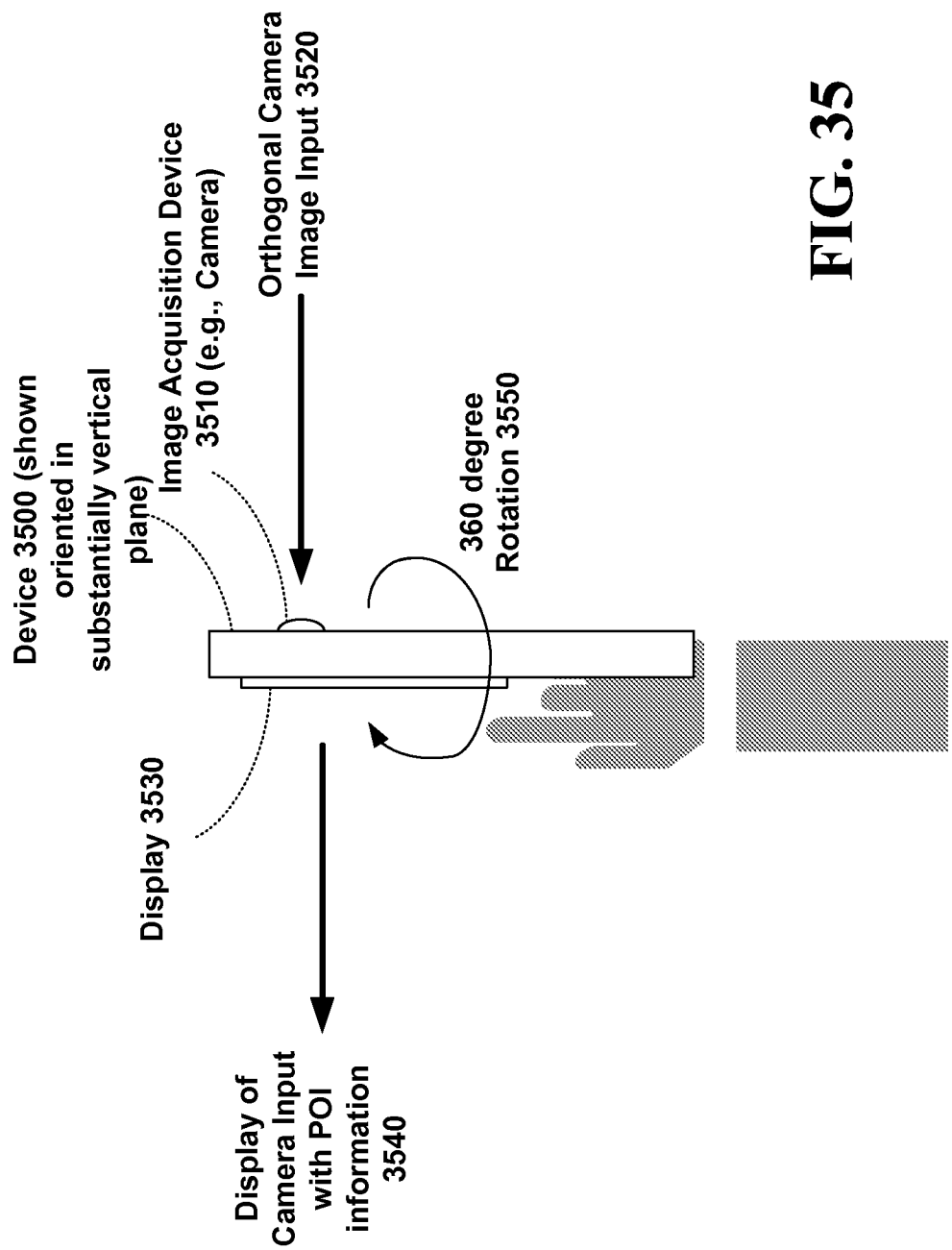
FIG. 35 further illustrates an embodiment that detects the device is substantially in the vertical plane or horizontal plane.

FIG. 35 further illustrates an embodiment that detects the device 3500 is substantially in a vertical plane, thereby invoking the image acquisition device 3510 to acquire input 3520 and display the input on display 3530 with POI information 3540. In this regard, as the user rotates the camera according to the arrow 3550, the POI information changes along with the scope of the camera input 3510 as it changes with the device 3500 spinning around.

Supplemental Context Regarding Pointing Devices, Architectures and Services

Figure 36:
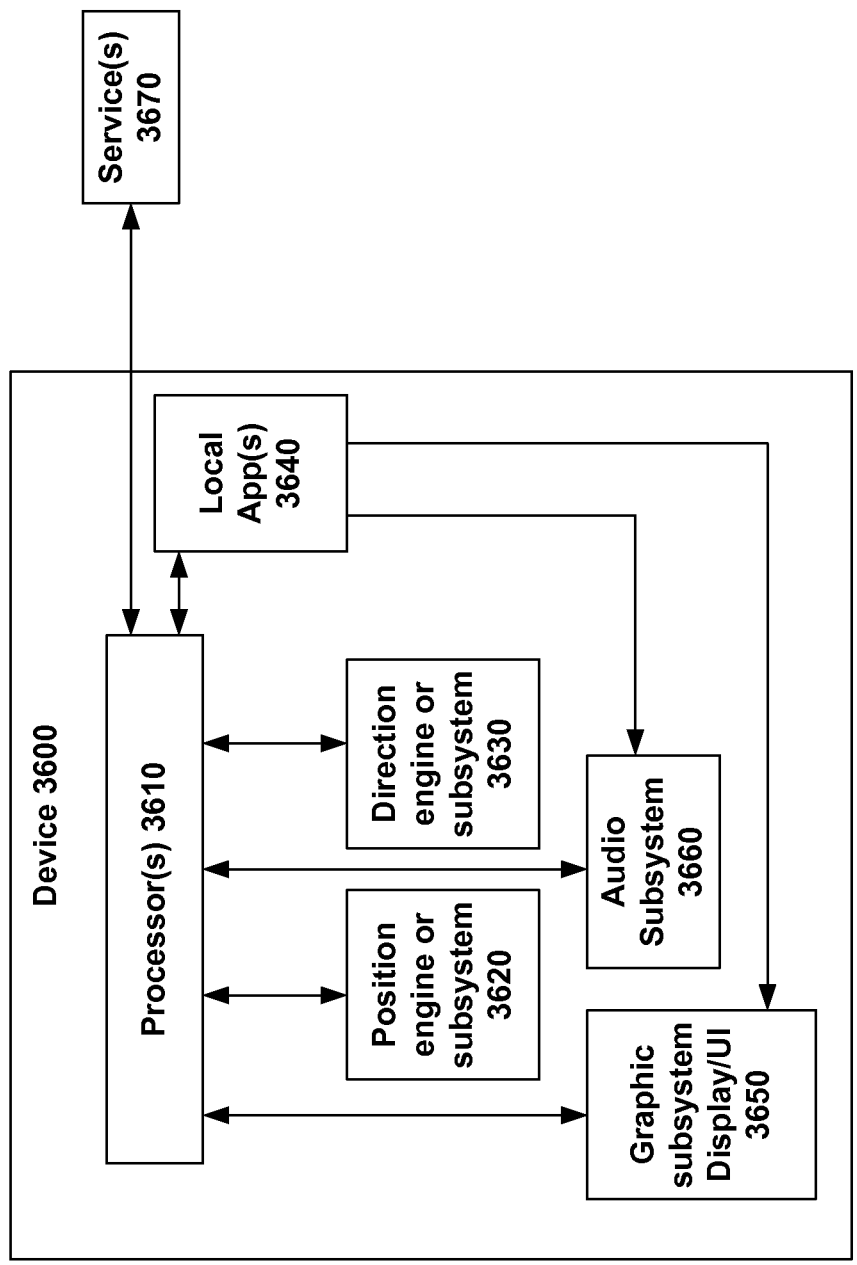
FIG. 36 illustrates a block diagram of a non-limiting device consistent with one or more embodiments described herein.

FIG. 36 illustrates an exemplary non-limiting device 3600 including processor(s) 3610 having a position engine or subsystem 3620 for determining a location of the device 3600 and a direction engine or subsystem 3630 for determining a direction or orientation of the device 3600. By interacting with local application(s) 3640 and/or service(s) 3670, content can be delivered to the device, which is tailored to device intent and a place in which the device is present. The tailored content can be rendered by graphic subsystem or display/UI 3650 or audio subsystem 3660.

The following description contains supplemental context regarding potential non-limiting pointing devices, architectures and associated services to further aid in understanding one or more of the above embodiments. Any one or more of any additional features described in this section can be accommodated in any one or more of the embodiments described above with respect to direction-based services at a particular location. While such combinations of embodiments or features are possible, for the avoidance of doubt, no embodiments set forth in the subject disclosure should be considered limiting on any other embodiments described herein.

As mentioned, a broad range of scenarios can be enabled by a device that can take location and direction information about the device and build a service on top of that information. For example, by effectively using an accelerometer in coordination with an on board digital compass, an application running on a mobile device updates what each endpoint is "looking at" or pointing towards, attempting hit detection on potential points of interest to either produce real-time information for the device or to allow the user to select a range, or using the GPS, a location on a map, and set information such as "Starbucks—10% off cappuccinos today" or "The Alamo—site of . . . " for others to discover. One or more accelerometers can also be used to perform the function of determining direction information for each endpoint as well. As described herein, these techniques can become more granular to particular items within a Starbucks, such as "blueberry cheesecake" on display in the counter, enabling a new type of graffiti interaction.

Accordingly, a general device for accomplishing this includes a processing engine to resolve a line of sight vector sent from a mobile endpoint and a system to aggregate that data as a platform, enabling a host of new scenarios predicated on the pointing information known for the device. The act of pointing with a device, such as the user's mobile phone, thus becomes a powerful vehicle for users to discover and interact with points of interest around the individual in a way that is tailored for the individual. Synchronization of data can also be performed to facilitate roaming and sharing of POV data and contacts among different users of the same service.

In a variety of embodiments described herein, 2-dimensional (2D), 3-dimensional (3D) or N-dimensional directional-based search, discovery, and interactivity services are enabled for endpoints in the system of potential interest to the user.

In this regard, the pointing information and corresponding algorithms ultimately depend upon the assets available in a device for producing the pointing or directional information. The pointing information, however produced according to an underlying set of measurement components, and interpreted by a processing engine, can be one or more vectors. A vector or set of vectors can have a "width" or "arc" associated with the vector for any margin of error associated with the pointing of the device. A panning angle can be defined by a user with at least two pointing actions to encompass a set of points of interest (e.g., those that span a certain angle defined by a panning gesture by the user).

In this respect, a device can include a variety of spatial and map components and intelligence to determine intersections for directional arcs. For instance, objects of interest could be represented with exact boundaries, approximated with spheres, sub-shells (e.g., stores in a mall) of a greater shell (e.g., a mall), hierarchically arranged, etc. Dynamically generated bounding boxes can also be implemented (i.e., any technique can be used to obtain boundary information for use in an intersection algorithm). Thus, such boundaries can be implicitly or explicitly defined for the POIs.

A device can also include an intersection component that interprets pointing information relative to a set of potential points of interest. The engine can perform such intersections knowing what the resolution of the measuring instruments are on the device, such as a given resolution of a GPS system. Such techniques can include taking into account how far a user is from a plane of objects of interest, such as items on a shelf or wall, the size of the item of interest and how that is defined, as well as the resolution of location instrumentation, such as the GPS system. The device can also optionally include an altimeter, or any other device that gives altitude information, such as measuring radar or sonar bounce from the floor. The altitude information can supplement existing location information for certain specialized services where points of interest vary significantly at different altitudes. It is noted that a GPS system itself has some information about altitude in its encoding.

In a non-limiting embodiment, a portable electronic device includes a positional component for receiving positional information as a function of a location of the portable electronic device, a directional component that outputs direction information as a function of an orientation of the portable electronic device and a location-based engine. Within such embodiment, the location-based engine processes the positional information and the direction information to determine a subset of points of interest relative to the portable electronic device as a function of at least the positional information and the direction information.

The positional component can be a positional GPS component for receiving GPS data as the positional information. The directional component can be a magnetic compass and/or a gyroscopic compass that outputs the direction information. The device can include acceleration component(s), such as accelerometer(s), that outputs acceleration information associated with movement of the portable electronic device. The use of a separate sensor can also be used to further compensate for tilt and altitude adjustment calculations.

In one embodiment, the device includes a cache memory for dynamically storing a subset of endpoints of interest that are relevant to the portable electronic device and at least one interface to a network service for transmitting the positional information and the direction information to the network service. In return, based on real-time changes to the positional information and direction/pointing information, the device dynamically receives in the cache memory an updated subset of endpoints that are potentially relevant to the portable electronic device.

For instance, the subset of endpoints can be updated as a function of endpoints of interest within a pre-defined distance substantially along a vector defined by the orientation of the portable electronic device. Alternatively or in addition, the subset of endpoints can be updated as a function of endpoints of interest relevant to a current context of the portable electronic device. In this regard, the device can include a set of Representational State Transfer (REST)-based application programming interfaces (APIs), or other stateless set of APIs, so that the device can communicate with the service over different networks (e.g., Wi-Fi, a GPRS network, etc.), or communicate with other users of the service (e.g., Bluetooth). For the avoidance of doubt, the embodiments are in no way limited to a REST-based implementation, but rather any other state or stateful protocol could be used to obtain information from the service to the devices.

The directional component outputs direction information including compass information based on calibrated and compensated heading/directionality information. The directional component can also include direction information indicating upward or downward tilt information associated with a current upward or downward tilt of the portable electronic device, so that the services can detect when a user is pointing upwards or downwards with the device in addition to a certain direction. The height of the vectors themselves can also be taken into account to distinguish between pointing a device from the top of a building (likely pointing to other buildings, bridges, landmarks, etc.) and pointing the device from the bottom of the building (likely pointing to a shop at ground level). Other distinctions can be made between pointing towards a ceiling or floor to differentiate among shelves in a supermarket. A 3-axis magnetic field sensor can also be used to implement a compass to obtain tilt readings.

Secondary sensors, such as altimeters or pressure readers, can also be included in a mobile device and used to detect a height of the device, e.g., what floor a device is on in a parking lot or floor of a department store (changing the associated map/floorplan data). Where a device includes a compass with a planar view of the world (e.g., a 2-axis compass), the inclusion of one or more accelerometers in the device can be used to supplement the motion vector measured for a device as a virtual third component of the motion vector (e.g., to provide measurements regarding a third degree of freedom). This option is deployable where the provision of a 3-axis compass is too expensive, or otherwise unavailable.

In this respect, a gesturing component can also be included in the device to determine a current gesture of a user of the portable electronic device from a set of pre-defined gestures. For example, gestures can include zoom in, zoom out, panning to define an arc, all to help filter over potential subsets of points of interest for the user.

For instance, web services can effectively resolve vector coordinates sent from mobile endpoints into <x, y, z> or other coordinates using location data, such as GPS data, as well as configurable, synchronized POV information similar to that found in a GPS system in an automobile. In this regard, any of the embodiments can be applied similarly in any motor vehicle device. One non-limiting use is also facilitation of endpoint discovery for synchronization of data of interest to or from the user from or to the endpoint.

Figure 37:
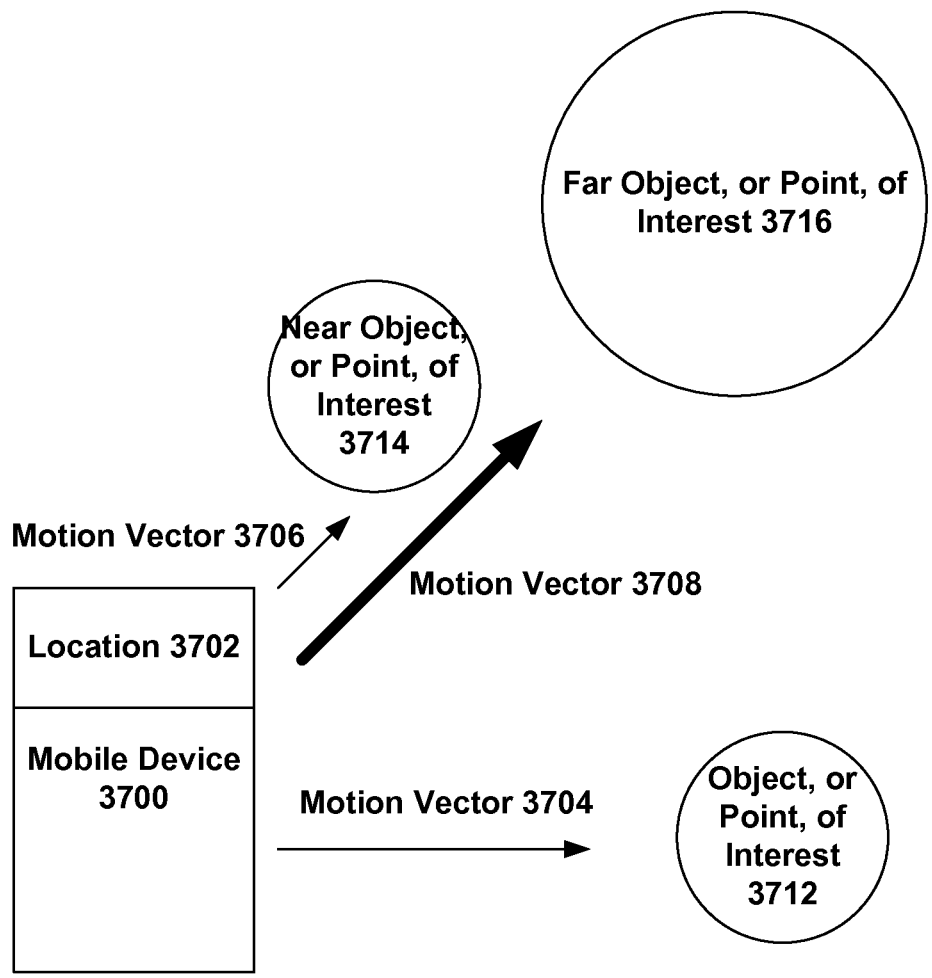
FIG. 37 is a block diagram illustrating the formation of motion vectors for use in connection with location-based services.

Among other algorithms for interpreting position/motion/direction information, as shown in FIG. 37, a device 3700 employing the direction-based location-based services 3702 as described herein in a variety of embodiments herein include a way to discern between near objects, such as POI 3714 and far objects, such as POI 3716. Depending on the context of usage, the time, the user's history, the device state, the speed of the device, the nature of the POIs, etc., the service can determine a general distance associated with a motion vector. Thus, a motion vector 3706 will implicate POI 3714, but not POI 3716, and the opposite would be true for motion vector 3708.

In addition, a device 3700 includes an algorithm for discerning items substantially along a direction at which the device is pointing, and those not substantially along a direction at which the device is pointing. In this respect, while motion vector 3704 might implicate POI 3712, without a specific panning gesture that encompassed more directions/vectors, POIs 3714 and 3716 would likely not be within the scope of points of interest defined by motion vector 3704. The distance or reach of a vector can also be tuned by a user (e.g., via a slider control or other control) to quickly expand or contract the scope of endpoints encompassed by a given "pointing" interaction with the device.

In one non-limiting embodiment, the determination of at what or whom the user is pointing is performed by calculating an absolute "Look" vector, within a suitable margin of error, by a reading from an accelerometer's tilt and a reading from the magnetic compass. Then, an intersection of endpoints determines an initial scope, which can be further refined depending on the particular service employed (i.e., any additional filter). For instance, for an apartment search service, endpoints falling within the look vector that are not apartments ready for lease, can be pre-filtered.

In addition to the look vector determination, the engine can also compensate for, or begin the look vector, where the user is by establishing positioning (~15 feet) through an A-GPS stack (or other location-based or GPS subsystem including those with assistance strategies) and also compensate for any significant movement/acceleration of the device, where such information is available.

As mentioned, in another aspect, a device can include a client-side cache of potentially relevant points of interest, which, based on the user's movement history can be dynamically updated. The context, such as geography, speed, etc. of the user can be included in the updating calculation. For instance, if a user's velocity is two miles per hour, the user may be walking and interested in updates at a city block by city block level, or at a lower level granularity if they are walking in the countryside. Similarly, if a user is moving on a highway at sixty miles per hour, the block-by-block updates of information are no longer desirable, but rather a granularity can be provided and predictively cached on the device in a manner appropriate for the speed of the vehicle.

In an automobile context, the location becomes the road on which the automobile is travelling, and the particular items are the places and things that are passed on the roadside much like products in a particular retail store on a shelf or in a display. The pointing-based services thus create a virtual "billboard" opportunity for items of interest generally along a user's automobile path. Proximity to location can lead to an impulse buy (e.g., a user might stop by a museum they are passing and pointing at with their device) if offered a discount on admission.

In various alternative embodiments, gyroscopic or magnetic compasses can provide directional information. A REST-based architecture enables data communications to occur over different networks, such as Wi-Fi and GPRS architectures. REST-based APIs can be used, though any stateless messaging can be used that does not require a long keep alive for communicated data/messages. This way, since networks can go down with GPRS antennae, seamless switching can occur to Wi-Fi or Bluetooth networks to continue according to the pointing-based services enabled by the embodiments described herein.

A device as provided herein according to one or more embodiments can include a file system to interact with a local cache, store updates for synchronization to the service, exchange information by Bluetooth with other users of the service, etc. Accordingly, when operating from a local cache, at least the data in the local cache is still relevant at a time of disconnection, and thus, the user can still interact with the data. Finally, the device can synchronize according to any updates made at a time of re-connection to a network, or to another device that has more up to date GPS data, POI data, etc. In this regard, a switching architecture is adoptable for the device to perform a quick transition from connectivity from one networked system (e.g., cell phone towers) to another computer network (e.g., Wi-Fi) to a local network (e.g., mesh network of Bluetooth connected devices).

With respect to user input, a set of soft keys, touch keys, etc. can be provided to facilitate in the directional-based pointing services provided herein. A device can include a windowing stack in order to overlay different windows, or provide different windows of information regarding a point of interest (e.g., hours and phone number window versus interactive customer feedback window). Audio can also be rendered or handled as input by the device. For instance, voice input can be handled by the service to explicitly point without the need for a physical movement of the device. For instance, a user could say into a device "what is this product right in front of me? No, not that one, the one above it" and have the device transmit current direction/movement information to a service, which in turn intelligently, or iteratively, determines what particular item of interest the user is pointing at, and returns a host of relevant information about the item.

Figure 38:
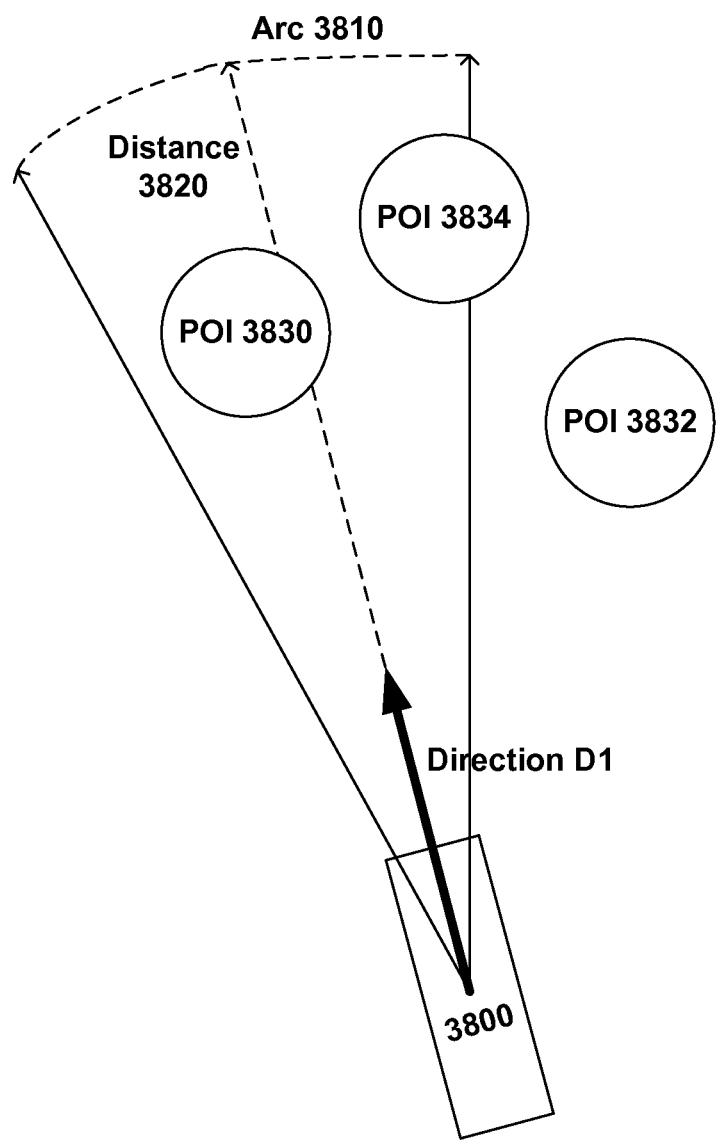
FIG. 38 illustrates a first aspect of algorithms for determining intersection endpoints with a pointing direction of a device.

FIG. 38 illustrates a non-limiting way for determining a set of points of interest. As illustrated, a device 3800 is pointed (e.g., point and click) in a direction D1, which according to the device or service parameters, implicitly defines an area within arc 3810 and distance 3820 that encompasses POI 3830, but does not encompass POI 3832. Such an algorithm will also need to determine any edge case POIs (i.e., whether POIs such as POI 3834 are within the scope of pointing in direction D1), where the POI only partially falls within the area defined by arc 3810 and distance 3820.

Figure 39:
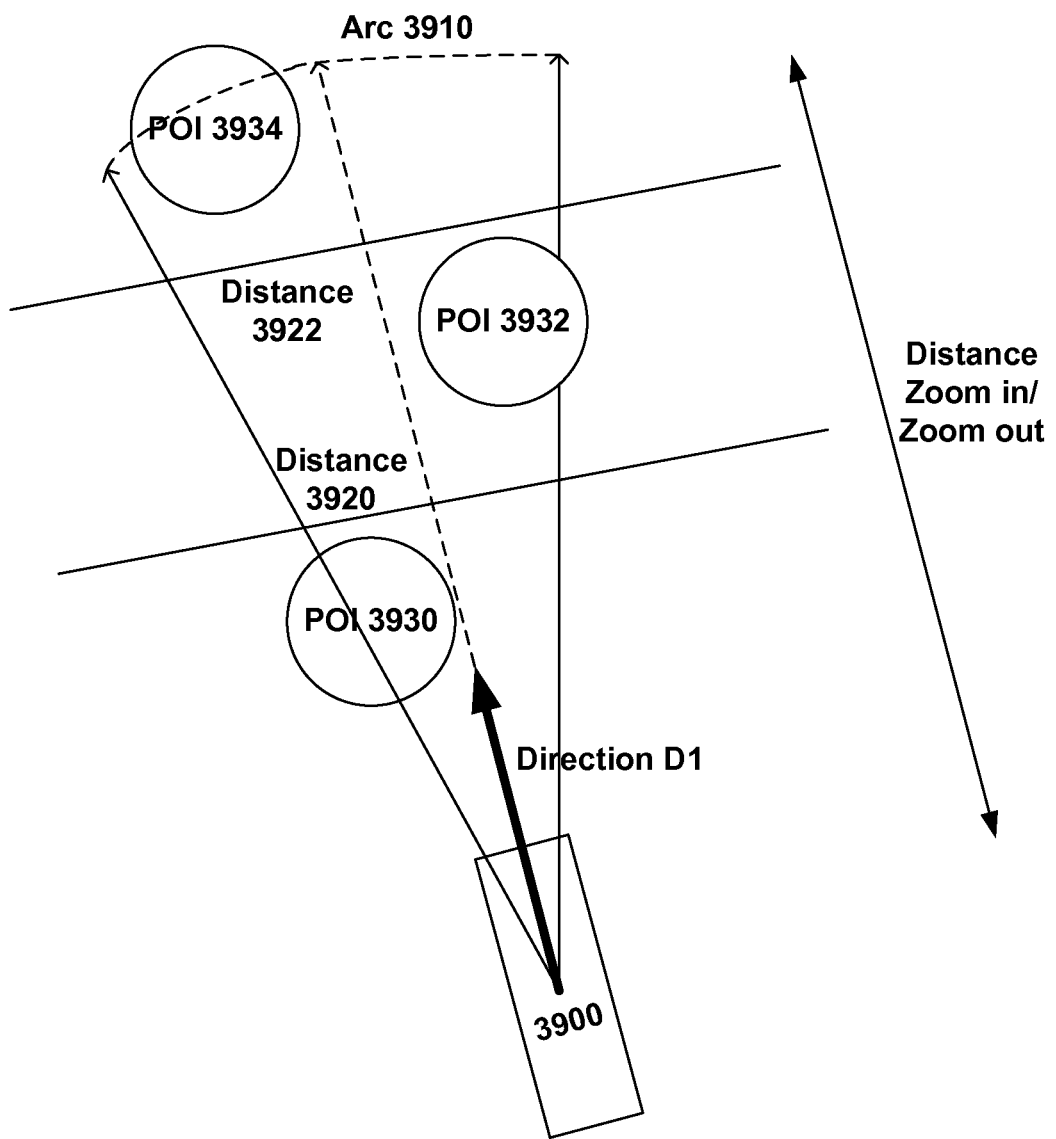
FIG. 39 illustrates a second aspect of algorithms for determining intersection endpoints with a pointing direction of a device.

Other gestures that can be of interest for a gesturing subsystem include recognizing a user's gesture for zoom in or zoom out. Zoom in/zoom out can be performed in terms of distance like FIG. 39. In FIG. 39, a device 3900 pointed in direction D1 may include a zoomed in view which includes points of interest within distance 3920 and arc 3910, or a medium zoomed view representing points of interest between distance 3920 and 3922, or a zoomed out view representing points of interest beyond distance 3922. These zoom zones correspond to POIs 3930, 3932 and 3934, respectively. More or fewer zones can be considered depending upon a variety of factors (e.g., the service, user preference, etc.).

Figure 40:
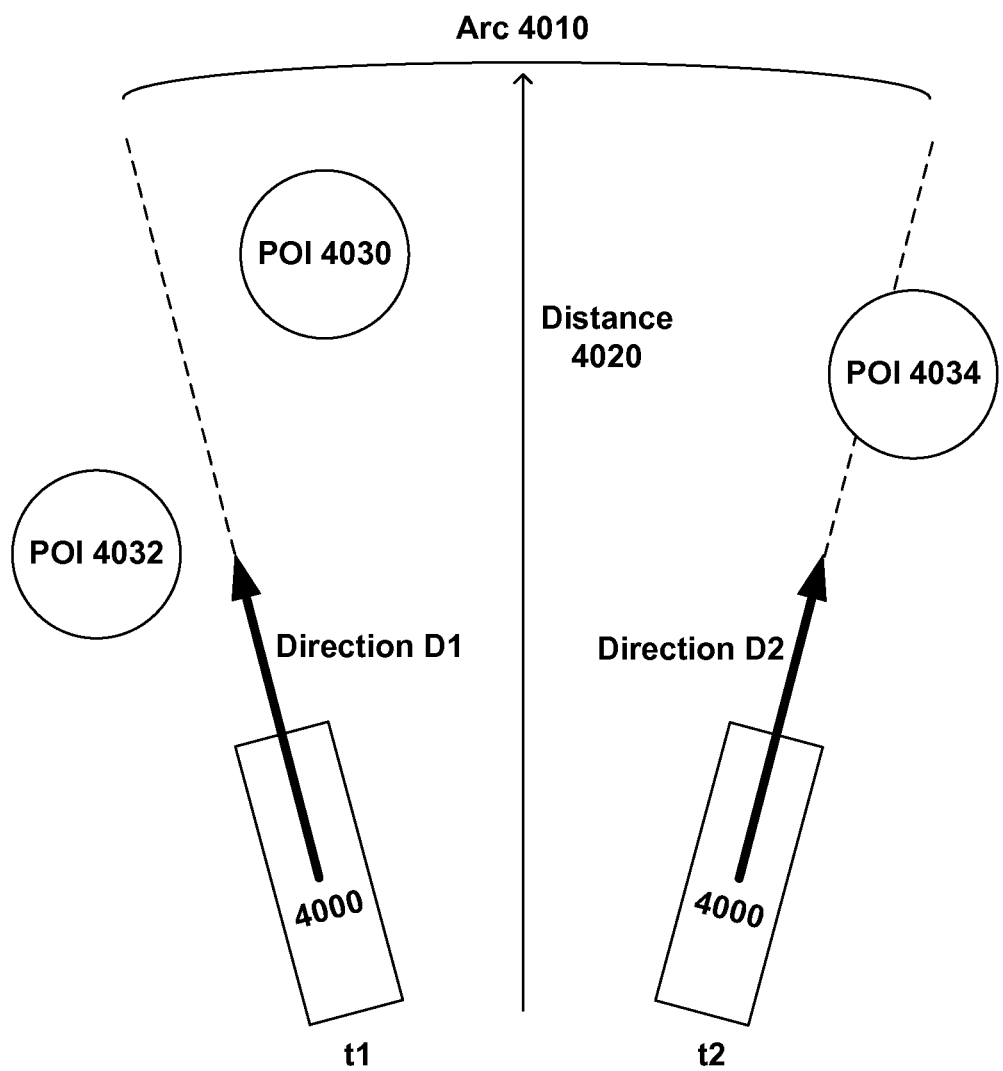
FIG. 40 illustrates a third aspect of algorithms for determining intersection endpoints with a pointing direction of a device.

In another non-limiting example, with location information and direction information, a user can input a first direction via a click, and then a second direction after moving the device via a second click, which in effect defines an arc 3710 for objects of interest in the system, such as objects 4030, 4032, 4034 as illustrated in FIG. 40. For instance, via a first pointing act by the user at time t1 in direction D1 and a second pointing act at time t2 by the user in direction D2, an arc 4010 is implicitly defined. The area of interest implicitly includes a search of objects of interest within a distance 4020, which can be zoomed in and out, or selected by the service based on a known granularity of interest, selected by the user, etc. This can be accomplished with a variety of forms of input to define the two directions. For instance, the first direction can be defined upon a click-and-hold button event, or other engage-and-hold user interface element, and the second direction can be defined upon release of the button. Similarly, two consecutive clicks corresponding to the two different directions D1 and D2 can also be implemented. In the example, POI 4030 is encompassed by the arc 4010 defined by the gesture.

Also, instead of focusing on real distance, zooming in or out could also represent a change in terms of granularity, or size, or hierarchy of objects. For example, a first pointing gesture with the device may result in a shopping mall appearing, but with another gesture, a user could carry out a recognizable gesture to gain or lose a level of hierarchical granularity with the points of interest on display. For instance, after such gesture, the points of interest could be zoomed in to the level of the stores at the shopping mall and what they are currently offering.

In addition, a variety of even richer behaviors and gestures can be recognized when acceleration of the device in various axes can be discerned. Panning, arm extension/retraction, swirling of the device, backhand tennis swings, breaststroke arm action, golf swing motions could all signify something unique in terms of the behavior of the pointing device, and this is to just name a few motions that could be implemented in practice. Thus, any of the embodiments herein can define a set of gestures that serve to help the user interact with a set of services built on the pointing platform, to help users easily gain information about points of information in their environment, and to help users generate and superimpose graffiti.

Furthermore, with relatively accurate upward and downward tilt of the device, in addition to directional information such as calibrated and compensated heading/directional information, other services can be enabled. Typically, if a device is at ground level, the user is outside, and the device is "pointed" up towards the top of buildings. Here, the granularity of information about points of interest sought by the user (e.g., building level) is different than if the user was pointing at the first floor shops of the building (e.g., shops level), even where the same compass direction is implicated. Similarly, where a user is at the top of a landmark such as the Empire State building, a downward tilt at the street level (street level granularity) would implicate information about different points of interest that if the user of the device pointed with relatively no tilt at the Statue of Liberty (landmark/building level of granularity).

Also, when a device is moving in a car, it may appear that direction is changing as the user maintains a pointing action on a single location, but the user is still pointing at the same thing due to displacement. Thus, time varying location can be factored into the mathematics and engine of resolving at what the user is pointing with the device to compensate for the user experience.

Accordingly, armed with the device's position, one or more web or cloud services can analyze the vector information to determine at what or whom the user is looking/pointing. The service can then provide additional information such as ads, specials, updates, menus, happy hour choices, etc., depending on the endpoint selected, the context of the service, the location (urban or rural), the time (night or day), etc. As a result, instead of a blank Internet search without context, a form of real-time visual search for users in real 3-D environments is provided.

In one non-limiting embodiment, the direction-based pointing services are implemented in connection with a pair of glasses, headband, etc. having a corresponding display means that acts in concert with the user's looking to highlight or overlay features of interest around the user.

Figure 41:
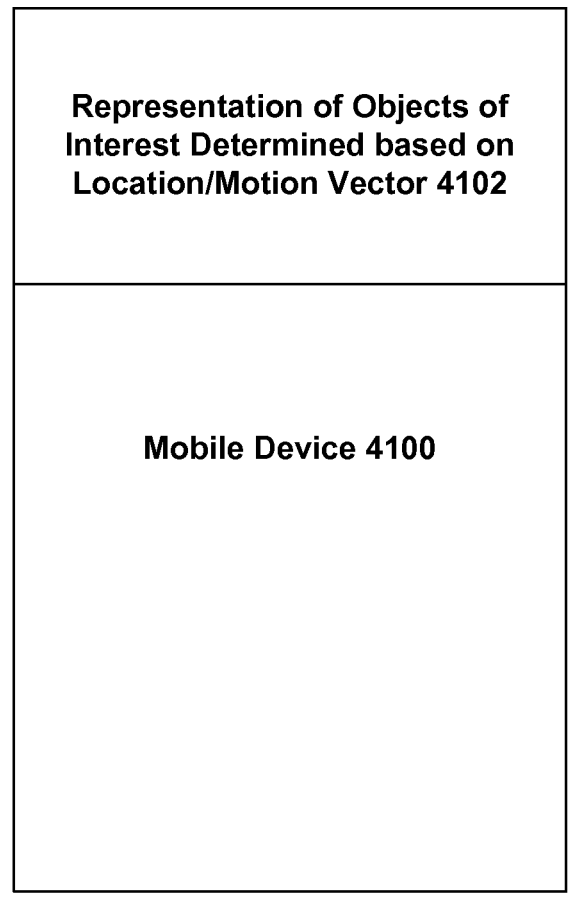
FIG. 41 represents a generic user interface for a mobile device for representing points of interest based on pointing information.

As shown in FIG. 41, once a set of objects is determined from the pointing information according to a variety of contexts of a variety of services, a mobile device 4100 can display the objects via representation 4102 according to a variety of user experiences tailored to the service at issue. For instance, a virtual camera experience can be provided, where POI graphics or information can be positioned relative to one another to simulate an imaging experience. A variety of other user interface experiences can be provided based on the pointing direction as well.

Figure 42:
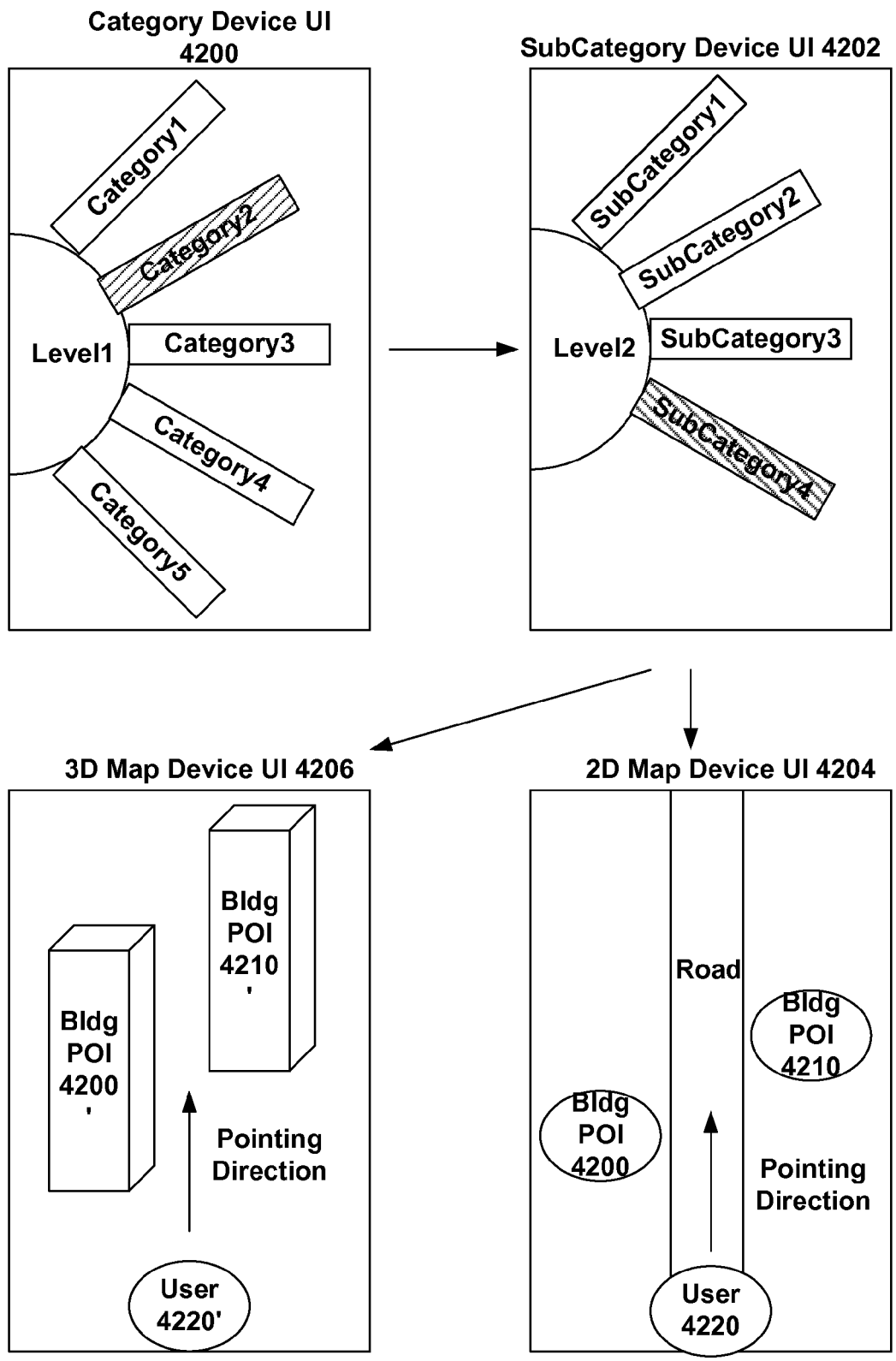
FIG. 42 represents some exemplary, non-limiting alternatives for user interfaces for representing point of interest information.

For instance, a set of different choices are shown in FIG. 42, wherein UI 4200 and 4202 illustrate an exemplary navigation of hierarchical POI information. For instance, level1 categories may include category1, category2, category3, category4 and category5, such that a user selects around the categories with a thumb-wheel, up-down control, or the like, and chooses one such as category2. Then, subcategory1, subcategory2, subcategory3 and subcategory4 are displayed as subcategories of category2. Then, if the user selects, for instance, subcategory4, perhaps few enough POIs, such as buildings 4200 and 4210 are found in the subcategory in order to display on a 2D map UI 4204 along the pointing direction, or alternatively as a 3D virtual map view 4206 along the pointing direction.

When things change from the perspective of either the service or the client, a synchronization process can bring either the client or service, respectively, up to date. In this way, an ecosystem is enabled where a user can point at an object or point of interest, gain information about it that is likely to be relevant to the user, interact with the information concerning the point of interest, and add value to the services ecosystem where the user interacts. The system thus advantageously supports both static and dynamic content.

Figure 43:
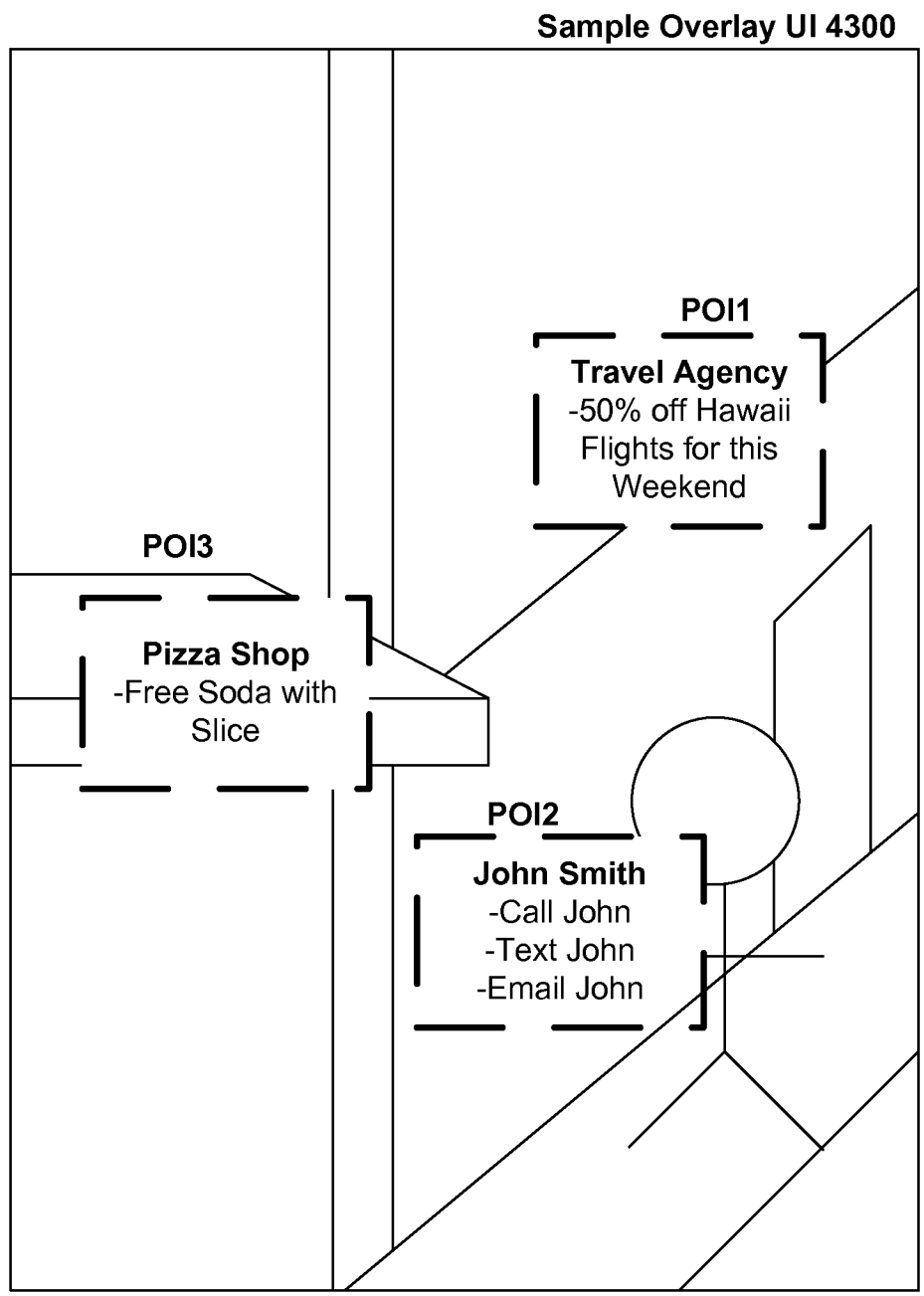
FIG. 43 illustrates a sample overlay user interface for overlaying point of interest information over a camera view of a mobile device.

Other user interfaces can be considered such as left-right, or up-down arrangements for navigating categories or a special set of soft-keys can be adaptively provided.

Where a device includes a camera, in one embodiment shown in FIG. 43, a representative non-limiting overlay UI 4300 is shown having three POIs POI1, POI2 and POI3. The POIs are overlaid over actual image data being viewed in real time on the device via an LCD screen or like display. The actual image data can be of products on a shelf or other display or exhibit in a store. Thus, as the user aims the camera around his or her environment, the lens becomes the pointer, and the POI information can be overlaid intelligently for discovery of endpoints of interest. Moreover, a similar embodiment can be imagined even without a camera, such as a UI in which 3-D objects are virtually represented based on real geometries known for the objects relative to the user. Thus, the device UI can be implemented consistent with a camera, or virtual camera, view for intuitive use of such devices. The pointer mechanism of the device could also switch based on whether the user was currently in live view mode for the camera or not. Moreover, assuming sufficient processing power and storage, real time image processing could discern an object of interest and based on image signatures, overlay POI information over such image in a similar manner to the above embodiments. In this regard, with the device provided herein, a variety of gestures can be employed to zoom in, zoom out, perform tilt detection for looking down or up, or panning across a field of view to obtain a range of POIs associated with the panning scope.

With respect to a representative set of user settings, a number or maximum number of desired endpoints delivered as results can be configured. How to filter can also be configured (e.g., five most likely, five closest, five closest to one hundred feet away, five within category or sub-category, alphabetical order, etc.). In each case, based on a pointing direction, implicitly a cone or other cross section across physical space is defined as a scope of possible points of interest. In this regard, the width or deepness of this cone or cross section can be configurable by the user to control the accuracy of the pointing (e.g., narrow or wide radius of points and how far out to search).

To support processing of vector information and aggregating POI databases from third parties, a variety of storage techniques, such as relational storage techniques can be used. For instance, Virtual Earth data can be used for mapping and aggregation of POI data can occur from third parties such as Tele Atlas, NavTeq, etc. In this regard, businesses not in the POI database will want to be discovered and thus, the service provides a similar, but far superior from a spatial relevance standpoint, Yellow Pages experiences where businesses will desire to have their additional information, such as menus, price sheets, coupons, pictures, virtual tours, etc. accessible via the system.

In addition, a synchronization platform or framework can keep the roaming caches in sync, thereby capturing what users are looking at and efficiently processing changes. Or, where a user goes offline, local changes can be recorded, and when the user goes back online, such local changes can be synchronized to the network or service store. Also, since the users are in effect pulling information they care about "in the here" and "in the now" through the act of pointing with the device, the system generates high cost per impression (CPM) rates as compared to other forms of demographic targeting. Moreover, the system drives impulse buys, since the user may not be physically present in a store, but the user may be near the object, and by being nearby and pointing at the store, information about a sale concerning the object can be sent to the user.

In an aspect, different location subsystems (such as tower triangulation, GPS, A-GPS, E-GPS, etc.) can have different tolerances. For instance, with GPS, tolerances can be achieved to about ten meters. With A-GPS, tolerances can be tightened to about twelve feet. In turn, with E-GPS, tolerance may be a different error margin still. Compensating for the different tolerances is part of the interpretation engine for determining intersection of a pointing vector and a set of points of interest. In addition, as shown in FIGS. 37-40, a distance to project out the pointing vector can be explicit, configurable, contextual, etc.

In this regard, the various embodiments described herein can employ any algorithm for distinguishing among boundaries of the endpoints (such as boundary boxes, or rectangles, triangles, circles, etc.). For example, one hundred fifty feet could be selected as a default radius, and such value can be configured or be context sensitive to the service provided. On-line real estate sites can be leveraged for existing POI information. Since different POI databases may track different information at different granularities, a way of normalizing the POI data according to one convention or standard can also be implemented so that the residential real estate location data from Zillow, for example, can be integrated with GPS information from Starbucks.

In addition, similar techniques can be implemented in a moving vehicle client that includes a GPS, compass, accelerometer, etc. By filtering based on scenarios (e.g., I need gas), different subsets of points of interest (e.g., gas stations) can be determined for the user based not only on distance, but an actual time it may take to get to the point of interest. In this regard, while a gas station may be one hundred yards to the right off the highway, the car may have already passed the corresponding exit, and thus more useful information to provide is what gas station will take the least amount of time to drive from a current location based on direction/location so as to provide predictive points of interest that are up ahead on the road, and not already aged points of interest that would require turning around from one's destination in order to get to them.

For existing motor vehicle navigation devices, or other conventional portable GPS navigation devices, where a device does not natively include directional means such as a compass, the device can have an extension slot that accommodates direction information from an external directional device, such as a compass. Similarly, for laptops or other portable electronic devices, such devices can be outfitted with a card or board with a slot for a compass. While any of the services described herein can make web service calls as part of the pointing and retrieval of endpoint process, as mentioned, one advantageous feature of a user's locality in real space is that it is inherently more limited than a general Internet search for information. As a result, a limited amount of data can be predictively maintained on a user's device in cache memory and properly aged out as data becomes stale.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 44:
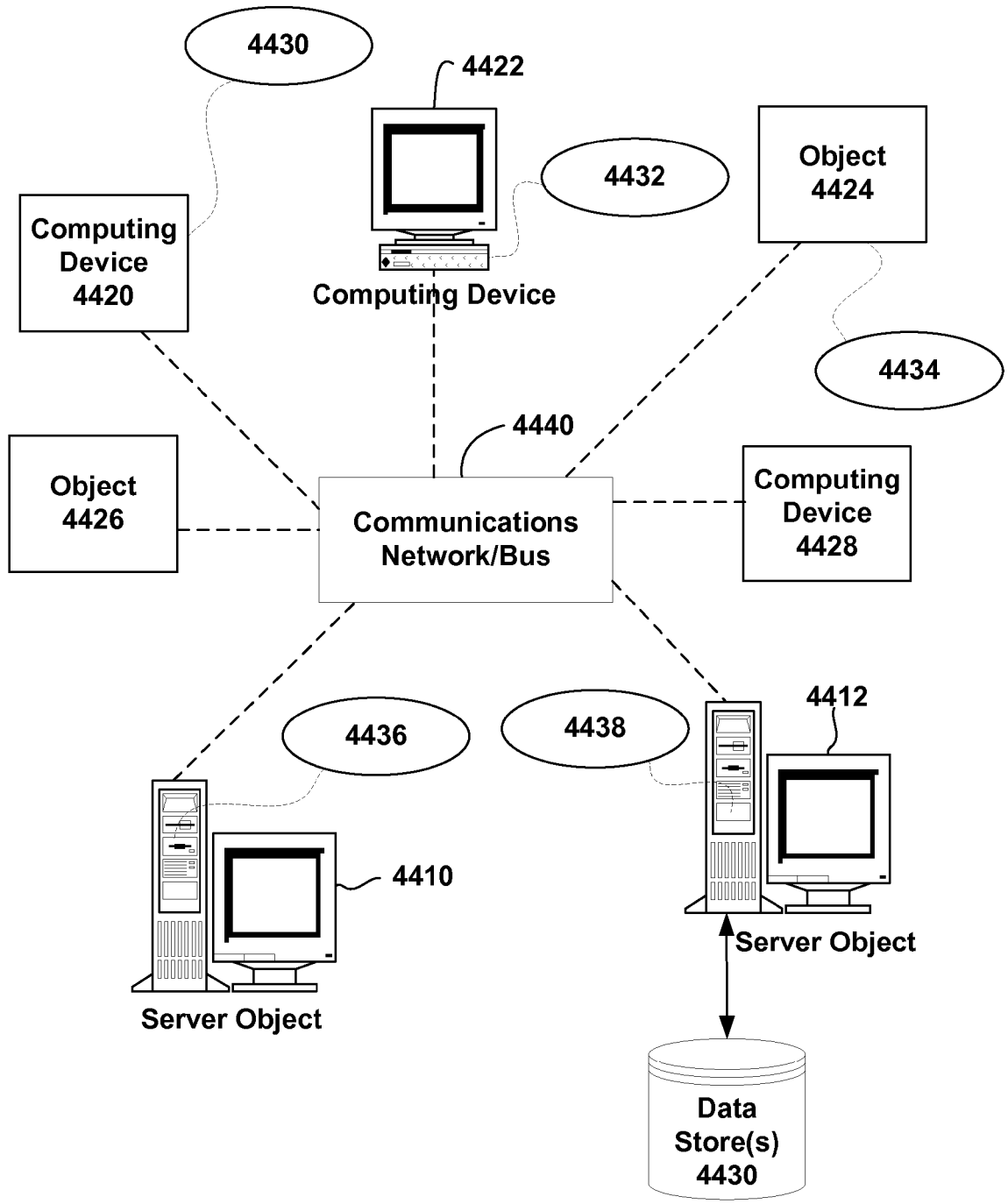
FIG. 44 is a block diagram representing an exemplary non-limiting networked environment in which embodiment(s) may be implemented.

FIG. 44 provides a non-limiting schematic diagram of an exemplary networked or distributed computing environment. The distributed computing environment comprises computing objects 4410, 4412, etc. and computing objects or devices 4420, 4422, 4424, 4426, 4428, etc., which may include programs, methods, data stores, programmable logic, etc., as represented by applications 4430, 4432, 4434, 4436, 4438. It can be appreciated that objects 4410, 4412, etc. and computing objects or devices 4420, 4422, 4424, 4426, 4428, etc. may comprise different devices, such as PDAs, audio/video devices, mobile phones, MP3 players, laptops, etc.

Each object 4410, 4412, etc. and computing objects or devices 4420, 4422, 4424, 4426, 4428, etc. can communicate with one or more other objects 4410, 4412, etc. and computing objects or devices 4420, 4422, 4424, 4426, 4428, etc. by way of the communications network 4440, either directly or indirectly. Even though illustrated as a single element in FIG. 44, network 4440 may comprise other computing objects and computing devices that provide services to the system of FIG. 44, and/or may represent multiple interconnected networks, which are not shown. Each object 4410, 4412, etc. or 4420, 4422, 4424, 4426, 4428, etc. can also contain an application, such as applications 4430, 4432, 4434, 4436, 4438, that might make use of an API, or other object, software, firmware and/or hardware, suitable for communication with or implementation of the user profiling in a transaction and advertising platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 44, as a non-limiting example, computers 4420, 4422, 4424, 4426, 4428, etc. can be thought of as clients and computers 4410, 4412, etc. can be thought of as servers where servers 4410, 4412, etc. provide data services, such as receiving data from client computers 4420, 4422, 4424, 4426, 4428, etc., storing of data, processing of data, transmitting data to client computers 4420, 4422, 4424, 4426, 4428, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 4440 is the Internet, for example, the servers 4410, 4412, etc. can be Web servers with which the clients 4420, 4422, 4424, 4426, 4428, etc. communicate via any of a number of known protocols, such as the hypertext transfer protocol (HTTP). Servers 4410, 4412, etc. may also serve as clients 4420, 4422, 4424, 4426, 4428, etc., as may be characteristic of a distributed computing environment.

Exemplary Computing Device

As mentioned, various embodiments described herein apply to any device wherein it may be desirable to generate digital graffiti. It should be understood, therefore, that handheld, portable and other computing devices and computing objects of all kinds are contemplated for use in connection with the various embodiments described herein, i.e., anywhere that a device may request pointing based services. Accordingly, the below general purpose remote computer described below in FIG. 45 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 45:
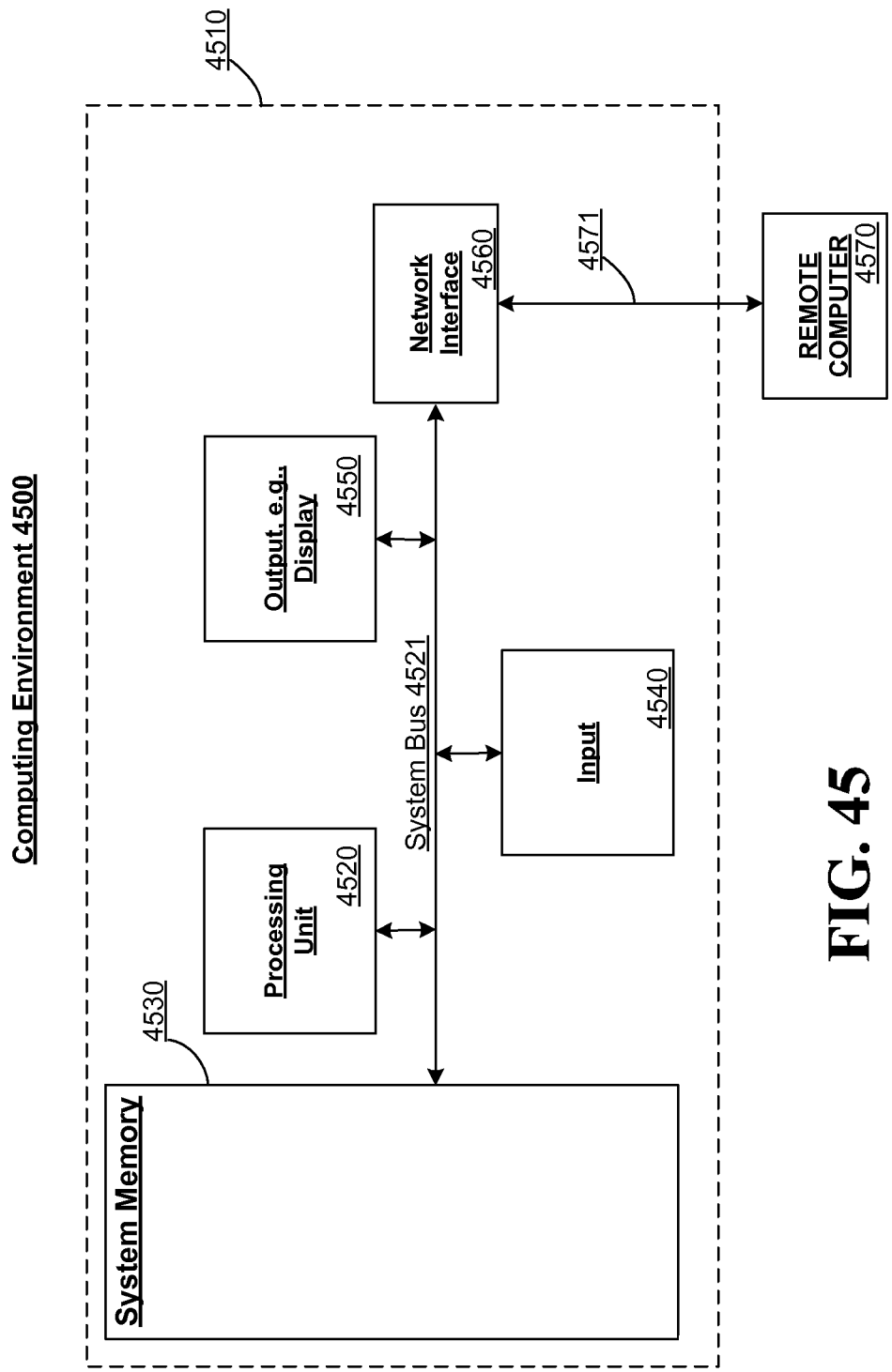
FIG. 45 is a block diagram representing an exemplary non-limiting computing system or operating environment in which aspects of embodiment(s) may be implemented.

FIG. 45 thus illustrates an example of a suitable computing system environment 4500 in which one or more of the embodiments may be implemented, although as made clear above, the computing system environment 4500 is only one example of a suitable computing environment and is not intended to suggest any limitation as to the scope of use or functionality of any of the embodiments. Neither should the computing environment 4500 be interpreted as having any dependency or requirement relating to any one or combination of components illustrated in the exemplary operating environment 4500.

With reference to FIG. 45, an exemplary remote device for implementing one or more embodiments herein can include a general purpose computing device in the form of a handheld computer 4510. Components of handheld computer 4510 may include, but are not limited to, a processing unit 4520, a system memory 4530, and a system bus 4521 that couples various system components including the system memory to the processing unit 4520.

Computer 4510 typically includes a variety of computer readable media and can be any available media that can be accessed by computer 4510. The system memory 4530 may include computer storage media in the form of volatile and/or nonvolatile memory such as read only memory (ROM) and/or random access memory (RAM). By way of example, and not limitation, memory 4530 may also include an operating system, application programs, other program modules, and program data.

A user may enter commands and information into the computer 4510 through input devices 4540 A monitor or other type of display device is also connected to the system bus 4521 via an interface, such as output interface 4550. In addition to a monitor, computers may also include other peripheral output devices such as speakers and a printer, which may be connected through output interface 4550.

The computer 4510 may operate in a networked or distributed environment using logical connections to one or more other remote computers, such as remote computer 4570. The remote computer 4570 may be a personal computer, a server, a router, a network PC, a peer device or other common network node, or any other remote media consumption or transmission device, and may include any or all of the elements described above relative to the computer 4510. The logical connections depicted in FIG. 45 include a network 4571, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to derive information about surrounding points of interest.

There are multiple ways of implementing one or more of the embodiments described herein, e.g., an appropriate API, tool kit, driver code, operating system, control, standalone or downloadable software object, etc. which enables applications and services to use the pointing based services. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer implemented system, comprising:
   a processor configured to execute computer-executable instructions;
   a receiving component configured to receive data corresponding to digital graffiti formed from a path traversed by a device, the data including direction information and location information, the direction information originating from a compass and corresponding to a pointing direction towards which the device is substantially oriented, the location information originating from a location service and representing a global position of the device; and
   a search component configured to identify at least one point of interest as a function of the direction information and the location information, the at least one point of interest included as part of a plurality of selectable points of interests and having at least one corresponding digital canvas onto which the digital graffiti is superimposed.

2. The system of claim 1, the search component configured to identify points of interest within a articular radius from the location of the device, and wherein the search component is further configured to facilitate an interaction with digital canvasses identified as corresponding to the points of interest within the particular radius.

3. The system of claim 1, the processor configured to infer the at least one digital canvas from at least one of the motion information, the direction information, or the location information.

4. The system of claim 3 further comprising an ink component that outputs a two-dimensional mapping of the at least one gesture, the processor further configured to process the two-dimensional mapping, the digital graffiti derived from at least a portion of the two-dimensional mapping.

5. The system of claim 4 further comprising a beautification component that outputs a beautification of at least a portion of the two-dimensional mapping, the processor further configured to process the beautification, the digital graffiti derived to include at least a portion of the beautification.

6. The system of claim 3 further comprising an object component that identifies a digital image corresponding to the at least one gesture, the processor further configured to process the digital image, the digital graffiti derived to include at least a portion of the digital image.

7. The system of claim 6 further comprising a library component that stores at least the digital image, the processor further configured to retrieve the digital image from the library component.

8. The system of claim 1, the data including point of interest information, the point of interest information including information regarding at least one point of interest, the search component configured to identify the at least one digital canvas as a function of the point of interest information.

9. The system of claim 8, the point of interest information including sensory information pertaining to a signal received by the device from at least one point of interest proximate to the device, the search component configured to identify the at least one digital canvas as a function of the sensory information.

10. The system of claim 1 further comprising a canvas database that stores the at least one digital canvas, the processor further configured to retrieve the at least one digital canvas from the canvas database.

11. The system of claim 1, the search component further configured to identify at least one advertisement corresponding to the digital graffiti, the processor configured to facilitate superimposing the at least one advertisement onto the at least one digital canvas.

12. The system of claim 11 further comprising an advertisement database that stores the at least one advertisement, the processor further configured to retrieve the at least one advertisement from the advertisement database.

13. A method, comprising:
employing a processor to execute computer executable instructions stored on a computer readable storage medium to implement the following acts:
receiving data corresponding to digital graffiti formed from a path traversed by a device, the data including direction information and location information, the direction information originating from a compass and corresponding to a pointing direction towards which the device is substantially oriented, the location information originating from a location service and representing a global position of the device; and
identifying at least one point of interest; the at least one point of interest identified as a function of the direction information and the location information, the at least one point of interest included as part of a plurality of selectable points of interests and having at least one corresponding digital canvas onto which the digital graffiti is superimposed.

14. The method of claim 13 further comprising deriving the digital graffiti, the digital graffiti derived as a function of the data.

15. The method of claim 13 further comprising retrieving the at least one digital canvas from an entity accessible via a network.

16. The method of claim 13 further comprising transmitting a request to an entity accessible via a network, the request requesting that the entity transmit the at least one digital canvas to the device.

17. The method of claim 13 further comprising identifying at least one advertisement corresponding to the digital graffiti.

18. The method of claim 17 further comprising superimposing the at least one advertisement onto the at least one digital canvas.

19. The method of claim 17 further comprising retrieving the at least one advertisement from an entity accessible via a network.

20. A computer readable storage medium, comprising:
a memory component configured to store computer-readable instructions, the computer-readable instructions including instructions for performing the following acts:
receiving data corresponding to a path traversed by a device, the data including direction information and location information, the direction information originating from a compass and corresponding to a pointing direction towards which the device is substantially oriented, the location information originating from a location service and representing a global position of the device;
deriving digital graffiti from the data;
identifying at least one point of interest according to the direction information and the location information, the at least one point of interest included as part of a plurality of selectable points of interests and having at least one corresponding digital canvas;
identifying at least one advertisement corresponding to the digital graffiti; and
superimposing each of the digital graffiti and the at least one advertisement onto the at least one corresponding digital canvas.

\* \* \* \* \*